United States Patent
Junge et al.

(10) Patent No.: US 11,762,241 B2
(45) Date of Patent: Sep. 19, 2023

(54) DEVICE FOR THE REGULATION OF LIGHT TRANSMISSION

(71) Applicant: MERCK PATENT GMBH, Darmstadt (DE)

(72) Inventors: Michael Junge, Darmstadt (DE); Rainer Neeff, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 153 days.

(21) Appl. No.: 17/121,938

(22) Filed: Dec. 15, 2020

(65) Prior Publication Data

US 2021/0181585 A1 Jun. 17, 2021

(30) Foreign Application Priority Data

Dec. 16, 2019 (EP) ..................................... 19216581

(51) Int. Cl.
   *G02F 1/1337* (2006.01)
   *E06B 9/24* (2006.01)

(52) U.S. Cl.
   CPC .......... *G02F 1/133746* (2021.01); *E06B 9/24* (2013.01); *G02F 1/133723* (2013.01); *G02F 1/133742* (2021.01); *G02F 1/133769* (2021.01); *E06B 2009/2464* (2013.01); *G02F 2202/022* (2013.01); *G02F 2202/043* (2013.01)

(58) Field of Classification Search
   CPC ........ C09K 19/44; C09K 19/46; C09K 19/02; C09K 19/2007; G02F 1/13775; G02F 1/133769; G02F 1/133723; G02F 1/133746; E06B 2009/2464; E06B 9/24
   See application file for complete search history.

(56) References Cited

U.S. PATENT DOCUMENTS

| | | | |
|---|---|---|---|
| 2011/0234944 A1* | 9/2011 | Powers | G02F 1/132 156/60 |
| 2014/0016042 A1* | 1/2014 | Yamauchi | G03B 21/56 349/5 |
| 2015/0056367 A1 | 2/2015 | Hosaka et al. | |
| 2016/0319592 A1 | 11/2016 | Junge et al. | |
| 2018/0002604 A1* | 1/2018 | Yoon | C09K 19/20 |
| 2019/0016955 A1* | 1/2019 | Junge | C09K 19/3001 |
| 2019/0031959 A1 | 1/2019 | Junge et al. | |
| 2020/0157426 A1* | 5/2020 | Matsuda | C09K 19/32 |
| 2021/0189240 A1* | 6/2021 | Khan | C09K 19/3003 |
| 2021/0255498 A1* | 8/2021 | Wu | G02F 1/1337 |

FOREIGN PATENT DOCUMENTS

| | | | |
|---|---|---|---|
| WO | 15090506 A1 | 6/2015 | |
| WO | 17118465 A1 | 7/2017 | |

OTHER PUBLICATIONS

European Search report in corresponding EP20213643 dated May 7, 2021(pp. 1-11).

Baetens et al., "Properties, requirements and possibilities of smart windows for dynamic daylight and solar energy control in buildings: A state-of-the-art review" Solar Energy Materials & Solar Cells, 2010, 94, 87-105.

\* cited by examiner

*Primary Examiner* — Mariam Qureshi

(74) *Attorney, Agent, or Firm* — MILLEN WHITE ZELANO AND BRANIGAN, PC; Csaba Henter

(57) ABSTRACT

Devices for the regulation of light transmission and in particular switchable windows, including window elements containing a switchable optical cell having a homeotropically aligned liquid crystal layer with a pretilt angle in the range of 77° to 88°.

22 Claims, No Drawings

DEVICE FOR THE REGULATION OF LIGHT TRANSMISSION

The present invention relates to devices for the regulation of light transmission and in particular to switchable windows. The present invention in particular relates to window elements comprising a switchable optical cell having a homeotropically aligned liquid crystal layer wherein a pretilt angle in the range of from 77° to 88° is set.

Devices for controlling or modulating the transmission of light are commonly used in display applications, but they may also be used e.g. in so-called smart windows applications. R. Baetens et al. in "Properties, requirements and possibilities of smart windows for dynamic daylight and solar energy control in buildings: A state-of-the-art review", Solar Energy Materials & Solar Cells, 94 (2010) on pages 87-105 review different dynamic smart windows. As described therein, smart windows can make use of several technologies for modulating the transmittance of light such as devices based on electrochromism, liquid crystal devices and electrophoretic or suspended-particle devices.

Light shutters and optical intensity modulators, in particular liquid crystal-based light modulators, may be used in switchable windows for architectural, automotive, railway, avionic and nautical applications.

In such devices the transmission of light may be reversibly changed wherein the intensity of incident light can be attenuated, dimmed or tinted. These devices may thus be operated in and switched between a bright state and a dark state, i.e. between a state of relatively higher light transmission and a state of relatively lower light transmission.

While switching in liquid crystal-based devices between the different optical states may also be thermally controlled, it is in many cases advantageous and suitably preferred that the devices adopt the different optical states using electrical switching, where the application of voltage controls the switching. Such liquid crystal-based devices in principle employ a change in the orientation of liquid crystal (LC) molecules between two conductive electrodes by applying an electric field which results in a change of the transmittance.

In principle, several modes or configurations may be employed to provide such reversible transmission change. For twisted nematic (TN), supertwisted nematic (STN) and vertical alignment (VA) liquid crystal cells polarizers are commonly used to control the light transmission. It is also possible to use guest-host liquid crystal cells which are based on a liquid crystal host which is doped with dichroic dye molecules. These guest-host systems can be used without any polarizers to alter the light transmission. However, in some embodiments and applications guest-host liquid crystal cells are also used in combination with at least one polarizer.

WO 2015/090506 A1 describes the use of dichroic dye-doped liquid crystalline media having a negative dielectric anisotropy in devices for regulating the passage of light.

WO 2017/118465 A1 describes devices for regulating the entry of light into a room comprising a switchable layer which contains a dichroic dye-doped liquid crystalline medium and which in one of the switching states has a twisted configuration.

There is still a need in the art for devices for regulating the passage of light and in particular switchable windows which give reliable and efficient switching performance.

An object of the present invention is therefore to provide improved devices for regulating the passage of light and in particular window elements comprising optical cells which exhibit robust and reliable switching while providing performance benefits in particular in terms of the appearance of the switching states and the switching speed. Further objects of the present invention are immediately evident to the person skilled in the art from the following detailed description.

The objects are solved by the subject-matter defined herein, while preferred embodiments are set forth further described below.

The present invention in particular provides the following items including main aspects, preferred embodiments and particular features, which respectively alone and in combination contribute to solving the above objects and eventually provide additional advantages.

A first aspect of the present invention provides a window element comprising a switchable optical cell having a layer structure comprising in this order
 a first substrate,
 a first electrode layer,
 a first alignment layer,
 a switchable layer,
 a second alignment layer,
 a second electrode layer, and
 a second substrate,
wherein the switchable layer is a homeotropically aligned liquid crystal layer comprising a liquid crystalline medium, and
wherein a pretilt angle in the range of from 77° to 88° is set by at least one of the first alignment layer and the second alignment layer.

Preferably and advantageously the switchable optical cell is operable in and electrically switchable between a bright state and a dark state.

In the present invention it has been recognized that it can be advantageous to provide a switchable window element which is based on a liquid crystal cell using homeotropic alignment, which is also known as vertical alignment (VA), in particular in combination with electrical switching. While allowing suitable viewing angle dependence and response times, this configuration may in particular give benefits in terms of the obtainable contrast between the optical states and of the dark state performance. It also offers the possibility to use dichroic dyes in these configurations to give guest-host systems with improved performance.

However, it has been further recognized that for these VA configurations under certain conditions instead of the desired uniform optical state initially a non-uniform state may be obtained. This may particularly be the case when an electric field is applied to switch between optical states and especially when a so-called overdrive voltage is used, i.e. a driving voltage which exceeds the saturation voltage. It has been further found that for cell areas and cell gap thicknesses which are typical for window elements and which are generally larger than for customary liquid crystal displays such an undesired effect may be more pronounced, both in terms of the appearance as well as the duration. In particular, after the switching initially an undesirable state may be obtained which has a grainy appearance that may persist for several seconds or even minutes, only after which the desired uniform appearance arises. Without wishing to be bound by any particular theory, it is believed that this phenomenon is due to unwanted backflow dynamics which initially may lead to inhomogeneities, disclinations and visible domains which may be perceived as a grainy state. Subsequently, the actually desired uniform state may form or emerge from this temporary, intermediate condition.

In the present invention it was recognized that it is desirable that upon switching the designated state with a uniform appearance is obtained quickly, either immediately or at least reasonably promptly, thus giving a favourable switching performance and in particular a fast switching speed. It has surprisingly been found that by purposively controlling the alignment of the liquid crystalline medium in the switchable layer and in particular by specifically setting at least at one of the alignment layers, preferably at both alignment layers, a pretilt angle in the range of from 77° to 88° the detrimental effect related to the intermediate inhomogeneities and temporal domain patterns can be significantly mitigated or even avoided, thus giving substantial benefits in terms of the speed and the reliability of the switching.

In order to orient or align liquid crystal molecules at the cell wall, i.e. the substrate surface, it is possible to use alignment layers, also known as orientation layers, to provide an interface which specifically causes or induces a predetermined or desired molecular orientation. In many cases the liquid crystal molecules at or near the interface are on average inclined, even and in particular also in the absence of an applied voltage. In this respect, the average inclination angle of the liquid crystal molecules measured from the substrate surface plane or respectively interface plane is called pretilt angle. For homeotropic or vertical alignment, typically a pretilt angle between 88° and 89° is observed, i.e. an angle which is very close to perpendicular to the surface plane. However, it was found that for these conventional VA configurations the inhomogeneities and grainy domain structures, in particular effects attributable to field-induced backflow or reverse flow LC dynamics, described above may occur in certain cases or under certain conditions.

According to the present invention alignment layers are used wherein at, and also near, the interface of at least one of the alignment layers, and preferably at the interfaces of both alignment layers, a pretilt angle in the range of from 77° to 88°, particularly preferably in the range of from 84° to 86°, is set. This purposive provision and observation of a pretilt angle in the given specific range can significantly contribute to shortening and/or lessening the occurrence of unwanted inhomogeneities or can even avoid such occurrence thus leading to a fast switching into the desired defect-free, uniform optical state. In addition, it has surprisingly been found that furthermore a suitably efficient and advantageous electro-optical performance can still be obtained, in particular in terms of maintaining the desired transmittance in the bright state as well as in the dark state, thus giving the possibility to provide a sufficiently high contrast between the switching states.

Based on the favourable optical and electro-optical performance of the switchable optical cell the present device can be advantageously used in several different window and shutter applications.

In a further aspect the window element according to the invention is used in a window of a building or a vehicle. Vehicles may include e.g. road vehicles such as cars, buses and trucks, as well as trains, boats, ships and airplanes.

Without limiting the present invention thereby, in the following the invention is illustrated by the detailed description of the aspects, embodiments and particular features, and particular embodiments are described in more detail.

According to the invention a switchable layer is arranged between two substrates such as to give an optical cell which is operable in different optical states and which preferably and advantageously is electrically switchable.

The window element preferably comprises an optical cell which is switchable between a bright state and a dark state. In this respect, the bright state has a larger degree of light transmission compared to the dark state.

In the bright state the window element according to the invention preferably has a degree of visible light transmission, determined in accordance with DIN EN410, of more than 45%, more preferably more than 55%, and even more preferably more than 65%.

In the dark state the window element according to the invention preferably has a degree of visible light transmission, determined in accordance with DIN EN410, of less than 40%, more preferably less than 30%, and even more preferably less than 20%. In a preferred embodiment, in the dark state the window element has a degree of visible light transmission, determined in accordance with DIN EN410, in the range from 1% to 35%, and more preferably in the range from 5% to 30%.

According to the invention in one of the optical states the liquid crystalline medium in the switchable layer is homeotropically aligned, in particular in the absence of an electric field.

The first and second substrates may comprise, preferably consist of, glass or a polymer, in particular glass, polyethylene terephthalate (PET), polyethylene naphthalate (PEN), polyvinylbutyral (PVB), polymethyl methacrylate (PMMA), polycarbonate (PC), polyimide (PI), COP (cyclic olefin polymers) or TAC (triacetylcellulose). In a particularly preferred embodiment glass substrates are used.

Electrical switching in accordance with the invention is achieved by providing the substrates, e.g. glass substrates or plastic substrates, with first and second electrodes. Preferably, electrically conductive layers are provided on the substrates, wherein the conductive layers comprise or are formed of a transparent conductive material, e.g. a transparent conductive oxide, preferably indium tin oxide (ITO), $SnO_2$:F or doped zinc oxide, in particular ITO, or a conductive polymer such as poly(3,4-ethylenedioxythiophene) (PEDOT), poly(3,4-ethylenedioxythiophene) polystyrene sulfonate (PEDOT:PSS) or poly(4,4-dioctyl cyclopentadithiophene), or a thin transparent metal and/or metal oxide layer, for example silver. It is preferred that the transparent conductive material is a transparent conductive oxide, more preferably indium tin oxide. The transparent electrode is preferably applied to the substrate by a coating process. For example, ITO may be sputtered to typically obtain a layer thickness in the range of from 5 nm to 250 nm or a sheet resistance in the range of from 5Ω/□ to 500Ω/□.

The electrically conductive layers are preferably provided with electrical connections, in particular busbars. The voltage is preferably supplied by a battery, a rechargeable battery, a supercapacitor or an external current source, more preferably by an external current source. In this respect, bonding of a terminal to a busbar may be achieved by soldering, welding, or use of a conductive adhesive or a conductive film. In particular, anisotropic conductive film bonding may be used to bond a flat cable as a terminal wire to the respective busbar. The terminals may be used to provide a connection to a controller or driver which generates a driving signal for controlling the state of the switchable medium located inside the electro-optical cell. The terminal may, for example, be configured as a terminal wire or a connector for attaching a wire.

It is preferred that the two substrates of the switchable optical device are arranged such that each of the substrates has at least one region which does not overlap with the other substrate. These non-overlapping regions thus can provide access to the respective transparent electrode and the busbars may be conveniently placed in these non-overlapping regions. The non-overlapping region is preferably an offset between the first and second substrate which is in the range of from 1 mm to 20 mm, preferably from 2 mm to 10 mm and for example about 4 mm.

The liquid crystalline medium may be included in the electro-optical cell in a suitable manner, for example using vacuum filling or one drop filling. Typically, frame sealants or respectively edge sealants are provided to close the cell or respectively contain the medium. Examples of suitable materials for sealing of the cell include epoxy-based sealants, polyurethanes, hot melt sealants and acrylates.

In the window element and in particular in the switchable optical cell the switchable layer preferably has a thickness of at least 5 µm, more preferably of at least 7 µm, even more preferably of at least 10 µm, still more preferably of at least 15 µm and particularly preferably of at least 20 µm. In an embodiment the switchable layer comprising the liquid crystalline medium has a thickness in the range of from 5 µm to 100 µm, more preferably from 10 µm to 50 µm, and in particular from 15 µm to 25 µm.

To maintain a proper thickness of the switching layer, spacers may be included within the cell gap of the switching layer. Typically, the spacers have a spherical shape with a diameter in the range of the cell gap. For example, non-conductive spacers having a spherical shape with a predetermined diameter made of polymer or glass may be used. In some embodiments it may be useful to provide sticky spacers, i.e. spacers which have some intrinsic adhesive characteristic to better adhere to the surface. It may also be useful to use black spacers, e.g. to avoid or minimize undesired light leakage. It can be especially beneficial to use spacers which are black and sticky. Alternatively, the cell thickness may be set or maintained by other suitable means, e.g. by using column spacers. The column spacers may also be formed to give compartments, thus optionally allowing for free-cuttable structures.

Herein, the terms film and layer include rigid or flexible, self-supporting or freestanding films or layers with more or less pronounced mechanical stability, as well as coatings or layers on a supporting substrate or between two substrates.

It is also possible to provide passivation or barrier layers on the substrates, e.g. passivation layers comprising silicon oxide or silicon nitride, preferably consisting of silicon oxide or silicon nitride. In this case a passivation layer is arranged on a substrate such that the alignment layer is topmost, i.e. is contacting the LC medium.

It is preferred that the transparent conductive electrode layers are respectively embedded between two transparent dielectric layers. Therefore, according to a particularly preferred embodiment in the optical device a liquid crystalline medium is provided in a switchable layer, wherein the switchable layer is sandwiched between and in direct contact with a first alignment layer and a second alignment layer, and wherein the electrodes are respectively arranged on a passivation layer and in particular are embedded between two transparent dielectric layers.

Preferably, the liquid crystalline medium contains one or more dichroic dyes.

Herein, a dichroic dye is taken to mean a light-absorbing compound in which the absorption properties are dependent on the orientation of the compound relative to the direction of polarisation of the light. A dichroic dye compound in accordance with the present invention typically has an elongated shape, i.e. the compound is significantly longer in one spatial direction, i.e. along the longitudinal axis, than in the other two spatial directions. The dichroic dye absorbs, or respectively preferentially absorbs, light in one orientation so that light transmission may be modulated by changing the orientation of the dichroic dye.

It is thus possible to use guest-host liquid crystal cells which are based on a liquid crystal host which is doped with dichroic dye molecules, wherein these guest-host systems can be used without any polarizers to alter the light transmission.

Each of the one or more dichroic dyes is preferably present in the liquid crystalline medium in a proportion of 0.005% by weight to 12.5% by weight, more preferably 0.01% by weight to 10% by weight, even more preferably 0.025% by weight to 7.5% by weight, yet even more preferably 0.05% by weight to 5% by weight, still even more preferably 0.1% by weight to 2.5% by weight and particularly preferably 0.25% by weight to 1% by weight, based on the overall weight of the entire medium.

Preferably, the one or more dichroic dyes are present in the liquid crystalline medium overall in a total concentration which is in the range of 0.01% by weight to 30% by weight, more preferably 0.025% by weight to 25% by weight, even more preferably 0.05% by weight to 15% by weight, still even more preferably 0.1% by weight to 10% by weight and particularly preferably 0.5% by weight to 5% by weight.

The concentration of the dye(s) is preferably chosen such that the proper performance of the obtained modulation material is ensured, in particular in terms of the desired colour and/or dimming effects.

Dichroic dyes may preferably be selected from for example azo dyes, anthraquinones, thiophenolanthraquinones, methine compounds, azomethine compounds, merocyanine compounds, naphthoquinones, tetrazines, pyrromethene dyes, malononitrile dyes, nickel dithiolenes, (metal) phthalocyanines, (metal) naphthalocyanines and (metal) porphyrins, rylenes, in particular perylenes and terylenes, thiadiazole dyes, thienothiadiazole dyes, benzothiadiazoles, thiadiazoloquinoxalines, and diketopyrrolopyrroles. Particular preference is given to azo compounds, anthraquinones, thiophenolanthraquinones, benzothiadiazoles, in particular as described in WO 2014/187529, diketopyrrolopyrroles, in particular as described in WO 2015/090497, thiadiazoloquinoxalines, in particular as described in WO 2016/177449, and rylenes, in particular as described in WO 2014/090373.

The liquid crystalline medium preferably comprises one, two, three, four, five, six, seven, eight, nine or ten different dichroic dyes, particularly preferably two or three dichroic dyes.

In an embodiment the absorption spectra of the dichroic dyes optionally contained in the medium or respectively the switchable layer preferably complement one another in such a way that the impression of a black colour arises for the eye. Preferably two or more, more preferably three or more dichroic dyes are used in the liquid crystalline medium to preferably cover a large part of the visible spectrum. The precise way in which a mixture of dyes which appears black or grey to the eye can be prepared is known in the art and is described, for example, in M. Richter, Einführung in die Farbmetrik [Introduction to Colorimetry], 2nd Edition, 1981, ISBN 3-11-008209-8, Walter de Gruyter & Co.

In another embodiment the setting of a different colour is performed, e.g. red, green or blue.

The setting of the colour location of a mixture of dyes is described in the area of colorimetry. To this end, the spectra of the individual dyes are calculated taking into account the Lambert-Beer law to give an overall spectrum and converted into the corresponding colour locations and luminance values under the associated illumination, for example illuminant D65 for daylight, in accordance with the rules of colorimetry. The position of the white point is fixed by the respective illuminant, for example D65, and is quoted in tables, for example in the reference above. Different colour locations can be set by changing the proportions of the various dyes.

In a preferred embodiment three or more different dichroic dyes are comprised in the liquid crystalline medium.

According to a preferred embodiment, the medium and the switchable layer comprise one or more dichroic dyes which absorb light in the red and NIR region, i.e. at a wavelength of 600 nm to 2000 nm, preferably in the range from 600 nm to 1800 nm, particularly preferably in the range from 650 nm to 1300 nm.

In an embodiment the dichroic dyes which may be provided in the medium and the switchable layer are preferably selected from the dye classes indicated in B. Bahadur, Liquid Crystals—Applications and Uses, Vol. 3, 1992, World Scientific Publishing, Section 11.2.1, and particularly preferably from the explicit compounds given in the table present therein.

Said dyes belong to the classes of dichroic dyes which are known in the art and have been described in the literature. Thus, for example, anthraquinone dyes are described in EP 34832, EP 44893, EP 48583, EP 54217, EP 56492, EP 59036, GB 2065158, GB 2065695, GB 2081736, GB 2082196, GB 2094822, GB 2094825, JP-A 55-123673, DE 3017877, DE 3040102, DE 3115147, DE 3115762, DE 3150803 and DE 3201120, naphthoquinone dyes are described in DE 3126108 and DE 3202761, azo dyes in EP 43904, DE 3123519, WO 82/2054, GB 2079770, JP-A 56-57850, JP-A 56-104984, U.S. Pat. Nos. 4,308,161, 4,308,162, 4,340,973, T. Uchida, C. Shishido, H. Seki and M. Wada: Mol. Cryst. Liq. Cryst. 39, 39-52 (1977), and H. Seki, C. Shishido, S. Yasui and T. Uchida: Jpn. J. Appl. Phys. 21, 191-192 (1982), and perylenes are described in EP 60895, EP 68427 and WO 82/1191. Rylene dyes as described, for example, in EP 2166040, US 2011/0042651, EP 68427, EP 47027, EP 60895, DE 3110960 and EP 698649.

The switchable optical device may include further functional layers such as, for example, a UV blocking layer and/or colour filters.

The optical cell and the window element are preferably characterised in that they do not comprise a polymer-based polarizer, particularly preferably do not comprise a polarizer in the solid material phase and very particularly preferably do not comprise a polarizer at all. Therefore, in a particularly preferred embodiment the device, in particular the window element, does not include a polarizer.

However, in accordance with an alternative embodiment, the device may also comprise one or more polarizers. Therefore, in an embodiment at least one polarization layer and optionally at least one retardation layer is provided in the optical device. The polarizers in this case are preferably linear polarizers. Both absorptive and also reflective polarizers can optionally be employed. Preference is given to the use of polarizers which are in the form of thin optical films.

Therefore, in addition or alternatively to the provision of one or more dichroic dyes in the liquid crystalline medium, it is possible to provide a window element in which the switchable optical cell further comprises one or more polarizer layers and optionally one or more optical retarder layers.

In a particular alternative it is preferred that the device includes only one polarizer. If precisely one polarizer is present, the Heilmeier-type guest-host arrangement is preferably used. In another alternative, liquid crystal cells with two polarizers, preferably in the absence of any dichroic dyes in the liquid crystalline medium, are used to control the light transmission.

According to the invention in the optical cell first and second alignment layers are provided which are in direct contact with the liquid crystalline medium.

It has been found that the unwanted inhomogeneities upon electrical switching may already be significantly reduced even in a case where the pretilt angle in the range of from 77° to 88° is set only at one of the first alignment layer and the second alignment layer. However, preferably the pretilt angle in the range of from 77° to 88° is set by both the first alignment layer and the second alignment layer. This way an even stronger reduction of the effect may be achieved.

According to the invention the pretilt angle is controlled and set by at least one alignment layer and preferably by both alignment layers in the range of from 77° to 88°, more preferably in the range of from 79° to 87.5°, even more preferably in the range of from 81° to 87° and in particular in the range of from 84° to 86°. It has surprisingly been found that the control of the pretilt angle as defined can lessen and shorten the occurrence of the inhomogeneities while furthermore providing sufficient contrast and suitable transmittance in the optical states.

As used herein, pretilt angle will be understood to mean a tilted alignment of the LC molecules of an LC medium relative to the surfaces of the optical cell. In particular, the pretilt angle here denotes the average angle (<90°) between the longitudinal molecular axes of the LC molecules (LC director) and the surface of the plane-parallel outer plates which form the cell. A suitable method for measurement of the pretilt angle is based on Mueller matrix polarimetry and is given in the Examples. Unless indicated otherwise, pretilt angle values disclosed above and below relate to this measurement method.

In principle the first alignment layer and the second alignment layer may be formed based on conventional materials and methods, wherein the alignment layers are provided to effect a homeotropic edge alignment.

Preferably, the first alignment layer and the second alignment layer comprise an organic material, more preferably consist of an organic material, wherein in particular the organic material is rubbed, especially mechanically rubbed, or phototreated, especially photoaligned. For example, organic materials such as lecithin and in particular polyimide may be used.

Preferably the first alignment layer and the second alignment layer are polyimide-based layers. Therefore, in a preferred embodiment the alignment layers comprise polyimide, more preferably consist of polyimide. It is also possible to use or to include chemically modified or enhanced polyimide, e.g. azobenzene-containing polyimide. The alignment layers preferably comprising a polyimide may also be rubbed, or may be prepared by a photoalignment method.

The alignment layers, preferably polyimide layers, are arranged such that they provide, in particular at the interface, homeotropic orientation of the molecules of the liquid crystalline medium, in particular setting the pretilt angle as herein defined. In a particularly preferred embodiment rubbed polyimide layers are used on both substrates.

It is also possible to use polyimide layers prepared by photoalignment, utilizing a light-induced orientational ordering of the alignment surface. This can be achieved through photodecomposition, photodimerisation or photoisomerisation by means of polarized light.

The switchable layer is a homeotropically or vertically aligned liquid crystalline layer. The molecules of the liquid crystalline medium having the predetermined pretilt angle are aligned close to perpendicular to the substrate surface. The liquid crystalline medium thus preferably has a negative dielectric anisotropy $\Delta\varepsilon$, i.e. perpendicular to the electric field. The medium is therefore switchable into a parallel orientation to the plane of the layer structure by the application of an electric field that is perpendicular to the plane.

Examples for suitable liquid crystalline media having a negative dielectric anisotropy are given in EP 1 378 558 A1. For example, the liquid crystal mixture ZLI-2806 from Merck may be used. The liquid crystalline medium may include additives. In particular, the liquid crystalline medium preferably includes an antioxidant or a stabilizer in a concentration of at least 5 ppm.

Above and below, $\Delta n$ denotes the optical anisotropy, wherein $\Delta n=n_e-n_o$, and wherein preferably the optical anisotropy $\Delta n$ is determined at 20° C. and at a wavelength of 589.3 nm. The liquid crystalline medium preferably has an optical anisotropy $\Delta n$ in the range of from 0.03 to 0.30, more preferably from 0.04 to 0.27, even more preferably from 0.06 to 0.21 and in particular from 0.09 to 0.16.

Above and below, $\Delta\varepsilon$ denotes the dielectric anisotropy, wherein $\Delta\varepsilon=\varepsilon_{\parallel}-\varepsilon_{\perp}$. The dielectric anisotropy $\Delta\varepsilon$ is preferably determined at 20° C. and 1 kHz. The liquid crystalline medium preferably has a dielectric anisotropy $\Delta\varepsilon$ in the range of from −0.5 to −20, preferably from −1.5 to −10, and in particular from −3 to −6.

All physical properties and physicochemical or electro-optical parameters are determined by generally known methods, in particular according to "Merck Liquid Crystals, Physical Properties of Liquid Crystals", Status November 1997, Merck KGaA, Germany and are given for a temperature of 20° C., unless explicitly stated otherwise.

Herein, unless explicitly stated otherwise, all concentrations are given in weight percent and relate to the respective complete mixture.

Transmission and scattering of light preferably refer to the transmission and scattering of electromagnetic radiation in the spectral range from 380 nm to 780 nm.

The liquid crystalline medium of the switchable layer preferably has a nematic phase at the operating temperature of the switchable window element. It is particularly preferably nematically liquid crystalline in a range of +/−20° C., very particularly preferably in a range of +/−30° C. above and below the operating temperature of the window element. The operating temperature of the switchable window element is preferably from −20° C. to 70° C.

The liquid crystalline medium preferably has a clearing point, preferably a phase transition from a nematic liquid crystalline state to an isotropic state, of at least 70° C., preferably above 80° C., more preferably above 100° C., particularly preferably above 105° C., very particularly preferably above 110° C., and most preferably above 115° C. In an embodiment the liquid crystalline medium as used in the present invention preferably has a clearing point in the temperature range from 70° C. to 170° C., more preferably from 80° C. to 160° C., even more preferably from 90° C. to 150° C. and in particular from 100° C. to 140° C.

The clearing point marks the temperature at which a phase transition from a nematically liquid crystalline state to an isotropic state occurs. The clearing point, in particular the phase transition temperature between the nematic phase and the isotropic phase, can be measured and determined by commonly known methods, e.g. using a Mettler oven or a hot-stage under a polarizing microscope, and herein preferably is determined using a Mettler oven.

In addition, the liquid crystalline media preferably exhibit a favourable low temperature stability without visible crystallisation or decomposition, in particular a long shelf life of more than 200 hours measured in bulk at −40° C.

Preferably the liquid crystalline medium comprises one or more compounds selected from the group of compounds of the formulae CY, PY and AC

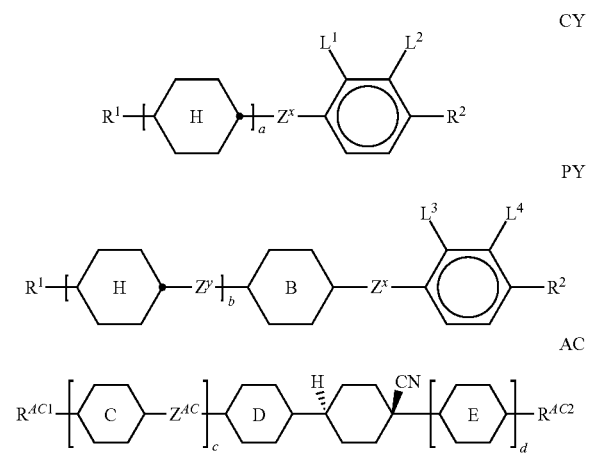

wherein a denotes 1 or 2, b denotes 0 or 1, c denotes 0, 1 or 2, d denotes 0 or 1,

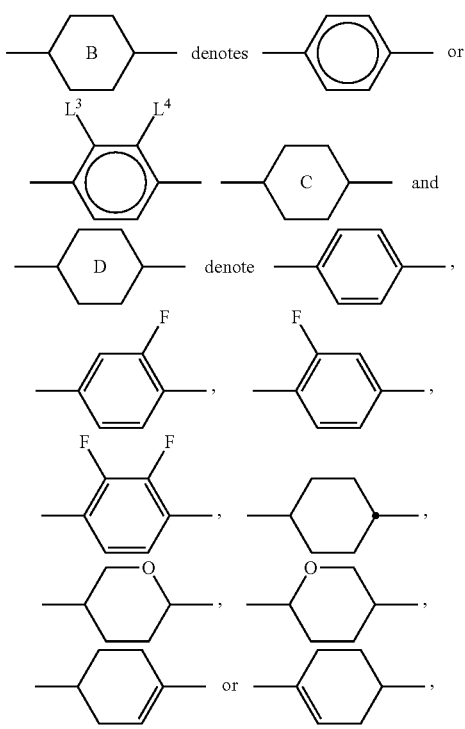

-continued

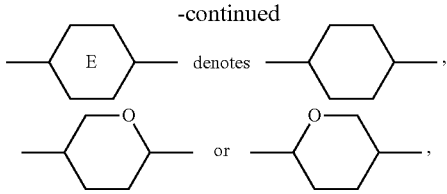

$R^1$, $R^2$, $R^{AC1}$ and $R^{AC2}$ each, independently of one another, denote alkyl having 1 to 12 C atoms, where, in addition, one or two non-adjacent CH₂ groups may be replaced by

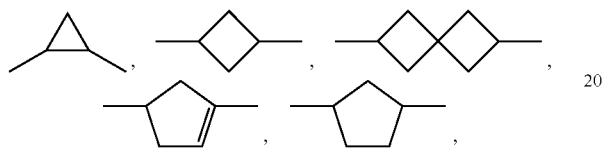

—O—, —CH=CH—, —CO—, —OCO— or —COO— in such a way that O atoms are not linked directly to one another, preferably alkyl or alkoxy having 1 to 6 C atoms, $Z^x$, $Z^y$ and $Z^{AC}$ each, independently of one another, denote —CH₂CH₂—, —CH=CH—, —CF₂O—, —OCF₂—, —CH₂O—, —OCH₂—, —CO—O—, —O—CO—, —C₂F₄—, —CF=CF—, —CH=CH—CH₂O— or a single bond, preferably a single bond, and $L^{1-4}$ each, independently of one another, denote F, Cl, CN, OCF₃, CF₃, CH₃, CH₂F or CHF₂, preferably F.

Preferably, both $L^1$ and $L^2$ denote F or one of $L^1$ and $L^2$ denotes F and the other denotes Cl, and both $L^3$ and $L^4$ denote F or one of $L^3$ and $L^4$ denotes F and the other denotes Cl.

In an embodiment one or more of the groups $R^1$, $R^2$, $R^{AC1}$ and $R^{AC2}$ denote cyclic alkyl, in particular selected from cyclopropyl, cyclobutyl and cyclopentyl.

Herein

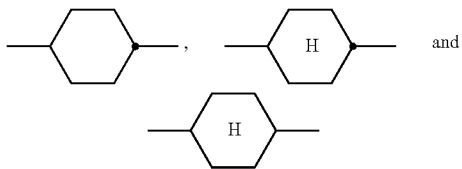

denote trans-1,4-cyclohexylene.

It is particularly preferred that the liquid crystalline medium as used according to the invention contains the one or more compounds selected from the compounds of the formulae CY, PY and AC in an amount, based on the overall contents of the medium, of at least 5% by weight, more preferably at least 10% by weight, even more preferably at least 15% by weight, still more preferably at least 25% by weight, yet more preferably at least 35% by weight and particularly preferably at least 50% by weight.

The compounds of the formula CY are preferably selected from the group of compounds of the following formulae:

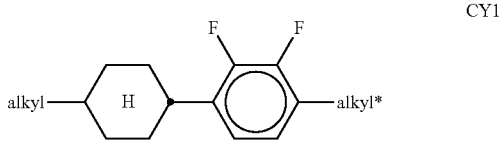
CY1

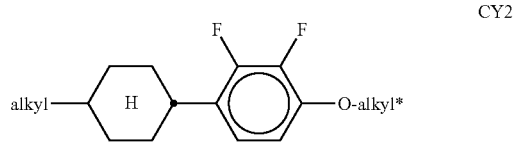
CY2

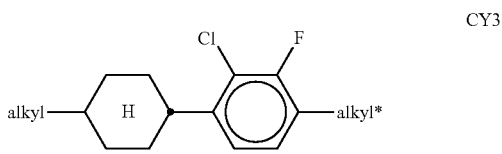
CY3

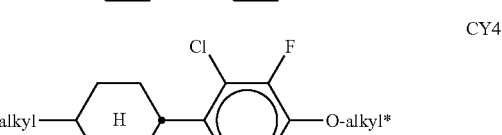
CY4

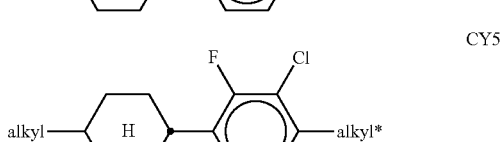
CY5

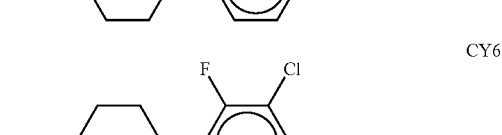
CY6

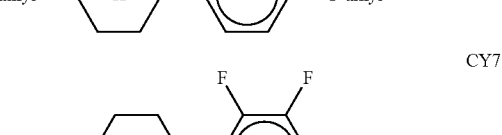
CY7

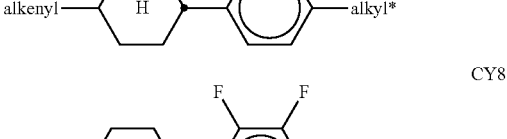
CY8

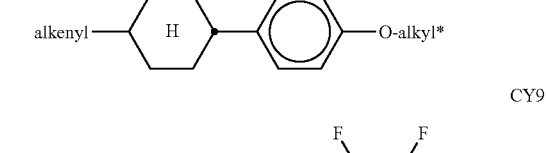
CY9

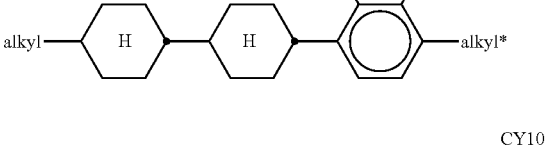
CY10

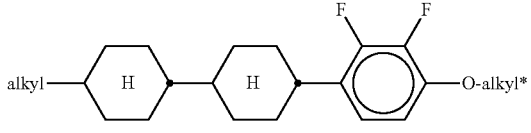

CY11 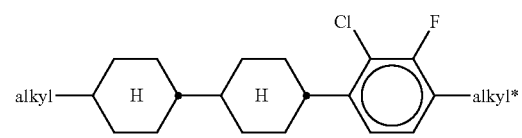
CY12 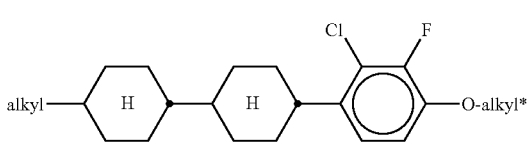
CY13 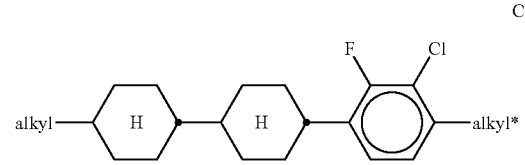
CY14 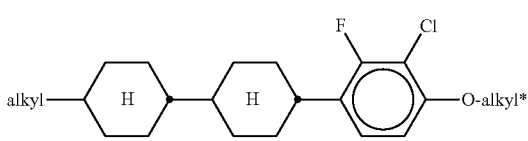
CY15 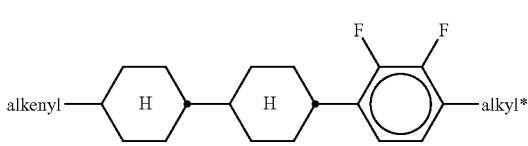
CY16 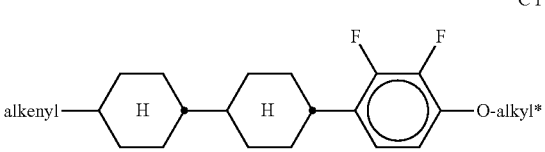
CY17 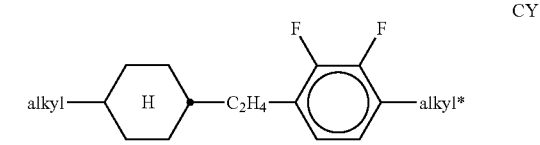
CY18 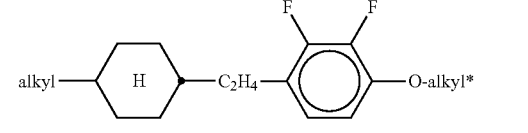
CY19 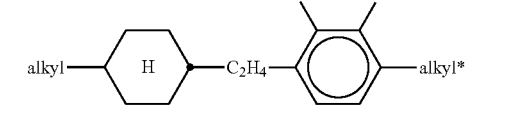
CY20 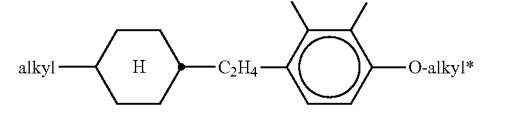
CY21 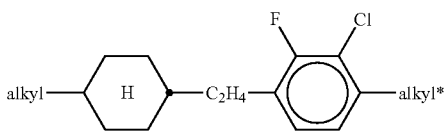
CY22 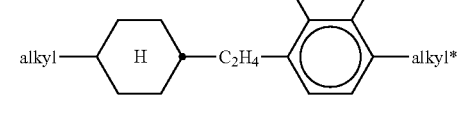
CY23 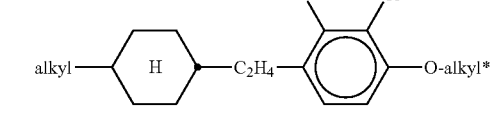
CY24 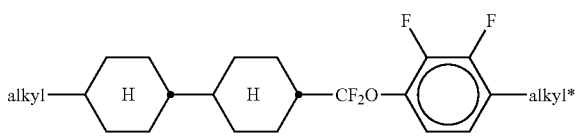
CY25 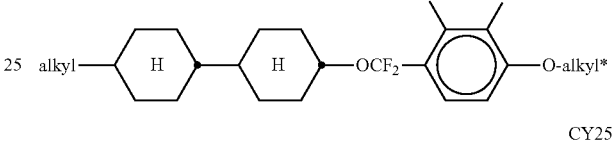
CY26 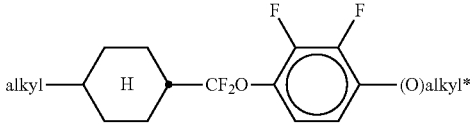
CY27 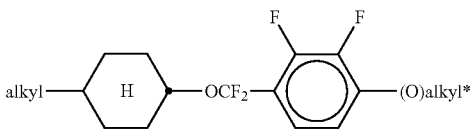
CY28 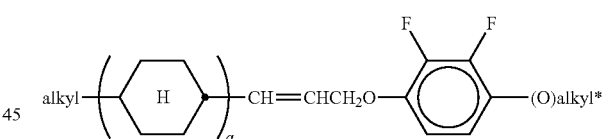
CY29 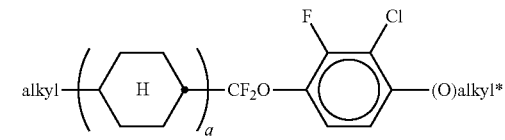
CY30 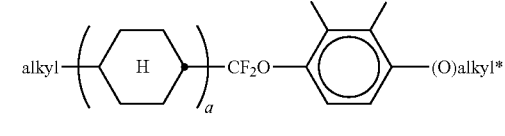
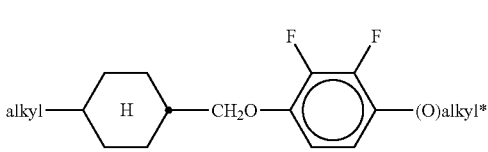

-continued

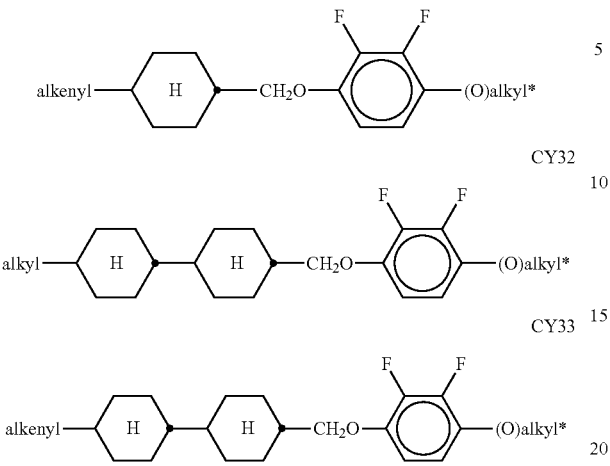

wherein a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

In another embodiment compounds of the formula CY are additionally or alternatively selected from the group of compounds of the following formulae:

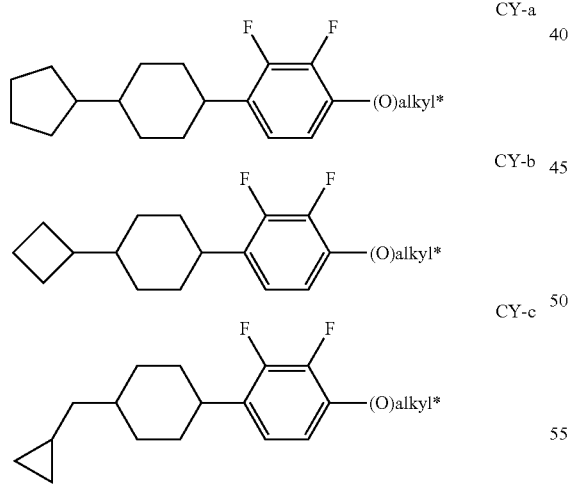

wherein alkyl* each, independently of one another, denotes a straight-chain alkyl radical having 1-6 C atoms, and (O) denotes an oxygen atom or a single bond.

In a particular embodiment a compound CY-a-1 is included in the medium, wherein the compound CY-a-1 corresponds to the compound of formula CY-a in which (O)alkyl* is ethoxy.

The compounds of the formula PY are preferably selected from the group of compounds of the following formulae:

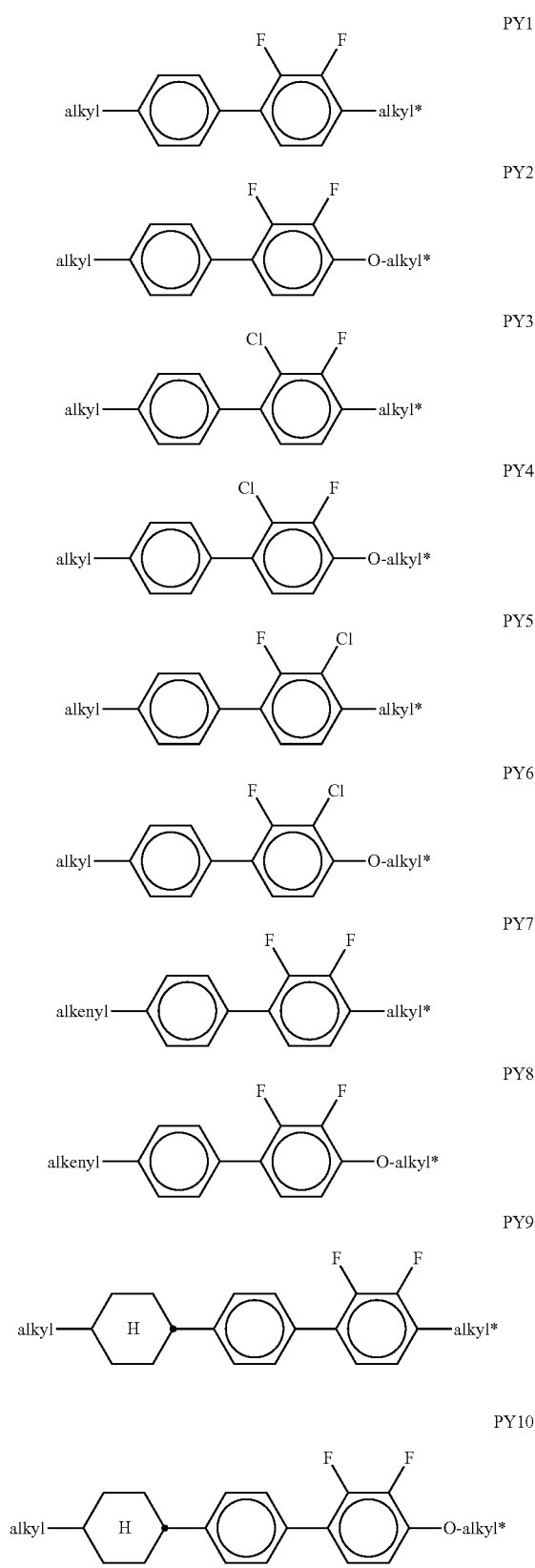

PY11
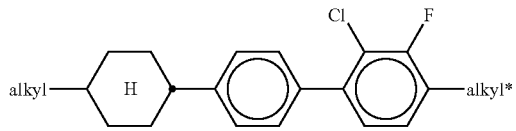

PY12
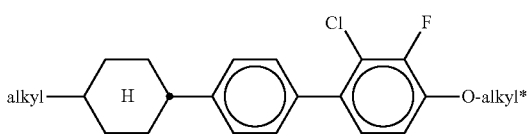

PY13
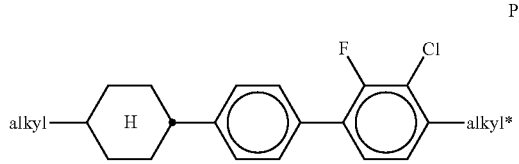

PY14
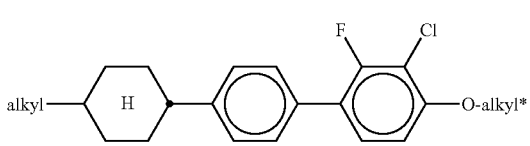

CPY15
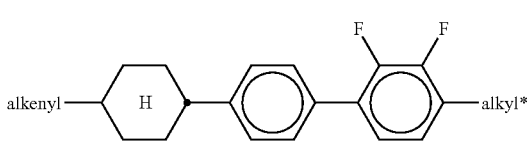

PY16
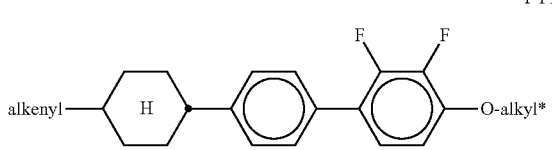

PY17
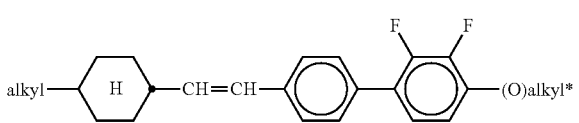

PY18
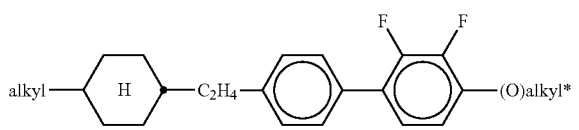

PY19
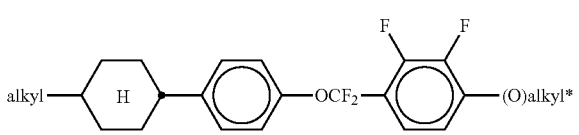

PY20
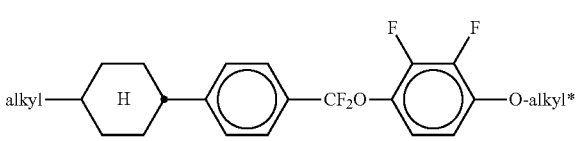

PY21
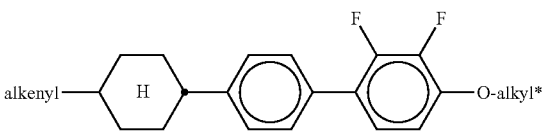

wherein alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

The compounds of the formula AC are preferably selected from the group of compounds of the following formulae:

AC1
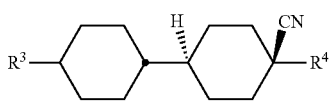

AC2
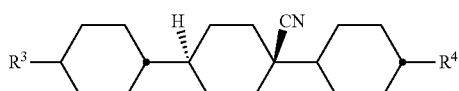

AC3
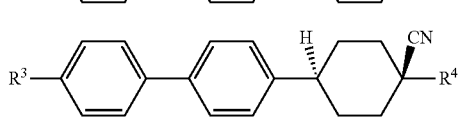

wherein R3 and R4 have the meanings of R$^{AC1}$ and R$^{AC2}$ as set forth above.

The mesogenic compounds described above and below are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here in greater detail. The media according to the invention are prepared in a manner conventional per se. In general, the components are dissolved in one another, preferably at elevated temperature. Suitable additives or substances can be added to modify the dielectric anisotropy, the viscosity and/or the alignment of the liquid-crystalline phases.

The term "alkyl" according to the present invention preferably encompasses straight-chain and branched alkyl groups having 1 to 7 carbon atoms, particularly the straight-chain groups methyl, ethyl, propyl, butyl, pentyl, hexyl and heptyl. Groups having 2 to 5 carbon atoms are generally preferred.

An alkoxy can be straight-chain or branched, and it preferably is straight-chain and has 1, 2, 3, 4, 5, 6 or 7 carbon atoms, and accordingly is preferably methoxy, ethoxy, propoxy, butoxy, pentoxy, hexoxy or heptoxy.

The term "alkenyl" according to the present invention preferably encompasses straight-chain and branched alkenyl groups having 2-7 carbon atoms, in particular the straight-chain groups. Particularly preferred alkenyl groups are $C_2$-$C_7$-1E-alkenyl, $C_4$-$C_7$-3E-alkenyl, $C_5$-$C_7$-4E-alkenyl, $C_6$-$C_7$-5E-alkenyl and $C_7$-6E-alkenyl, in particular $C_2$-$C_7$-1E-alkenyl, $C_4$-$C_7$-3E-alkenyl and $C_5$-$C_7$-4E-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. Groups having up to 5 carbon atoms are generally preferred.

Fluorinated alkyl or alkoxy preferably comprises $CF_3$, $OCF_3$, $CFH_2$, $OCFH_2$, $CF_2H$, $OCF_2H$, $C_2F_5$, $OC_2F_5$, $CFHCF_3$, $CFHCF_2H$, $CFHCFH_2$, $CH_2CF_3$, $CH_2CF_2H$, $CH_2CFH_2$, $CF_2CF_2H$, $CF_2CFH_2$, $OCFHCF_3$, $OCFHCF_2H$, $OCFHCFH_2$, $OCH_2CF_3$, $OCH_2CF_2H$, $OCH_2CFH_2$, $OCF_2CF_2H$, $OCF_2CFH_2$, $C_3F_7$ or $OC_3F_7$, in particular $CF_3$, $OCF_3$, $CF_2H$, $OCF_2H$, $C_2F_5$, $OC_2F_5$, $CFHCF_3$, $CFHCF_2H$, $CFHCFH_2$, $CF_2CF_2H$, $CF_2CFH_2$, $OCFHCF_3$, $OCFHCF_2H$, $OCFHCFH_2$, $OCF_2CF_2H$, $OCF_2CFH_2$, $C_3F_7$ or $OC_3F_7$, particularly preferably $OCF_3$ or $OCF_2H$. Fluoroalkyl in a preferred embodiment encompasses straight-chain groups with terminal fluorine, i.e. fluoromethyl, 2-fluoroethyl, 3-fluoropropyl, 4-fluorobutyl, 5-fluoropentyl, 6-fluorohexyl and 7-fluoroheptyl. Other positions of fluorine are not precluded, however.

Oxaalkyl preferably encompasses straight-chain groups of the formula $C_nH_{2n+1}$—O—$(CH_2)_m$, where n and m are each, independently of one another, from 1 to 6. Preferably, n=1 and m is 1 to 6.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

Halogen is preferably F or Cl, in particular F.

If one of the above mentioned groups is an alkyl group in which one $CH_2$ group has been replaced by —CH═CH—, this can be straight-chain or branched. It is preferably straight-chain and has 2 to 10 carbon atoms. Accordingly, it is in particular vinyl, prop-1- or prop-2-enyl, but-1-, -2- or but-3-enyl, pent-1-, -2-, -3- or pent-4-enyl, hex-1-, -2-, -3-, -4- or hex-5-enyl, hept-1-, -2-, -3-, -4-, -5- or hept-6-enyl, oct-1-, -2-, -3-, -4-, -5-, -6- or oct-7-enyl, non-1-, -2-, -3-, -4-, -5-, -6-, -7- or non-8-enyl, dec-1-, -2-, -3-, -4-, -5-, -6-, -7-, -8- or dec-9-enyl.

If one of the above mentioned groups is an alkyl group in which one $CH_2$ group has been replaced by —O— and one has been replaced by —CO—, these are preferably adjacent. These thus contain an acyloxy group —CO—O— or an oxycarbonyl group —O—CO—. These are preferably straight-chain and have 2 to 6 carbon atoms.

They are accordingly in particular acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxy-carbonyl)propyl, 3-(ethoxycarbonyl)propyl or 4-(methoxycarbonyl)butyl.

If one of the above mentioned groups is an alkyl group in which one $CH_2$ group has been replaced by unsubstituted or substituted —CH═CH— and an adjacent $CH_2$ group has been replaced by CO, CO—O or O—CO, this can be straight-chain or branched. It is preferably straight-chain and has 4 to 13 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxy-octyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If one of the above mentioned groups is an alkyl or alkenyl group which is monosubstituted by CN or $CF_3$, this group is preferably straight-chain. The substitution by CN or $CF_3$ is in any position.

If one of the above mentioned groups is an alkyl or alkenyl group which is at least monosubstituted by halogen, this group is preferably straight-chain and halogen is preferably F or Cl, more preferably F. In the case of polysubstitution, halogen is preferably F. The resulting groups also include perfluorinated groups. In the case of monosubstitution, the fluoro or chloro substituent can be in any desired position, but is preferably in the ω-position.

Compounds containing branched groups may occasionally be of importance owing to better solubility in some conventional liquid-crystalline base materials. However, they are particularly suitable as chiral dopants if they are optically active.

Branched groups of this type generally contain not more than one chain branch. Preferred branched groups are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy or 1-methylheptoxy.

If one of the above mentioned groups is an alkyl group in which two or more $CH_2$ groups have been replaced by —O— and/or —CO—O—, this can be straight-chain or branched. It is preferably branched and has 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-bis-carboxynonyl, 10,10-biscarboxydecyl, bis(methoxycarbonyl)methyl, 2,2-bis-(methoxycarbonyl)ethyl, 3,3-bis(methoxycarbonyl)propyl, 4,4-bis(methoxy-carbonyl)butyl, 5,5-bis(methoxycarbonyl)pentyl, 6,6-bis(methoxycarbonyl)-hexyl, 7,7-bis(methoxycarbonyl)heptyl, 8,8-bis(methoxycarbonyl)octyl, bis-(ethoxycarbonyl)methyl, 2,2-bis(ethoxycarbonyl)ethyl, 3,3-bis(ethoxy-carbonyl)propyl, 4,4-bis(ethoxycarbonyl)butyl or 5,5-bis(ethoxycarbonyl)-pentyl.

In addition to a suitably high optical anisotropy, the liquid crystalline medium comprised in the switchable layer can advantageously exhibit a favourably high voltage holding ratio (VHR) in combination with good light stability and a suitably high clearing point.

In some embodiments it is preferred that in one of the optical states, in particular in the presence of an electric field, the switchable layer has a twisted or supertwisted configuration. It has surprisingly been found that this provision, in addition to setting the pretilt angle as herein defined, can further contribute to lessen and/or shorten the detrimental occurrence of inhomogeneities as described above.

Therefore, the liquid crystalline medium optionally further comprises one or more chiral compounds, in particular one or more chiral dopants.

Chiral compounds and in particular chiral dopants and their concentrations can be provided such that the cholesteric pitch of the liquid crystalline medium may be suitably set or adjusted. The pitch herein means the pitch p of the cholesteric helix, wherein the pitch p is the distance for the orientational axis (director) of the cholesteric liquid crystal to undergo a $2\pi$ rotation. In a preferred embodiment a cholesteric medium is prepared by doping a nematic liquid crystalline medium with a chiral dopant having a high helical twisting power (HTP). It is also possible to use two or more chiral dopants, for example in order to compensate for the temperature dependence of the HTP of the individual dopants and thus to achieve small temperature dependence of the helix pitch.

Therefore, the liquid crystalline medium in the switching layer preferably contains one or more chiral compounds and in particular chiral dopants. The chiral dopants preferably have a moderately high to high absolute value of the HTP and can generally be added in relatively low concentrations to mesogenic base mixtures and have good solubility in the achiral component. If two or more chiral compounds are employed, they may have the same or opposite direction of rotation and the same or opposite temperature dependence of the twist.

Preferably, the one or more chiral compounds optionally contained in the liquid crystalline medium have an absolute value of the helical twisting power of 5 $\mu m^{-1}$ or more, more preferably of 10 $\mu m^{-1}$ or more and even more preferably of 15 $\mu m^{-1}$ or more, preferably in the commercial liquid crystal mixture MLC 6828 from Merck KGaA. Particular preference is given to chiral compounds having an absolute value of the helical twisting power of 20 $\mu m^{-1}$ or more, more preferably of 40 $\mu m^{-1}$ or more, even more preferably of 60 $\mu m^{-1}$ or more, and most preferably in the range of 80 $\mu m^{-1}$ or more to 260 $\mu m^{-1}$ or less, preferably in the commercial liquid crystal mixture MLC 6828 from Merck KGaA.

Preferably the one or more chiral compounds are contained in the liquid crystalline medium in an amount, based on the overall contents of the medium, of 2% by weight or less, more preferably 1% by weight or less.

Suitable chiral dopants are known in the art, some of which are commercially available, such as, for example, cholesteryl nonanoate, R/S-811, R/S-1011, R/S-2011, R/S-3011, R/S-4011, R/S-5011, B(OC)2C*H—C-3 or CB15 (all Merck KGaA, Darmstadt, Germany).

Particularly suitable chiral dopants are compounds which contain one or more chiral radicals and one or more mesogenic groups, or one or more aromatic or alicyclic groups which form a mesogenic group with the chiral radical. In a particularly preferred embodiment of the present invention, the liquid crystalline media comprise one or more compounds selected from the compounds shown in Table F below.

In some embodiments the layer thickness d of the switchable layer is purposively set in relation to the pitch p of the medium, where the ratio d/p is preferably in the range of from 0 to 1 and particularly preferably is 0.25 or approximately 0.25. In some cases it is particularly preferred that the ratio d/p is 0.66 or approximately 0.66.

In a preferred case, the optical state in the presence of an electric field has a twisted nematic (TN) geometry with a twist of 90°. In another preferred case, a supertwisted (STN) configuration, with for example a twist of 240°, may be set, where in this case preferably only a single optical cell is used in the window element.

In a particular embodiment the switchable layer is polymer stabilized. It has surprisingly been found that polymer stabilization can favourably contribute to obtaining and maintaining over time the optical states having the desired alignment and configuration.

In this respect, preferably one or more polymerizable, curable or hardenable compounds are provided in the liquid crystalline medium, preferably one or more photocurable monomers, as the precursors for the polymeric component used for polymer stabilization and these reactive compounds are subsequently polymerised in situ.

Therefore, in an embodiment one or more polymerizable compounds are comprised in the liquid crystalline medium as the precursors for the polymer used for polymer stabilizazion. Preferably, the one or more polymerizable compounds are chosen such that they have a suitable and sufficient solubility in the LC medium. In an embodiment polymerizable mesogenic or liquid crystalline compounds, also known as reactive mesogens (RMs) or mesogenic monomers, are used. These compounds contain a mesogenic group and one or more polymerizable groups, i.e. functional groups which are suitable for polymerization. The RMs can be monoreactive or di- or multireactive. In another embodiment non-mesogenic polymerizable compounds, i.e. compounds that do not contain a mesogenic group, are used.

It is particularly preferred that the polymerizabe compound(s) comprise(s) only reactive mesogen(s), i.e. all the reactive monomers are mesogens. Alternatively, RMs can be provided in combination with one or more non-mesogenic polymerizable compounds.

The polymerizable or reactive group is preferably selected from a vinyl group, an acrylate group, a methacrylate group, a fluoroacrylate group, an oxetane group or an epoxy group, especially preferably an acrylate group or a methacrylate group. Preferably the one or more polymerizable compounds are selected from acrylates, methacrylates, fluoroacrylates and vinyl acetate, wherein the medium more preferably further comprises one or more direactive and/or trireactive polymerizable compounds, preferably selected from diacrylates, dimethacrylates, triacrylates and trimethacrylates.

Suitable and conventionally used thermal initiators or photoinitiators can be added to facilitate the polymerization reaction, for example azo compounds or organic peroxides such as Luperox type initiators. Moreover, suitable conditions for the polymerization and suitable types and amounts of initiators are known in the art and are described in the literature. In case a polymerization initiator is included in the medium, the use of a photoinitiator is preferred.

For example, when polymerizing by means of UV light, a photoinitiator can be used that decomposes under UV irradiation to produce free radicals or ions that start the polymerization reaction. For polymerizing acrylate or methacrylate groups preferably a radical photoinitiator is used. For polymerizing vinyl, epoxide or oxetane groups preferably a cationic photoinitiator is used. It is also possible to use a thermal polymerization initiator that decomposes when heated to produce free radicals or ions that start the polymerization.

In a preferred embodiment, polymerization is carried out by photoirradiation, i.e. with light, preferably UV light.

According to a particularly preferred embodiment no polymerization initiator, in particular no photoinitiator, is used. In certain cases this may improve the VHR and reduce the tendency to produce ions in the switchable layer. This can contribute to obtaining and maintaining a modulation material having good reliability and stability. Therefore, according to a preferred embodiment in the liquid crystalline medium no polymerization initiator is added.

In order to maintain and achieve a good VHR, preferably impurities in the reaction products of the polymerization stabilization are kept at a minimum or are substantially avoided. In particular, residual reactive species and charged contaminants are suitably and preferably kept at a minimum. For example, in case UV polymerization is carried out, in a preferred embodiment light with a comparatively long wavelength which is approaching or even extending into the visible spectrum is used, preferably UV light and light in the range from 340 nm to 410 nm, more preferably UV light from 340 nm to 380 nm, and even more preferably from 360 nm to 380 nm is advantageously used. This way unwanted photodegradation or decomposition of components of the LC medium, and especially of the optionally provided one or more dichroic dyes, may be avoided or at least minimized. In case a photoinitiator is used, the irradiation wavelength and the photoinitiator can be suitably matched or adjusted.

In the preferred case where no photoinitiator is used, the wavelength range of the light may be set such that at least some of the polymerizable compounds can undergo a photoreaction and initiate the polymerization reaction by themselves, while furthermore degradation or decomposition of non-polymerizable components of the LC medium and in particular of the optionally provided one or more dichroic dyes may be avoided or at least minimized. Obtaining and setting of the desired wavelength range can be achieved by conventional methods known in the art, e.g. by using optical filters, in particular edge filters.

Preferably and favourably the polymeric structures for stabilization are prepared in situ. By suitably choosing the one or more polymerizable compounds, in particular polymerizable mesogenic compounds, optionally together with the preferably provided one or more dichroic dyes, and by setting and adjusting the wavelength of the light used in the photopolymerization, inter alia with respect to the absorption characteristics of the dichroic dyes, an efficient and robust method can be provided which gives the desired polymerization and polymeric components in the switchable layer, while furthermore preserving the non-polymerizable components including the dichroic dyes and their performance. In an embodiment the wavelength or respectively the wavelength spectrum of the irradiation light is chosen such that an overlap with the absorption bands of the dichroic dyes is minimized.

Preferably, the one or more polymerizable compounds optionally provided in the liquid crystalline medium for polymer stabilization are contained in an amount, based on the overall contents of the medium, in the range from 0 to 5% by weight, more preferably in the range from 0.1% by weight to 2.5% by weight and particularly preferably in the range from 0.3% by weight to 1% by weight.

Particularly suitable polymerizable compounds are listed in Table G below.

The optical cell and the window element may have different shapes, e.g. square, rectangular, triangular or polygonal. The window element may for example be contained or arranged in a double glazing unit or a triple glazing unit and in particular in insulated glazing units. The window element can suitably and favourably be used in a building or a vehicle.

In addition to the use in exterior faces of buildings, i.e. as part of a façade, the window element may also be used for interior applications in buildings. For example, the window element may serve as a partition or room divider or in a separating wall, especially to provide a privacy mode when desired. For such a privacy mode a very good dark state is desirable in order to efficiently block viewing contact.

It is preferred that the switchable optical cell contains only a single switching layer. In an embodiment of the invention the window element contains precisely one switchable optical cell.

However, in an alternative and particularly preferred embodiment the window element comprises an additional switchable optical cell. In this latter case two switching layers are provided separately or individually in optical cells, which are then combined and configured as a so-called double cell, in particular by bonding using e.g. lamination or an adhesive. In a particularly preferred embodiment the window element comprises a double cell which uses a dichroic dye-doped liquid crystalline medium.

The embodiment in which the window element comprises a double cell which uses a dichroic dye-doped liquid crystalline medium is particularly preferred in cases where a very good dark state is desirable, for example in interior applications which are intended to provide a switchable privacy mode.

Therefore, in addition to the switchable optical cell as set forth above and below the window element preferably comprises a further switchable optical cell, wherein more preferably the further switchable optical cell conforms to said first switchable optical cell.

The window element preferably has an area of at least 100 $cm^2$, more preferably of at least 1600 $cm^2$ and even more preferably of at least 10000 $cm^2$. In addition, it is preferred that the switchable layer is unsegmented or that in the alternative case where the switchable layer is segmented into compartments said compartments each have an area of at least 1 $cm^2$, more preferably of at least 10 $cm^2$ and even more preferably of at least 50 $cm^2$. Compared to conventional liquid crystal displays which exhibit a large multitude of microscopically small pixels, the window element typically comprises extended continuous LC material areas and likewise extended uniform electrode areas. Therefore, typical effects from pixel boundaries and possible cross-influence between neighbouring pixels are insignificant in the case of the window configuration.

In the present invention and especially in the following Examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1-E-alkenyl, each having n, m and l C atoms respectively. Table A lists the codes used for the ring elements of the core structures of the compounds, while Table B shows the linking groups. Table C gives the meanings of the codes for the left-hand or right-hand end groups. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A
| Ring elements | |
|---|---|
| 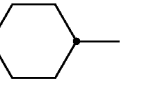 | C |
| 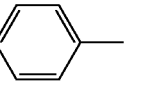 | P |
| 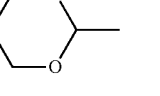 | D |
| 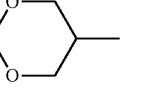 | Dl |
| 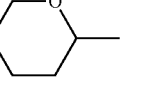 | A |
| 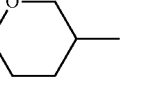 | Al |
| 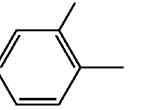 | G |
| 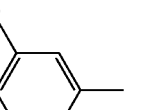 | Gl |
| 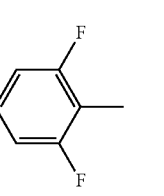 | U |
| 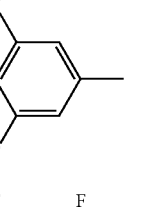 | Ul |
| 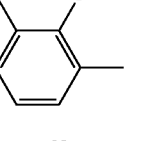 | Y |
| 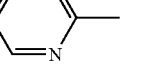 | M |
TABLE A-continued
| Ring elements | |
|---|---|
| 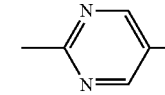 | Ml |
| 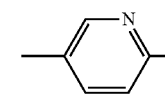 | N |
| 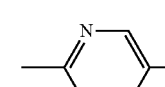 | Nl |
| 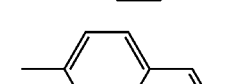 | Np |
| 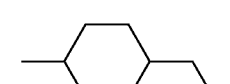 | dH |
| 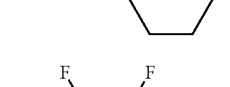 | N3f |
| 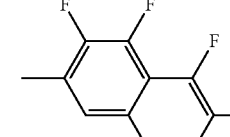 | N3fl |
| 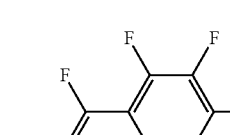 | tH |
| 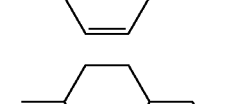 | tHl |
| 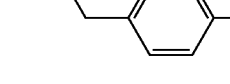 | tH2f |
| 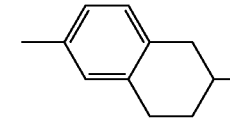 | tH2fl |

TABLE A-continued

Ring elements

| Structure | Code |
|---|---|
| (indane with F,F,F and methyl groups) | K |
| (indane with F,F,F and methyl groups, alternate) | Kl |
| (cyclohexene, 1,4-dimethyl) | L |
| (cyclohexene, 1,4-dimethyl alt) | Ll |
| (cyclohexene with F) | F |
| (cyclohexene with F, dimethyl) | Fl |
| (fluoropyridine) | Nf |
| (fluoropyridine alt) | Nfl |

TABLE B

Linking groups

| | | | |
|---|---|---|---|
| E | —CH₂CH₂— | Z | —CO—O— |
| V | —CH=CH— | ZI | —O—CO— |
| X | —CF=CH— | O | —CH₂—O— |
| XI | —CH=CF— | OI | —O—CH₂— |
| B | —CF=CF— | Q | —CF₂—O— |
| T | —C≡C— | QI | —O—CF₂— |
| W | —CF₂CF₂— | | |

TABLE C

End groups

| Left-hand side | | Right-hand side | |
|---|---|---|---|
| Used alone | | | |
| -n- | $C_nH_{2n+1}$— | -n | —$C_nH_{2n+1}$ |
| -nO- | $C_nH_{2n+1}$—O— | -On | —O—$C_nH_{2n+1}$ |
| -V- | CH₂=CH— | -V | —CH=CH₂ |
| -nV- | $C_nH_{2n+1}$—CH=CH— | -nV | —$C_nH_{2n}$—CH=CH₂ |
| -Vn- | CH2=CH—$C_nH_{2n+1}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| -N- | N≡C— | -N | —C≡N |
| -S- | S=C=N— | -S | —N=C=S |
| -F- | F— | -F | —F |
| -Cl- | Cl— | -Cl | —Cl |
| -M- | CFH₂— | -M | —CFH₂ |
| -D- | CF₂H— | -D | —CF₂H |
| -T- | CF₃— | -T | —CF₃ |
| -MO- | CFH₂O— | -OM | —OCFH₂ |
| -DO- | CF₂HO— | -OD | —OCF₂H |
| -TO- | CF₃O— | -OT | —OCF₃ |
| -FXO- | CF₂=CH—O— | -OXF | —O—CH=CF₂ |
| -A- | H—C≡C— | -A | —C≡C—H |
| -nA- | $C_nH_{2n+1}$—C≡C— | -An | —C≡C—$C_nH_{2n+1}$ |
| -NA- | N≡C—C≡C— | -AN | —C≡C—C≡N |
| Used together with one another and with others | | | |
| -...A...- | —C≡C— | -...A... | —C≡C— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | wherein n and m each denote integers, and the three dots " . . . " are place-holders for other abbreviations from this table.

The following table shows illustrative structures together with their respective abbreviations. These are shown in order to illustrate the meaning of the rules for the abbreviations. They furthermore represent compounds which may be preferably used.

TABLE D

Illustrative structures

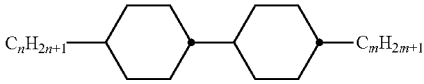

CC-n-m

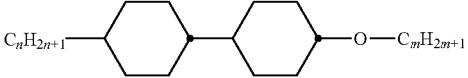

CC-n-Om

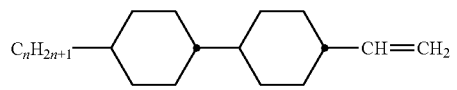

CC-n-V

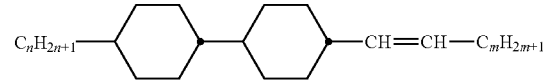

CC-n-Vm

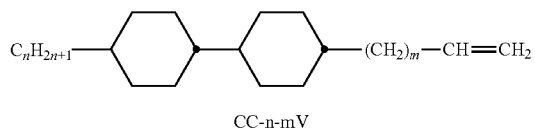

CC-n-mV

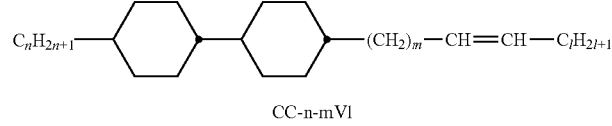

CC-n-mVl

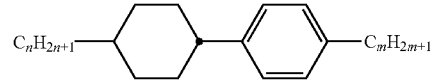

CP-n-m

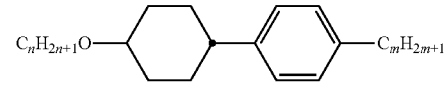

CP-n-Om

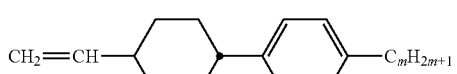

CP-V-m

TABLE D-continued

Illustrative structures

CH₂=CH—(CH₂)$_n$—[cyclohexane]—[benzene]—C$_m$H$_{2m+1}$

CP-Vn-m

C$_n$H$_{2n+1}$—[benzene]—[benzene]—C$_m$H$_{2m+1}$

PP-n-m

C$_n$H$_{2n+1}$O—[benzene]—[benzene]—C$_m$H$_{2m+1}$

PP-n-Om

C$_n$H$_{2n+1}$—[benzene]—[benzene]—OC$_m$H$_{2m+1}$

PP-n-Om

C$_n$H$_{2n+1}$—[benzene]—[benzene]—CH=CH₂

PP-n-V

C$_n$H$_{2n+1}$—[benzene]—[benzene]—CH=CH—C$_m$H$_{2m+1}$

PP-n-Vm

C$_n$H$_{2n+1}$—[benzene]—[benzene]—(C$_m$H$_{2m}$)—CH=CH₂

PP-n-mV

C$_n$H$_{2n+1}$—[cyclohexane]—[cyclohexane]—[benzene]—C$_m$H$_{2m+1}$

CCP-n-m

C$_n$H$_{2n+1}$O—[cyclohexane]—[cyclohexane]—[benzene]—C$_m$H$_{2m+1}$

CCP-nO-m

C$_n$H$_{2n+1}$—[cyclohexane]—[cyclohexane]—[benzene]—OC$_m$H$_{2m+1}$

CCP-n-Om

TABLE D-continued
Illustrative structures
CCP-n-V
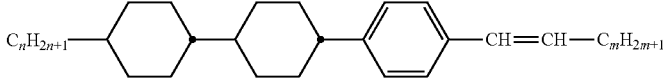
CCP-n-Vm
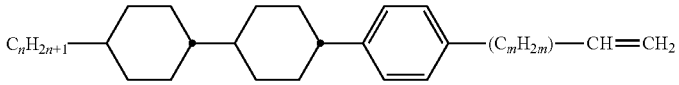
CCP-n-mV
CCP-n-m
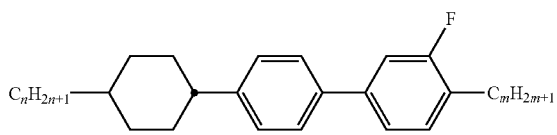
CPG-n-m
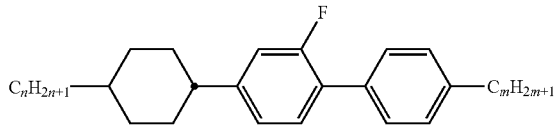
CGP-n-m
CPP-nO-m
CPP-n-Om
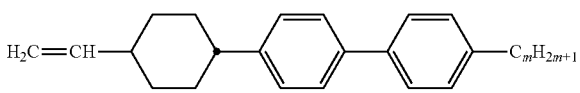
CPP-V-m TABLE D-continued
Illustrative structures
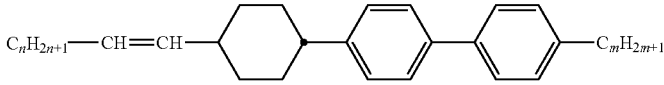
CPP-nV-m
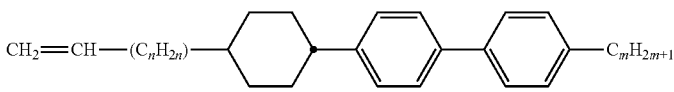
CPP-Vn-m
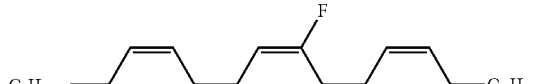
PGP-n-m
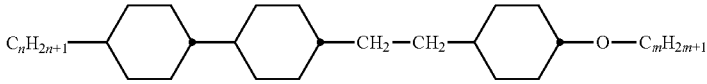
CCEC-n-Om
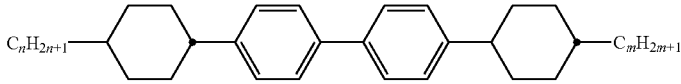
CPPC-n-m
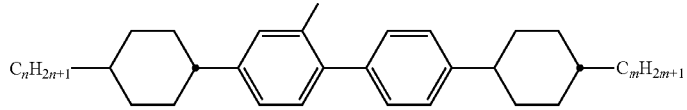
CGPC-n-m
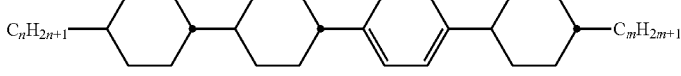
CCPC-n-m
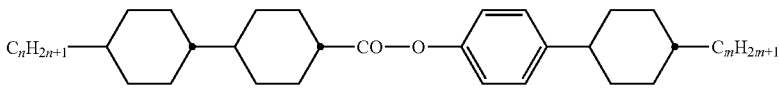
CCZPC-n-m
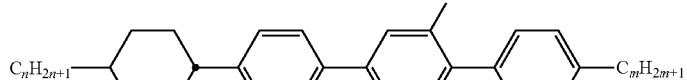
CPGP-n-m
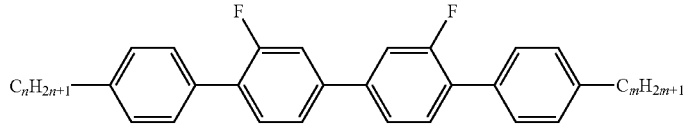
PGIGP-n-m TABLE D-continued
Illustrative structures
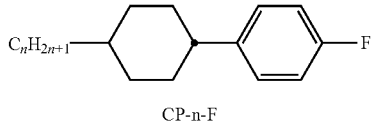
CP-n-F
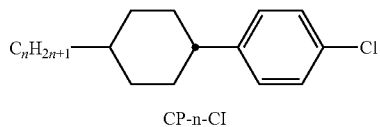
CP-n-Cl
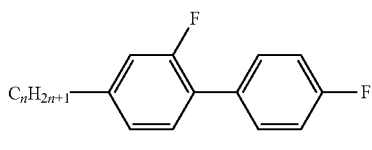
GP-n-F
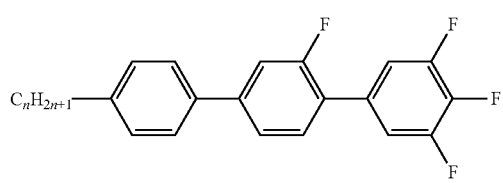
PGU-n-F
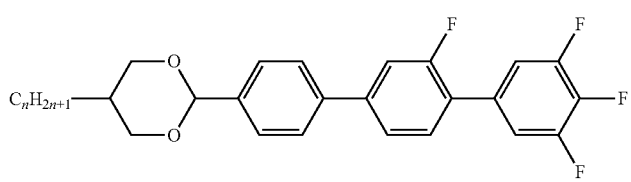
DPGU-n-F
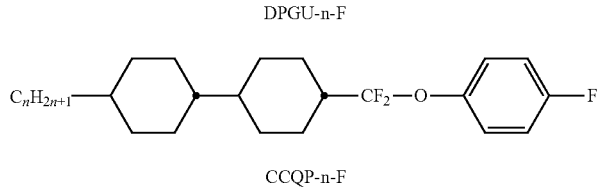
CCQP-n-F
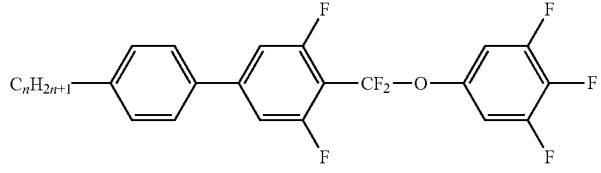
PUQU-n-F
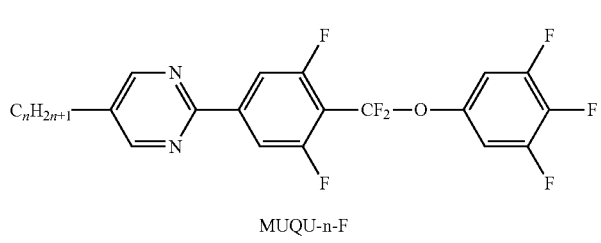
MUQU-n-F TABLE D-continued
Illustrative structures
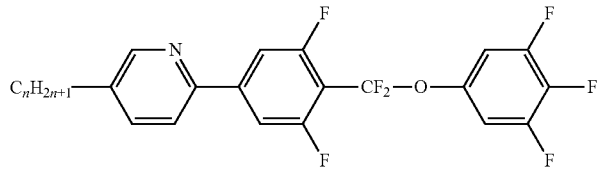
NUQU-n-F
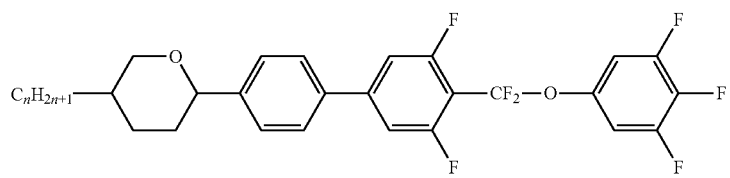
APUQU-n-F
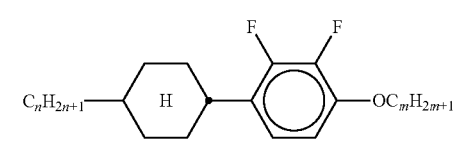
CV-n-Om
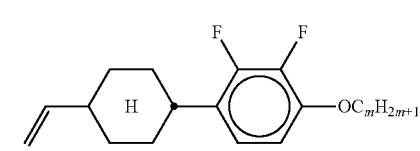
CY-V-Om
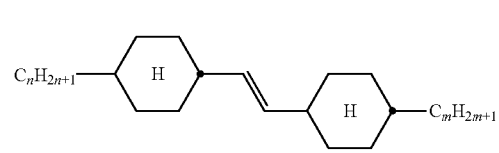
CVC-n-m
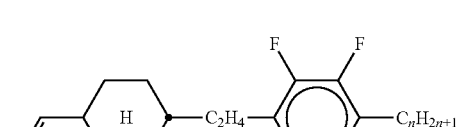
CEY-V-m
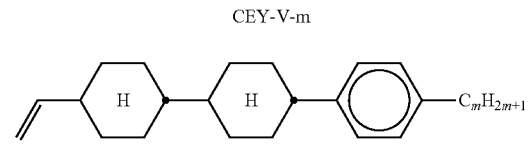
CCP-V-m
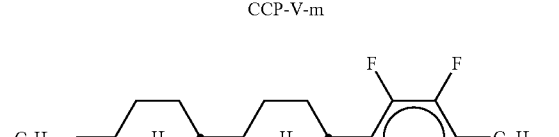
CCY-n-m TABLE D-continued
Illustrative structures
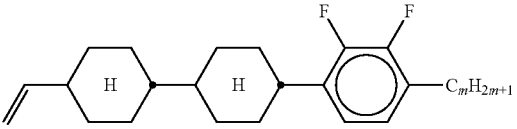
CCY-V-m
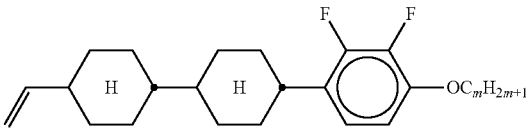
CCY-V-Om
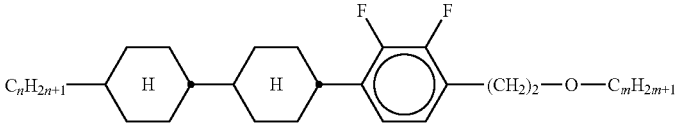
CCY-n-zOm
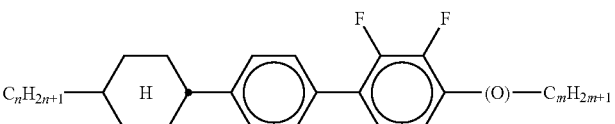
CPY-n-(O)m
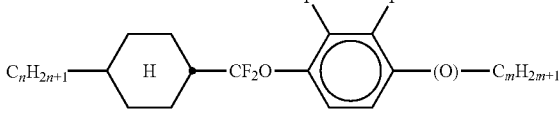
CQY-n-(O)m
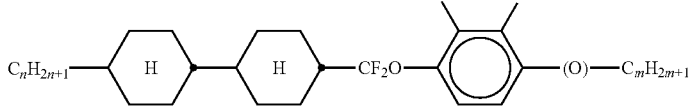
CCQY-n-(O)m
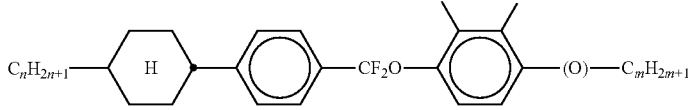
CPQY-n-(O)m
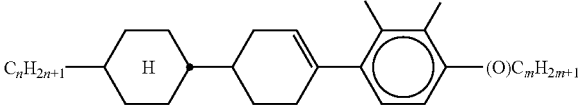
CLY-n-(O)m TABLE D-continued
Illustrative structures
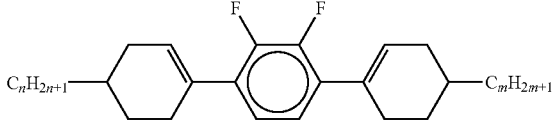
LYLI-n-m
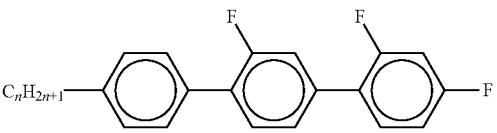
PGIGI-n-F
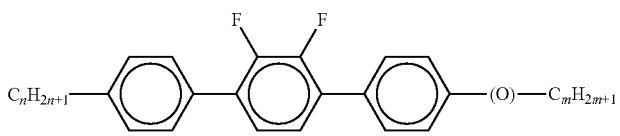
PYP-n-(O)m
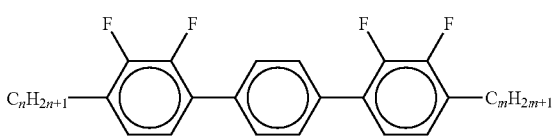
YPY-n-m
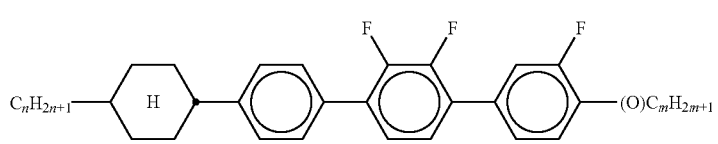
CPYP-n-(O)m
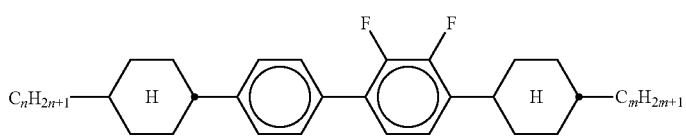
CPYC-n-m
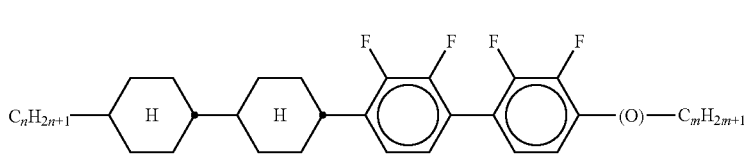
CCYY-n-m
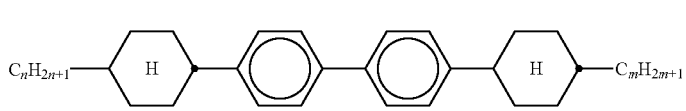
CBC-nm TABLE D-continued Illustrative structures CBC-nmF CNap-n-Om CENap-n-Om CETNap-n-Om DFDBC-n(O)-(O)m PPTUI-n-m PTP-nOm PCH-n

TABLE D-continued

Illustrative structures

![PCH-nOm structure: C$_n$H$_{2n+1}$—cyclohexyl—phenyl—OC$_m$H$_{2m+1}$]

PCH-nOm

![CC(CN)-n-m structure]

CC(CN)-n-m

![CC(CN)C-n-m structure]

CC(CN)C-n-m wherein n, m and l preferably, independently of one another, denote 1 to 7.

The following table shows illustrative compounds which can be used as stabilizers in the media according to the present invention.

TABLE E

Table E shows possible stabilizers which can be added to the LC media according to the invention, wherein n denotes an integer from 1 to 12, preferably 1, 2, 3, 4, 5, 6, 7 or 8.

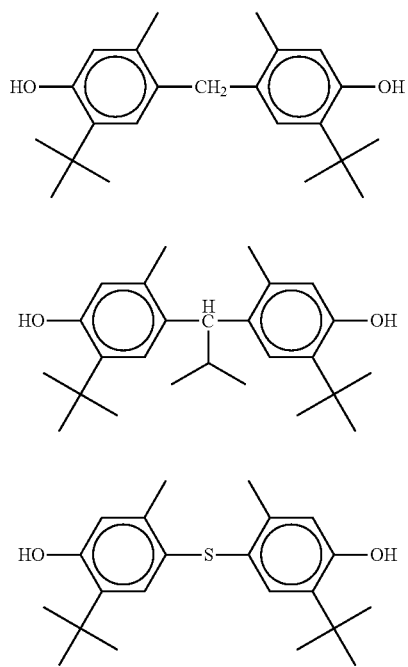

TABLE E-continued
Table E shows possible stabilizers which can be added to the LC media according to the invention, wherein n denotes an integer from 1 to 12, preferably 1, 2, 3, 4, 5, 6, 7 or 8.
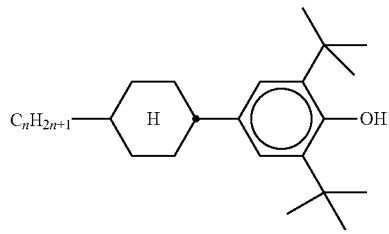
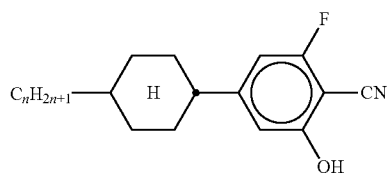
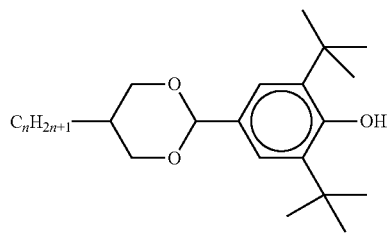
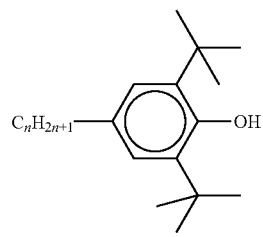
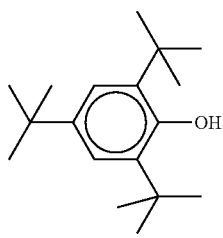
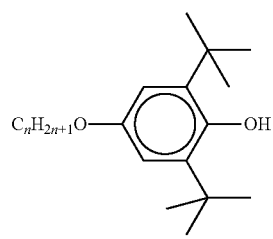

TABLE E-continued
Table E shows possible stabilizers which can be added to the LC media according to the invention, wherein n denotes an integer from 1 to 12, preferably 1, 2, 3, 4, 5, 6, 7 or 8.
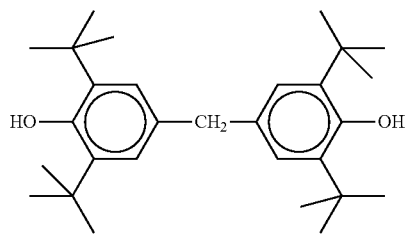
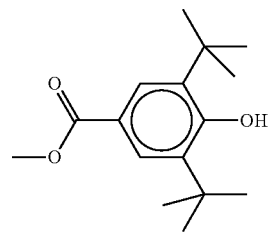
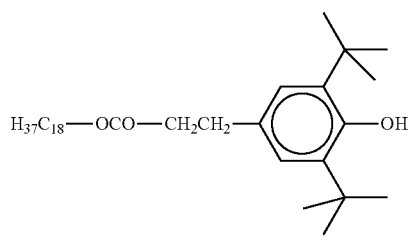
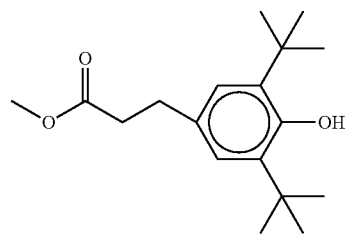
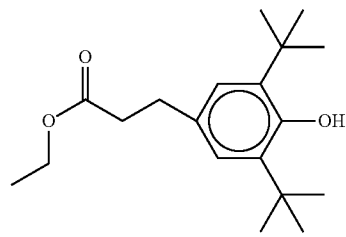
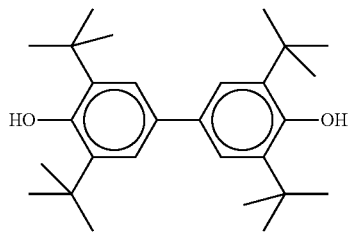

TABLE E-continued
Table E shows possible stabilizers which can be added to the LC media according to the invention, wherein n denotes an integer from 1 to 12, preferably 1, 2, 3, 4, 5, 6, 7 or 8.
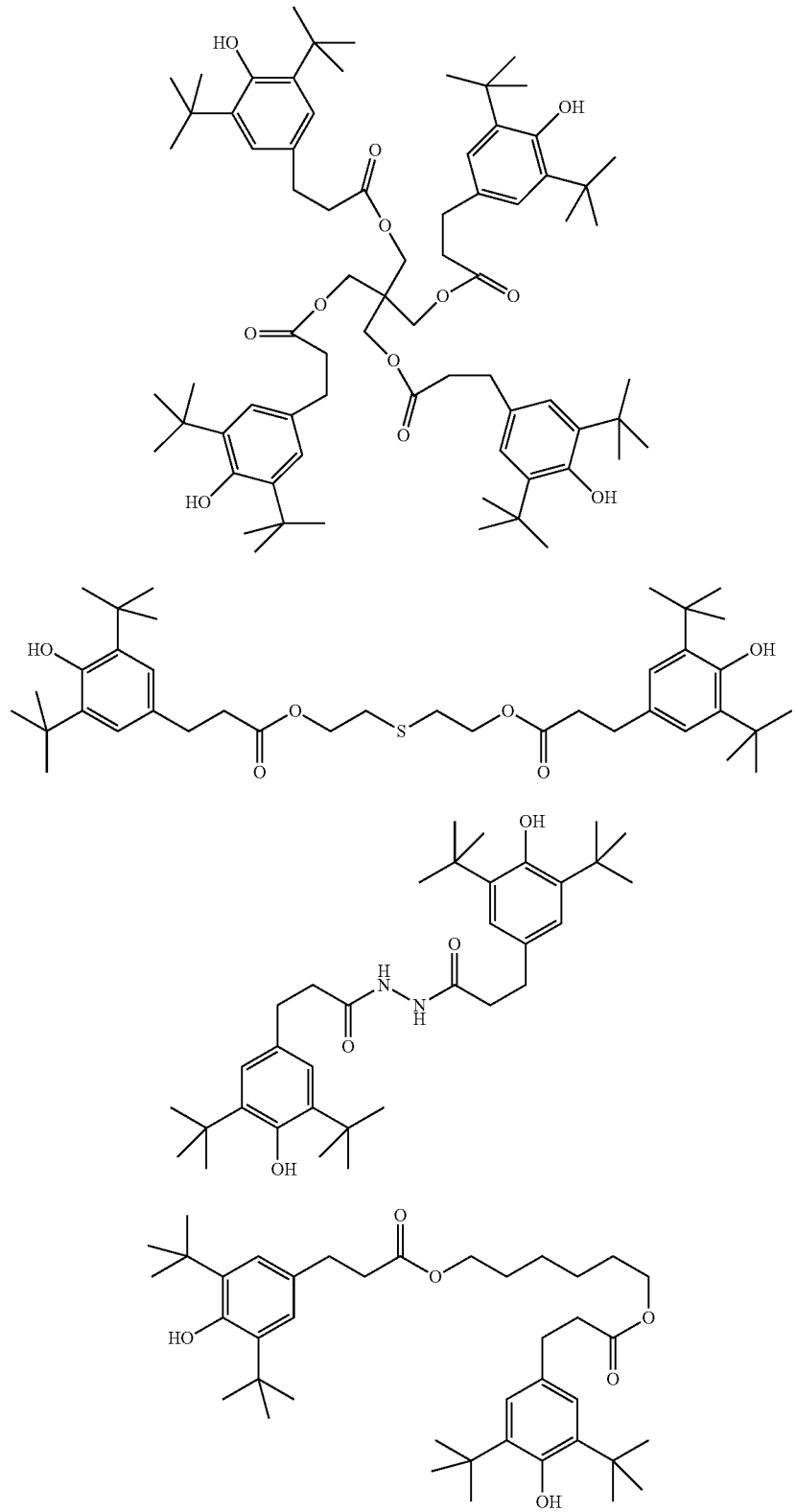

TABLE E-continued
Table E shows possible stabilizers which can be added to the LC media according to the invention, wherein n denotes an integer from 1 to 12, preferably 1, 2, 3, 4, 5, 6, 7 or 8.
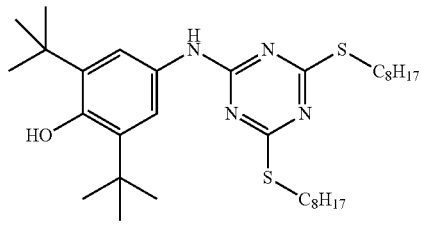
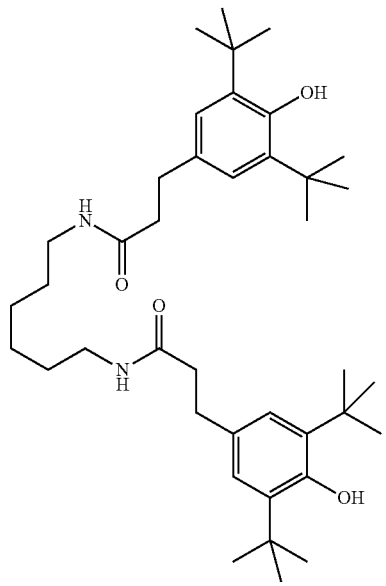 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
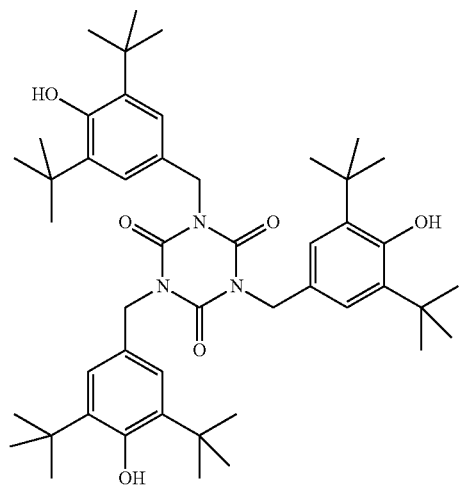 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE E-continued
Table E shows possible stabilizers which can be added to the LC media according to the invention, wherein n denotes an integer from 1 to 12, preferably 1, 2, 3, 4, 5, 6, 7 or 8.
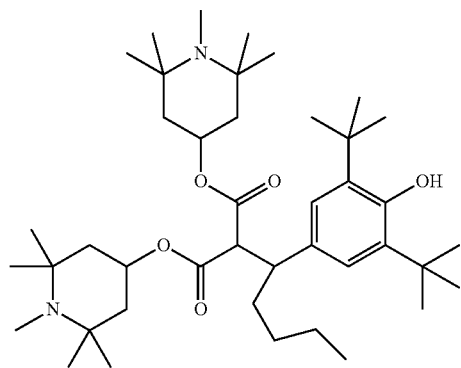 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
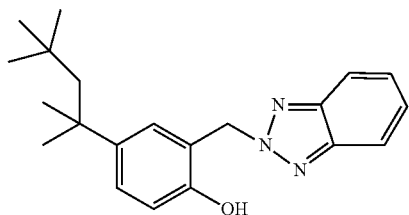 [SMILES: CC(C)(C)CC(C)(C)c1ccc(O)c(Cn2nc3ccccc3n2)c1]
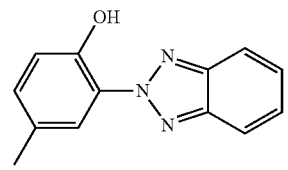 [SMILES: Cc1ccc(O)c(-n2nc3ccccc3n2)c1]
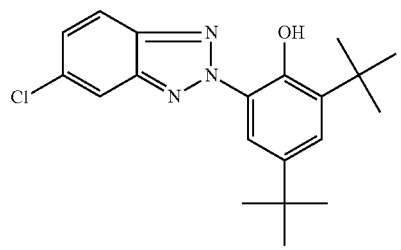 [SMILES: CC(C)(C)c1cc(-n2nc3ccc(Cl)cc3n2)c(O)c(C(C)(C)C)c1]
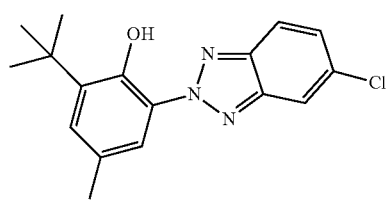 [SMILES: Cc1cc(-n2nc3ccc(Cl)cc3n2)c(O)c(C(C)(C)C)c1]

TABLE E-continued
Table E shows possible stabilizers which can be added to the LC media according to the invention, wherein n denotes an integer from 1 to 12, preferably 1, 2, 3, 4, 5, 6, 7 or 8.
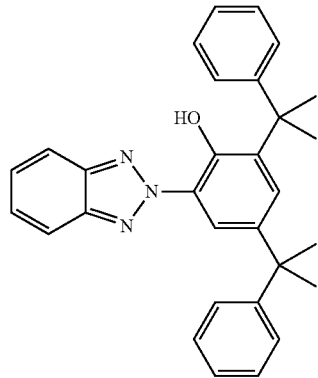 [SMILES: CC(C)(c1ccccc1)c1cc(-n2nc3ccccc3n2)c(O)c(C(C)(C)c2ccccc2)c1]
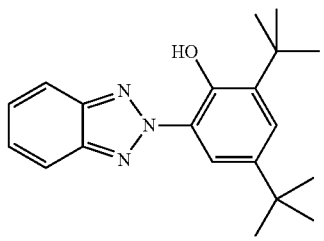 [SMILES: CC(C)(C)c1cc(-n2nc3ccccc3n2)c(O)c(C(C)(C)C)c1]
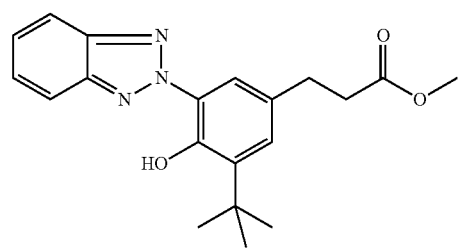 [SMILES: COC(=O)CCc1cc(-n2nc3ccccc3n2)c(O)c(C(C)(C)C)c1]
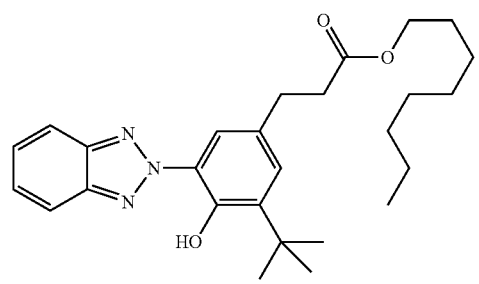 [SMILES: CCCCCCCCOC(=O)CCc1cc(-n2nc3ccccc3n2)c(O)c(C(C)(C)C)c1]

TABLE E-continued
Table E shows possible stabilizers which can be added to the LC media according to the invention, wherein n denotes an integer from 1 to 12, preferably 1, 2, 3, 4, 5, 6, 7 or 8.
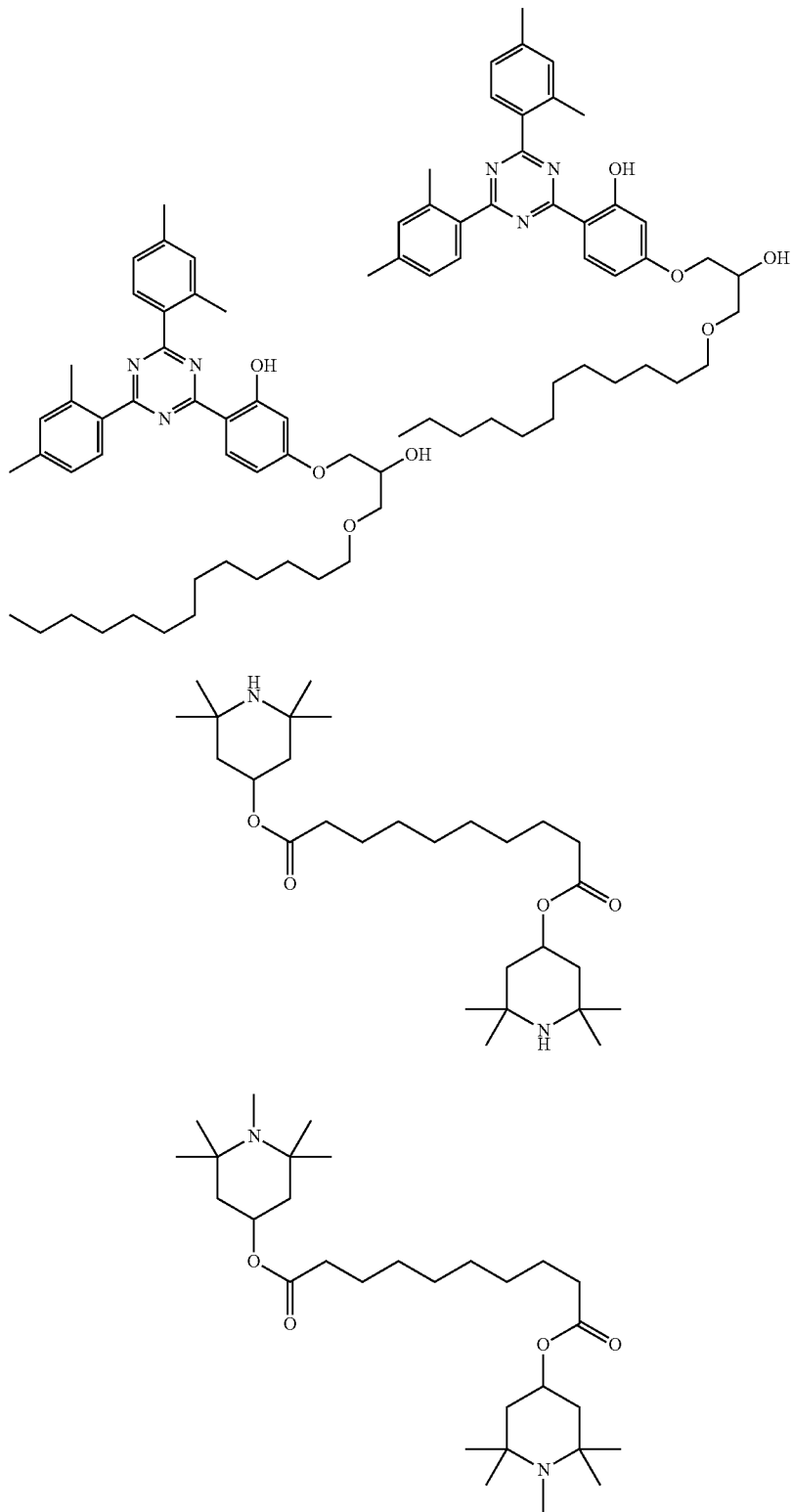

TABLE E-continued
Table E shows possible stabilizers which can be added to the LC media according to the invention, wherein n denotes an integer from 1 to 12, preferably 1, 2, 3, 4, 5, 6, 7 or 8.
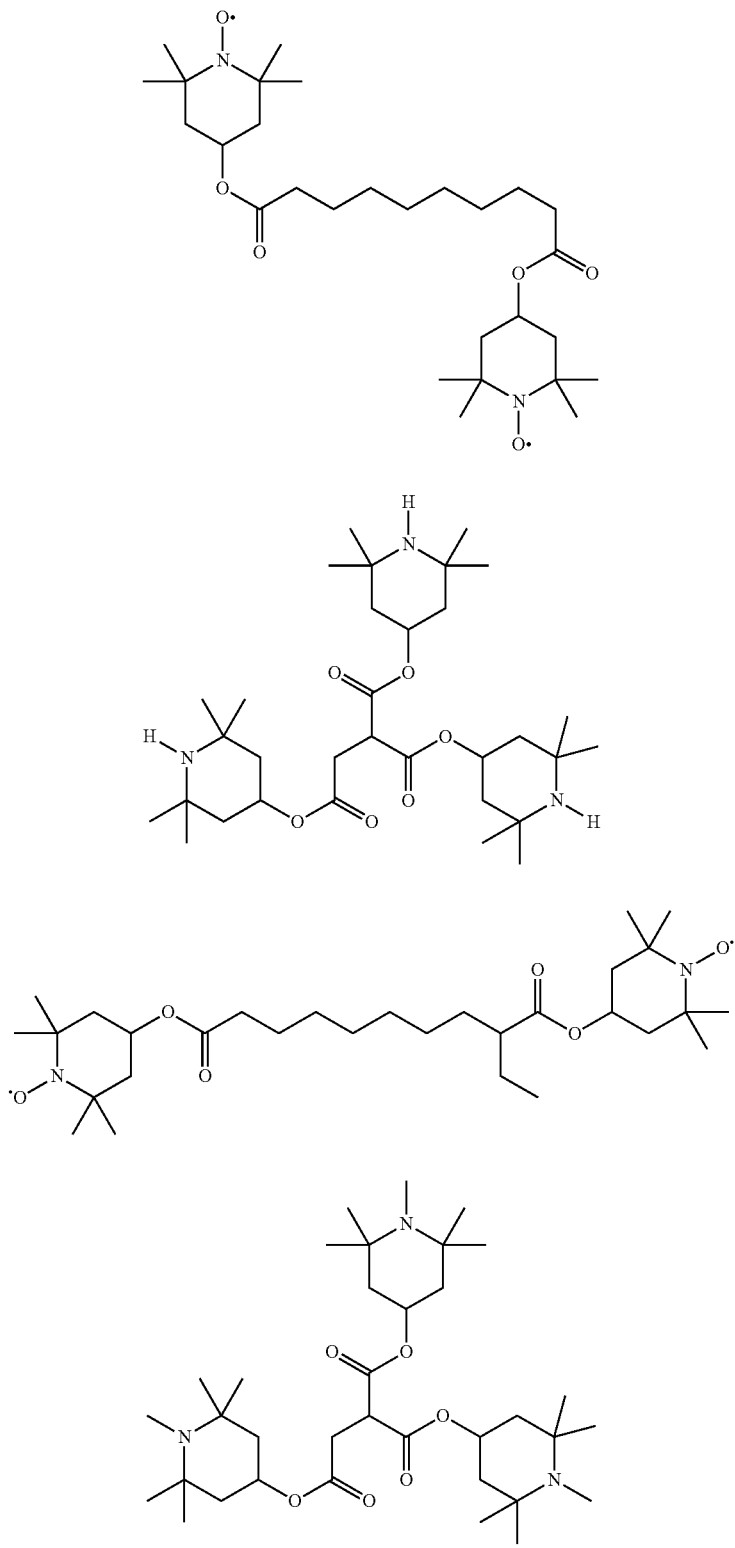

TABLE E-continued
Table E shows possible stabilizers which can be added to the LC media according to the invention, wherein n denotes an integer from 1 to 12, preferably 1, 2, 3, 4, 5, 6, 7 or 8.
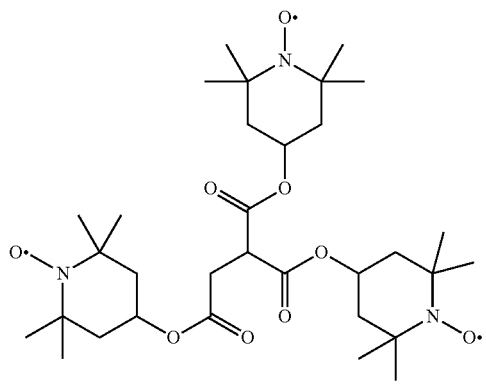
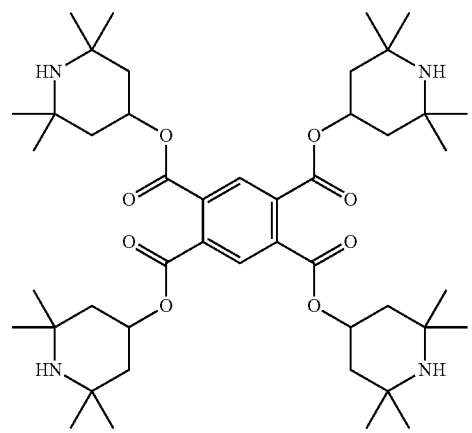
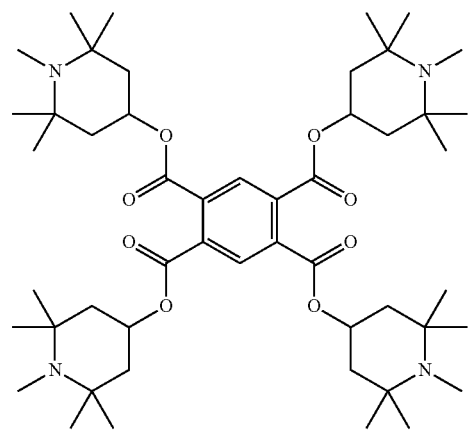

TABLE E-continued

Table E shows possible stabilizers which can be added to the LC media according to the invention, wherein n denotes an integer from 1 to 12, preferably 1, 2, 3, 4, 5, 6, 7 or 8.

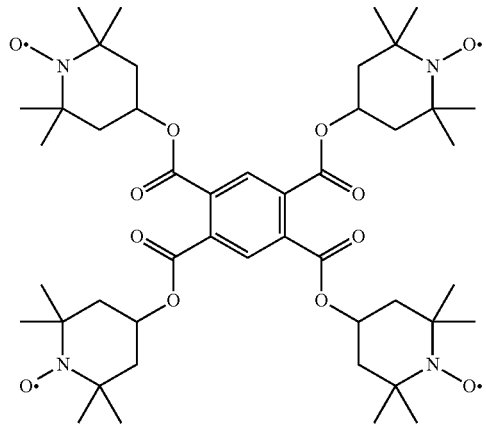

The LC media preferably comprise 0 to 10% by weight, in particular 1 ppm to 5% by weight, particularly preferably 1 ppm to 1% by weight, of stabilizers.

Table F below shows illustrative compounds which can preferably be used as chiral dopants in the mesogenic media according to the present invention.

TABLE F

| Structure | Code |
|---|---|
| $C_2H_5$—*CH(CH_3)—CH_2O—C_6H_4—C_6H_4—CN$ | C15 |
| $C_2H_5$—*CH(CH_3)—CH_2—C_6H_4—C_6H_4—CN$ | CB 15 |
| $C_6H_{13}$—*CH(CH_3)—O—C_6H_4—C(O)O—C_6H_4—C_5H_{11}$ | CM 21 |
| $C_3H_7$—Cy—Cy—C_6H_4—CH_2—*CH(CH_3)—C_2H_5$ | CM 44 |
| $C_5H_{11}$—C_6H_4—C_6H_4—C(O)O—*CH(C_2H_5)—C_6H_5$ | CM 45 |
| $C_8H_{17}O$—C_6H_4—C_6H_4—C(O)O—*CH(C_2H_5)—C_6H_5$ | CM 47 |

TABLE F-continued

| Structure | Label |
|---|---|
| (cholesterol derivative with Cl) | CC |
| (cholesterol derivative with C8H17-C(O)-O-) | CN |
| C6H13O–C6H4–C(O)O–C6H4–C(O)O–*CH(CH3)–C6H13 | R/S-811 |
| C5H11–Cy–C6H4–COO–*CH(Ph)–OOC–C6H4–Cy–C5H11 | R/S-1011 |
| H11C5–Cy–Cy–C6H2(F,F)–O*CH(CH3)–C6H13 | R/S-2011 |
| C3H7–Cy–Cy–C6H2(F,F)–O–*CH(C≡CH)–C5H11 | R/S-3011 |
| C5H11–(bicyclic)–C6H4–C6H2(F,F)–O*CH(CH3)–C6H13 | R/S-4011 |

TABLE F-continued

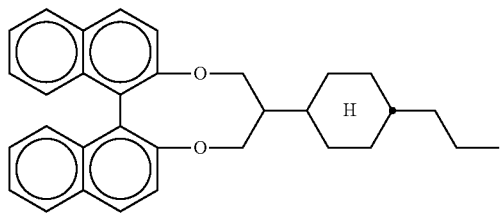

R/S-5011

In a preferred embodiment of the present invention, the mesogenic media comprise one or more compounds selected from the compounds shown in Table F.

The mesogenic media according to the present invention preferably comprise two or more, preferably four or more, compounds selected from the compounds shown in the above tables D to F.

In an embodiment the LC media according to the present invention preferably comprise three or more, more preferably five or more compounds shown in Table D.

TABLE G

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

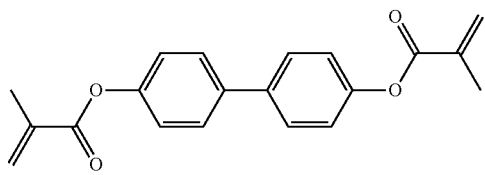

RM-1

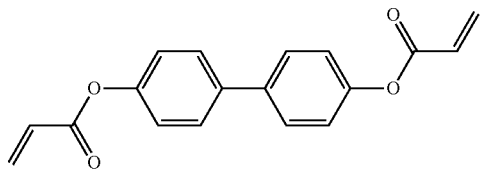

RM-2

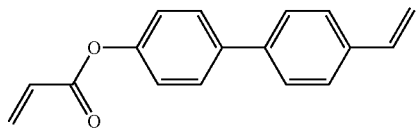

RM-3

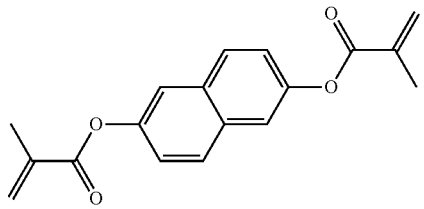 [SMILES: C=C(C)C(=O)Oc1ccc2cc(OC(=O)C(=C)C)ccc2c1]

RM-4

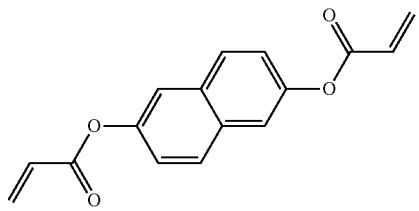 [SMILES: C=CC(=O)Oc1ccc2cc(OC(=O)C=C)ccc2c1]

RM-5

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

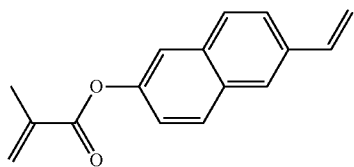 [SMILES: C=Cc1ccc2cc(OC(=O)C(=C)C)ccc2c1] RM-6

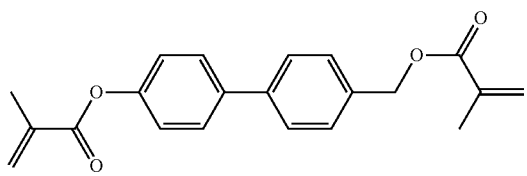 [SMILES: C=C(C)C(=O)OCc1ccc(-c2ccc(OC(=O)C(=C)C)cc2)cc1] RM-7

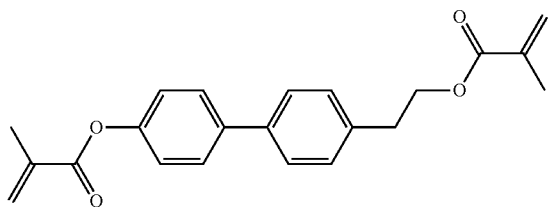 [SMILES: C=C(C)C(=O)OCCc1ccc(-c2ccc(OC(=O)C(=C)C)cc2)cc1] RM-8

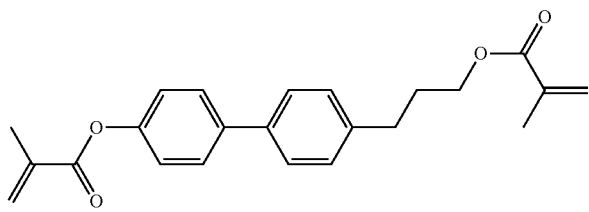 [SMILES: C=C(C)C(=O)OCCCc1ccc(-c2ccc(OC(=O)C(=C)C)cc2)cc1] RM-9

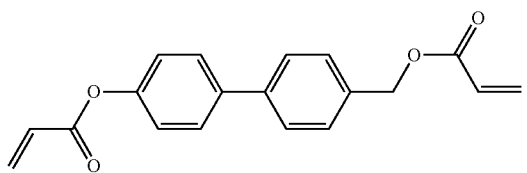 [SMILES: C=CC(=O)OCc1ccc(-c2ccc(OC(=O)C=C)cc2)cc1] RM-10

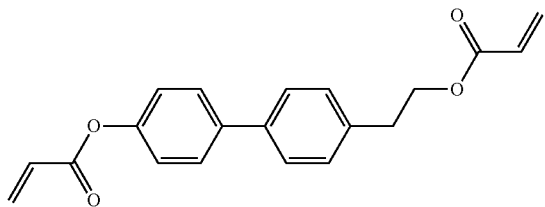 [SMILES: C=CC(=O)OCCc1ccc(-c2ccc(OC(=O)C=C)cc2)cc1] RM-11

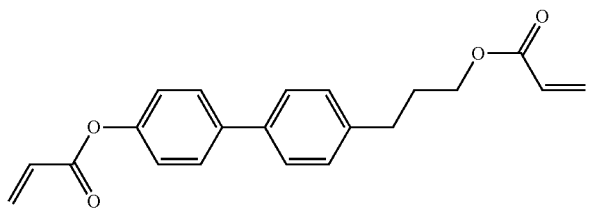 [SMILES: C=CC(=O)OCCCc1ccc(-c2ccc(OC(=O)C=C)cc2)cc1] RM-12

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

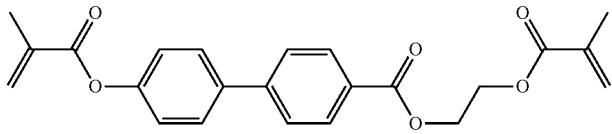 RM-13

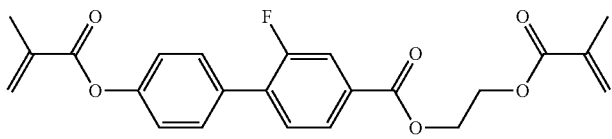 [SMILES: C=C(C)C(=O)OCCOC(=O)c1ccc(-c2ccc(OC(=O)C(=C)C)cc2)c(F)c1] RM-14

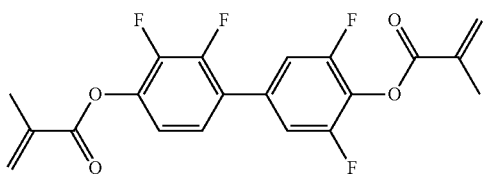 [SMILES: C=C(C)C(=O)Oc1ccc(-c2cc(F)c(OC(=O)C(=C)C)c(F)c2)c(F)c1F] RM-15

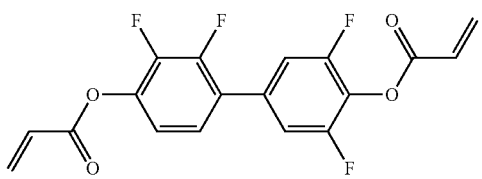 [SMILES: C=CC(=O)Oc1ccc(-c2cc(F)c(OC(=O)C=C)c(F)c2)c(F)c1F] RM-16

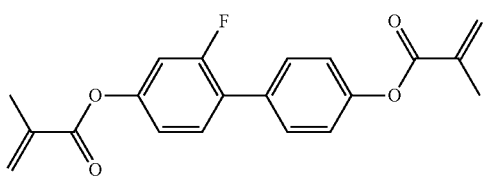 [SMILES: C=C(C)C(=O)Oc1ccc(-c2ccc(OC(=O)C(=C)C)cc2F)cc1] RM-17

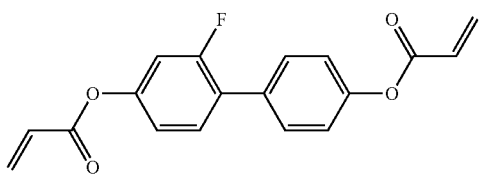 [SMILES: C=CC(=O)Oc1ccc(-c2ccc(OC(=O)C=C)cc2F)cc1] RM-18

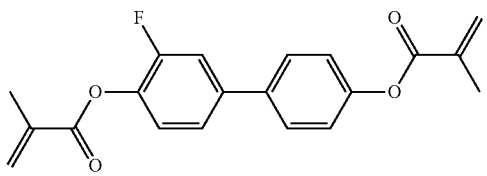 [SMILES: C=C(C)C(=O)Oc1ccc(-c2ccc(OC(=O)C(=C)C)c(F)c2)cc1] RM-19

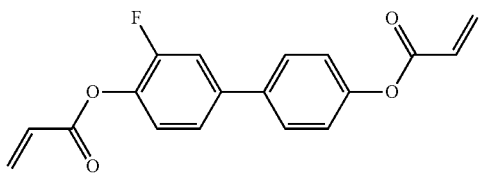 [SMILES: C=CC(=O)Oc1ccc(-c2ccc(OC(=O)C=C)c(F)c2)cc1] RM-20

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

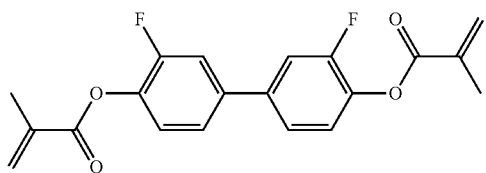 [SMILES: C=C(C)C(=O)Oc1ccc(-c2ccc(OC(=O)C(=C)C)c(F)c2)cc1F] RM-21

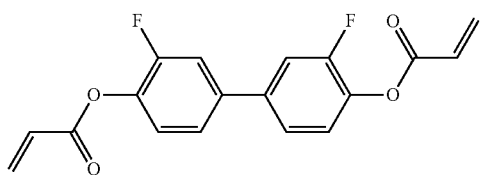 [SMILES: C=CC(=O)Oc1ccc(-c2ccc(OC(=O)C=C)c(F)c2)cc1F] RM-22

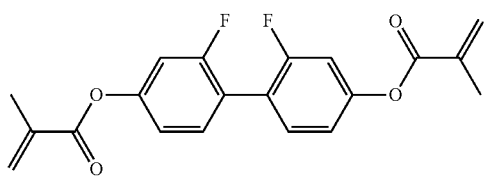 RM-23

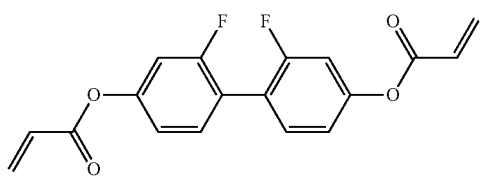 RM-24

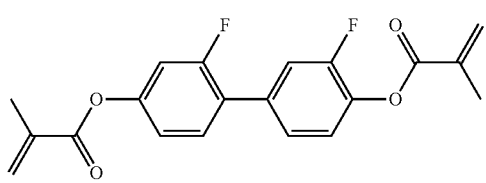 [SMILES: C=C(C)C(=O)Oc1ccc(-c2ccc(OC(=O)C(=C)C)c(F)c2)c(F)c1] RM-25

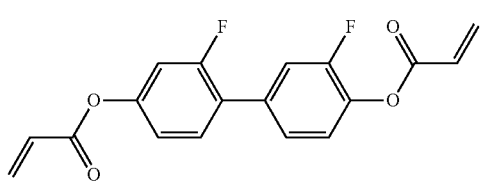 RM-26

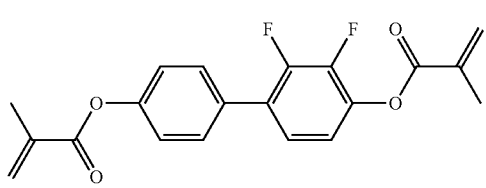 [SMILES: C=C(C)C(=O)Oc1ccc(-c2ccc(OC(=O)C(=C)C)c(F)c2F)cc1] RM-27

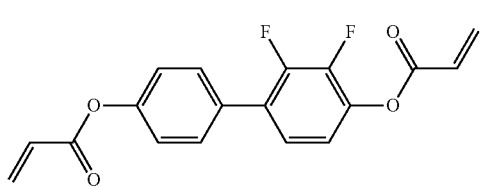 RM-28

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

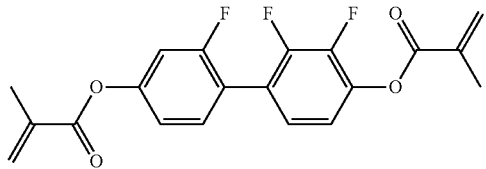 RM-29

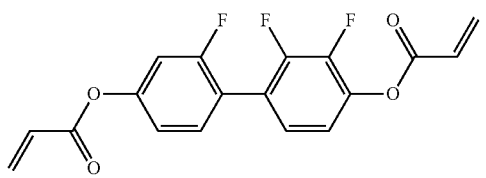 [SMILES: C=CC(=O)Oc1ccc(-c2ccc(OC(=O)C=C)c(F)c2F)cc1] RM-30

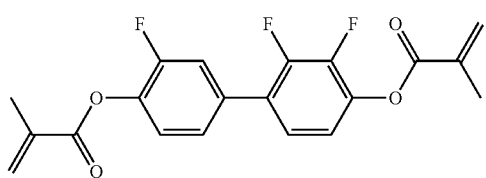 RM-31

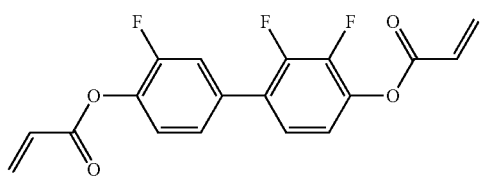 [SMILES: C=CC(=O)Oc1ccc(-c2ccc(OC(=O)C=C)c(F)c2F)cc1F] RM-32

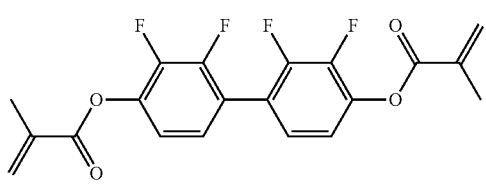 RM-33

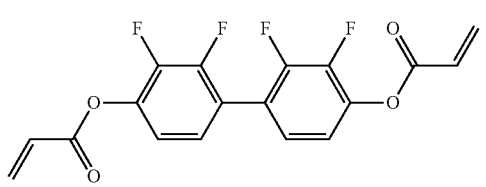 RM-34

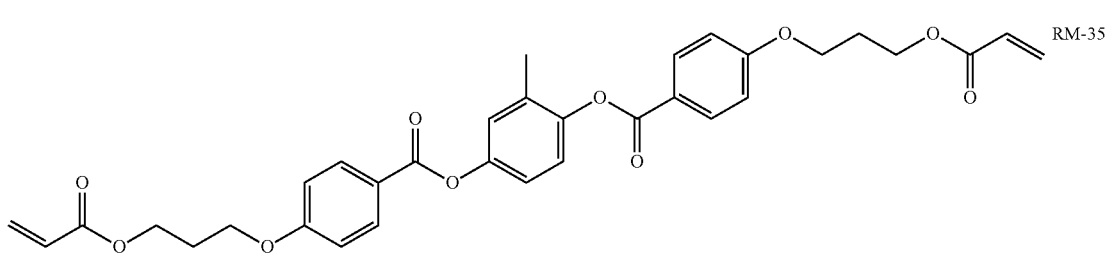 RM-35

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

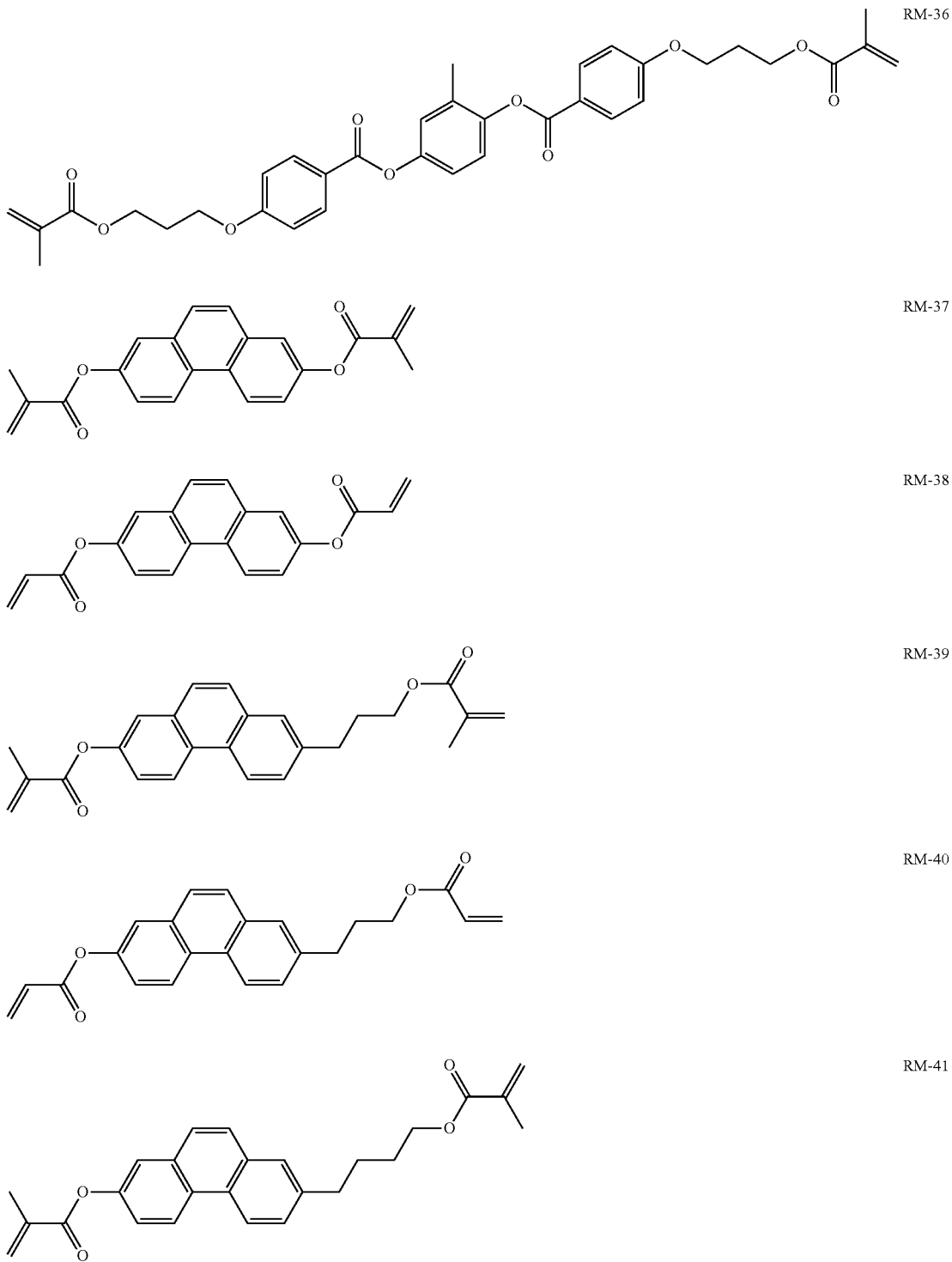

RM-36

RM-37

RM-38

RM-39

RM-40

RM-41

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

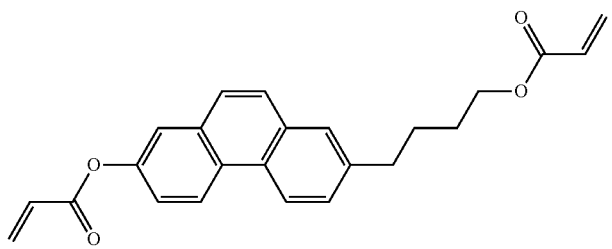 [SMILES: C=CC(=O)OCCCCc1ccc2c(ccc3cc(OC(=O)C=C)ccc32)c1] RM-42

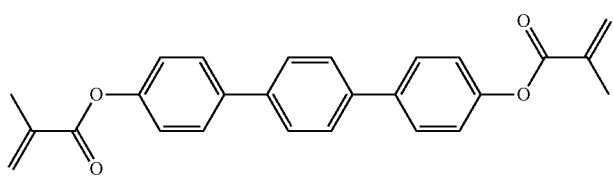 RM-43

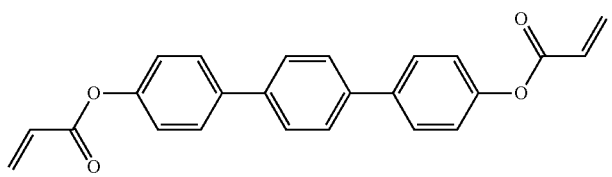 [SMILES: C=CC(=O)Oc1ccc(-c2ccc(-c3ccc(OC(=O)C=C)cc3)cc2)cc1] RM-44

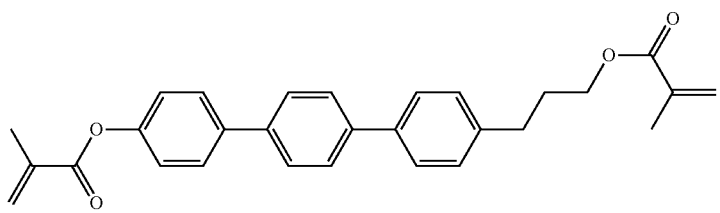 [SMILES: C=C(C)C(=O)OCCCc1ccc(-c2ccc(-c3ccc(OC(=O)C(=C)C)cc3)cc2)cc1] RM-45

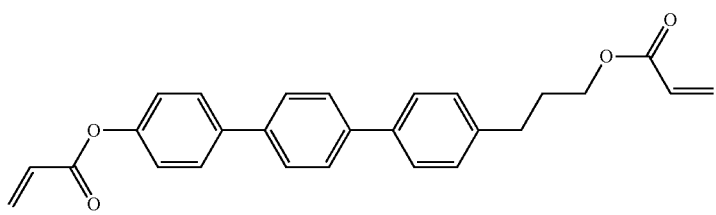 [SMILES: C=CC(=O)OCCCc1ccc(-c2ccc(-c3ccc(OC(=O)C=C)cc3)cc2)cc1] RM-46

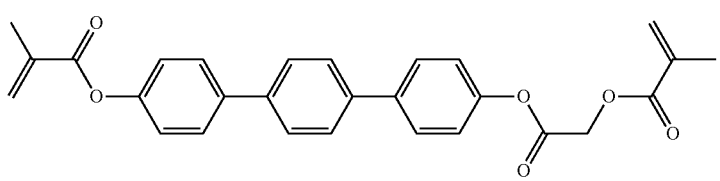 [SMILES: C=C(C)C(=O)OCC(=O)Oc1ccc(-c2ccc(-c3ccc(OC(=O)C(=C)C)cc3)cc2)cc1] RM-47

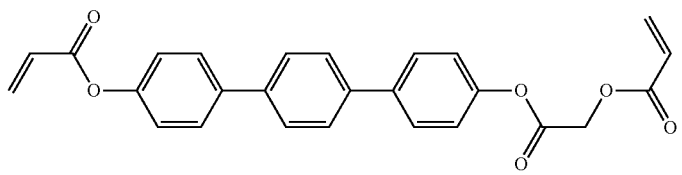 [SMILES: C=CC(=O)OCC(=O)Oc1ccc(-c2ccc(-c3ccc(OC(=O)C=C)cc3)cc2)cc1] RM-48

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

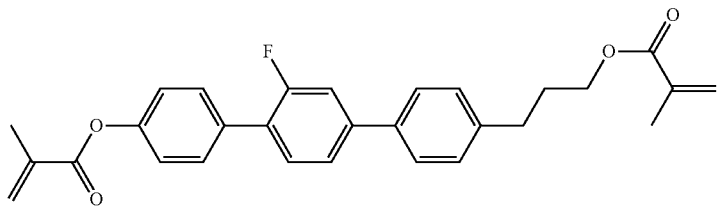 [SMILES: C=C(C)C(=O)OCCCc1ccc(-c2ccc(-c3ccc(OC(=O)C(=C)C)cc3)c(F)c2)cc1]

RM-49

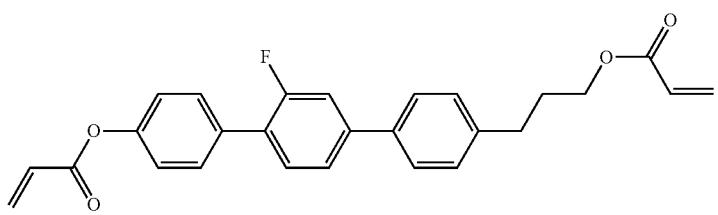

RM-50

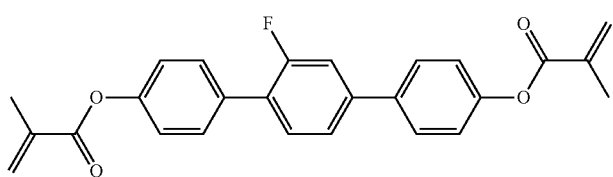 [SMILES: C=C(C)C(=O)Oc1ccc(-c2ccc(-c3ccc(OC(=O)C(=C)C)cc3)c(F)c2)cc1]

RM-51

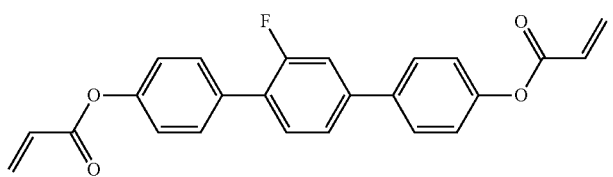

RM-52

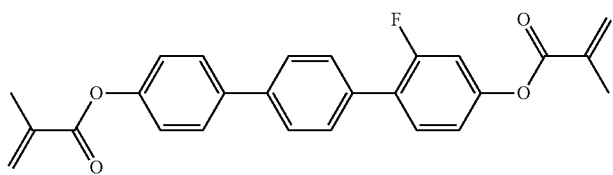

RM-53

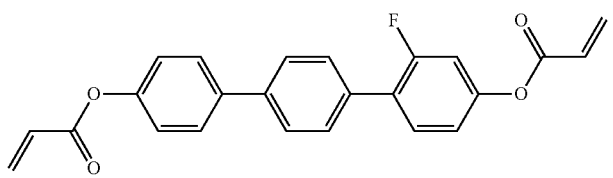

RM-54

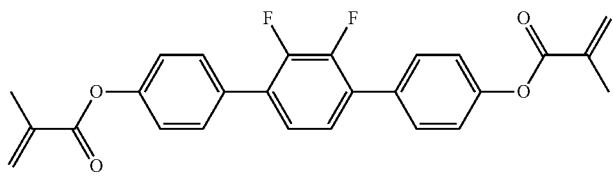 [SMILES: C=C(C)C(=O)Oc1ccc(-c2ccc(-c3ccc(OC(=O)C(=C)C)cc3)c(F)c2F)cc1]

RM-55

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

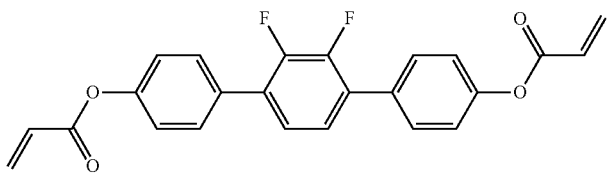 [SMILES: C=CC(=O)Oc1ccc(-c2ccc(-c3ccc(OC(=O)C=C)cc3)c(F)c2F)cc1] RM-56

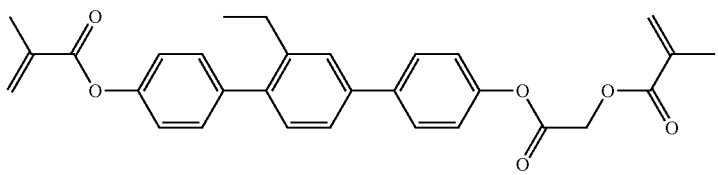 [SMILES: C=C(C)C(=O)OCC(=O)Oc1ccc(-c2ccc(-c3ccc(OC(=O)C(=C)C)cc3)c(CC)c2)cc1] RM-57

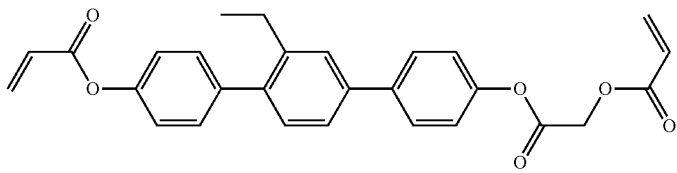 RM-58

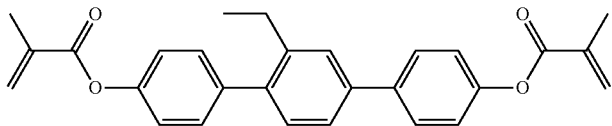 [SMILES: C=C(C)C(=O)Oc1ccc(-c2ccc(-c3ccc(OC(=O)C(=C)C)cc3)c(CC)c2)cc1] RM-59

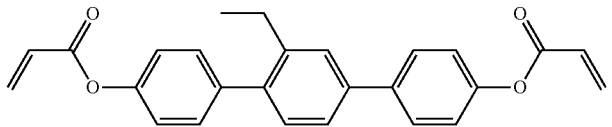 [SMILES: C=CC(=O)Oc1ccc(-c2ccc(-c3ccc(OC(=O)C=C)cc3)c(CC)c2)cc1] RM-60

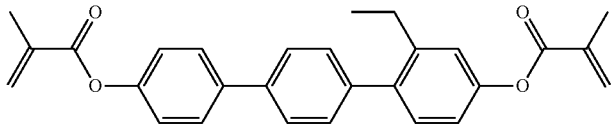 RM-61

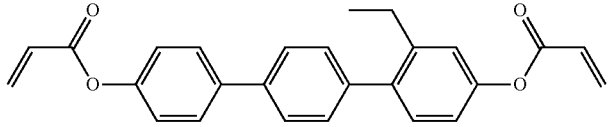 RM-62

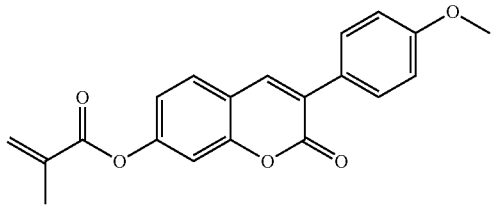 [SMILES: C=C(C)C(=O)Oc1ccc2cc(-c3ccc(OC)cc3)c(=O)oc2c1] RM-63

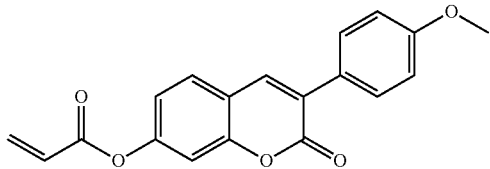 [SMILES: C=CC(=O)Oc1ccc2cc(-c3ccc(OC)cc3)c(=O)oc2c1] RM-64

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

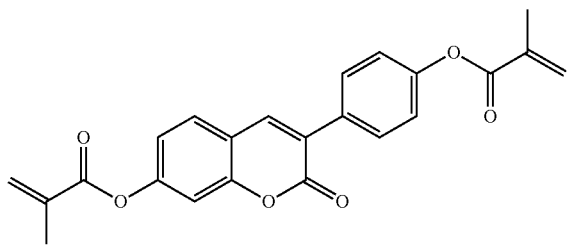 [SMILES: C=C(C)C(=O)Oc1ccc(-c2cc3ccc(OC(=O)C(=C)C)cc3oc2=O)cc1]

RM-65

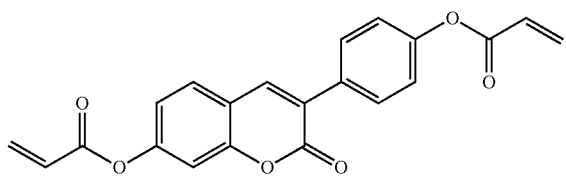 [SMILES: C=CC(=O)Oc1ccc(-c2cc3ccc(OC(=O)C=C)cc3oc2=O)cc1]

RM-66

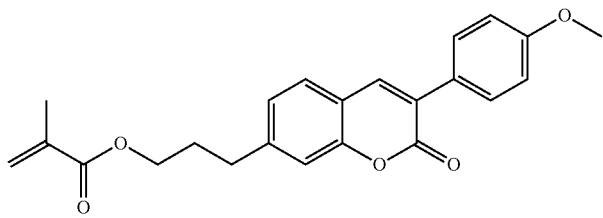 [SMILES: C=C(C)C(=O)OCCCc1ccc2cc(-c3ccc(OC)cc3)c(=O)oc2c1]

RM-67

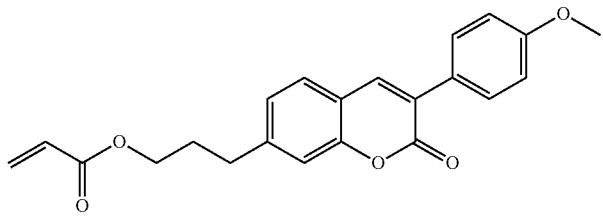 [SMILES: C=CC(=O)OCCCc1ccc2cc(-c3ccc(OC)cc3)c(=O)oc2c1]

RM-68

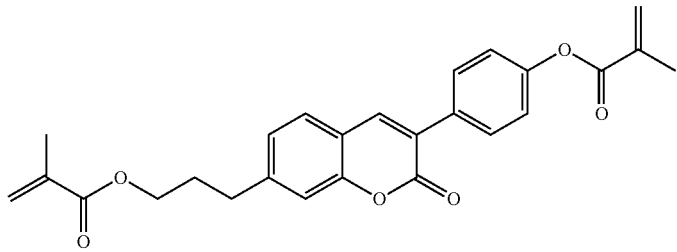 [SMILES: C=C(C)C(=O)OCCCc1ccc2cc(-c3ccc(OC(=O)C(=C)C)cc3)c(=O)oc2c1]

RM-69

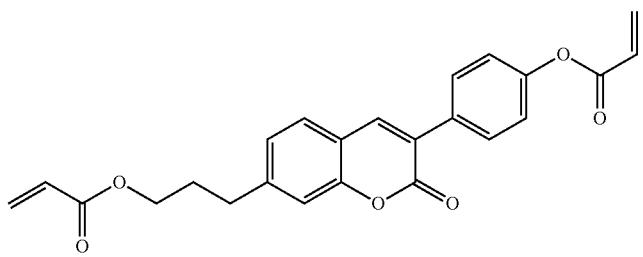 [SMILES: C=CC(=O)OCCCc1ccc2cc(-c3ccc(OC(=O)C=C)cc3)c(=O)oc2c1]

RM-70

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

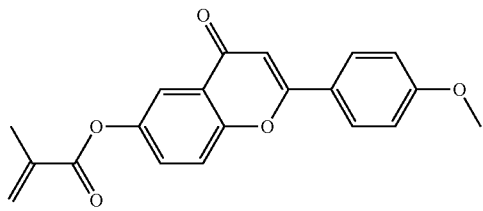 [SMILES: C=C(C)C(=O)Oc1ccc2oc(-c3ccc(OC)cc3)cc(=O)c2c1]

RM-71

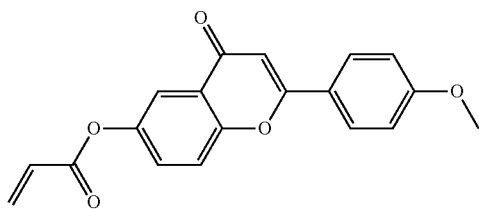 [SMILES: C=CC(=O)Oc1ccc2oc(-c3ccc(OC)cc3)cc(=O)c2c1]

RM-72

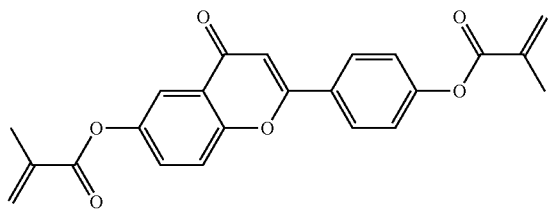 [SMILES: C=C(C)C(=O)Oc1ccc(-c2cc(=O)c3cc(OC(=O)C(=C)C)ccc3o2)cc1]

RM-73

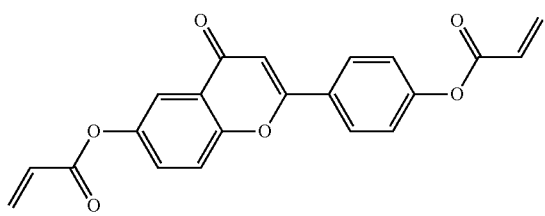 [SMILES: C=CC(=O)Oc1ccc(-c2cc(=O)c3cc(OC(=O)C=C)ccc3o2)cc1]

RM-74

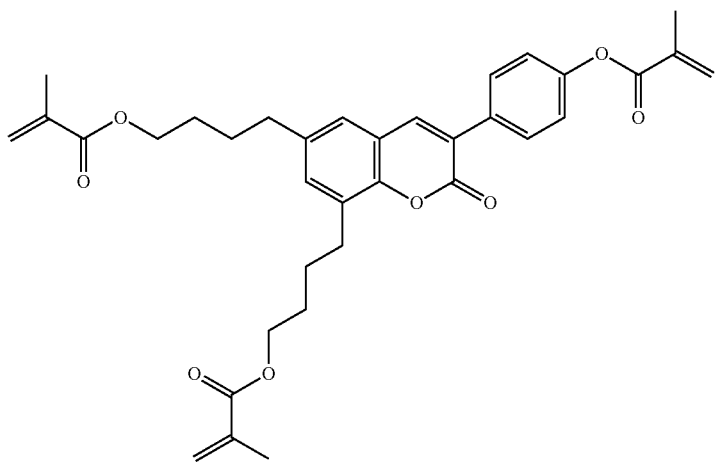 [SMILES: C=C(C)C(=O)OCCCCc1cc(CCCCOC(=O)C(=C)C)c2oc(=O)c(-c3ccc(OC(=O)C(=C)C)cc3)cc2c1]

RM-75

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

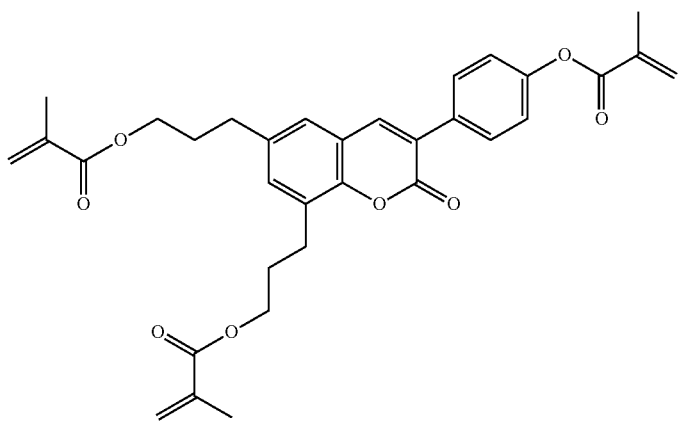 [SMILES: C=C(C)C(=O)OCCCc1cc(CCCOC(=O)C(=C)C)c2oc(=O)c(-c3ccc(OC(=O)C(=C)C)cc3)cc2c1]

RM-76

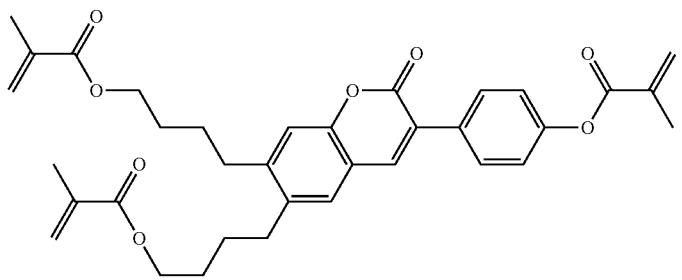 [SMILES: C=C(C)C(=O)OCCCCc1cc2cc(-c3ccc(OC(=O)C(=C)C)cc3)c(=O)oc2cc1CCCCOC(=O)C(=C)C]

RM-77

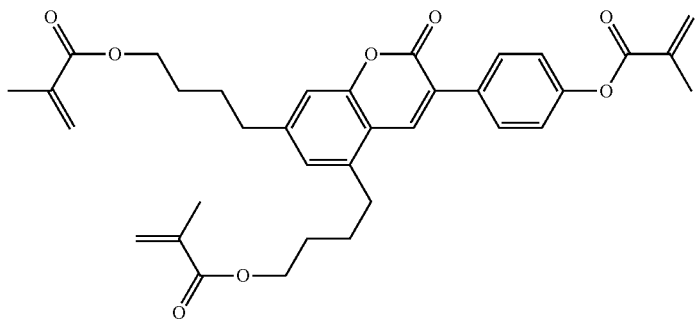 [SMILES: C=C(C)C(=O)OCCCCc1cc(CCCCOC(=O)C(=C)C)c2cc(-c3ccc(OC(=O)C(=C)C)cc3)c(=O)oc2c1]

RM-78

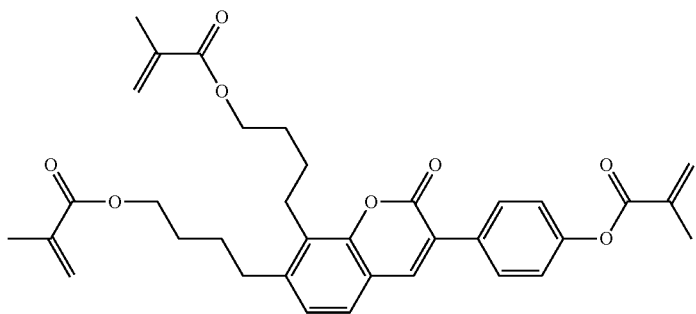 [SMILES: C=C(C)C(=O)OCCCCc1ccc2cc(-c3ccc(OC(=O)C(=C)C)cc3)c(=O)oc2c1CCCCOC(=O)C(=C)C]

RM-79

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

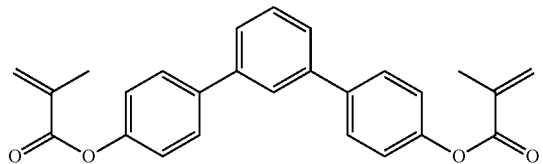 [SMILES: C=C(C)C(=O)Oc1ccc(-c2cccc(-c3ccc(OC(=O)C(=C)C)cc3)c2)cc1]

RM-80

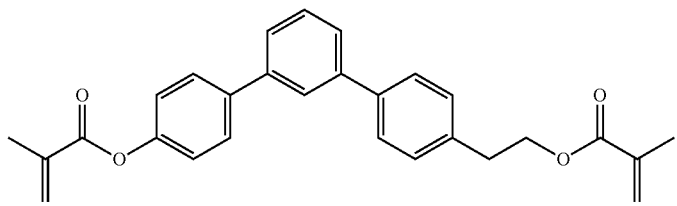 [SMILES: C=C(C)C(=O)OCCc1ccc(-c2cccc(-c3ccc(OC(=O)C(=C)C)cc3)c2)cc1]

RM-81

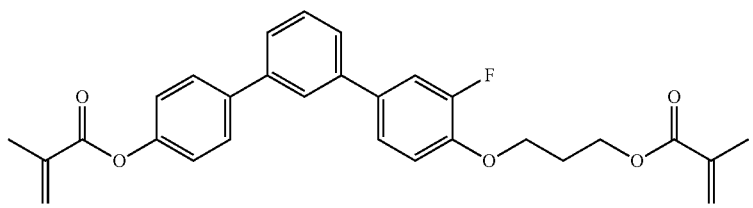 [SMILES: C=C(C)C(=O)OCCCOc1ccc(-c2cccc(-c3ccc(OC(=O)C(=C)C)cc3)c2)cc1F]

RM-82

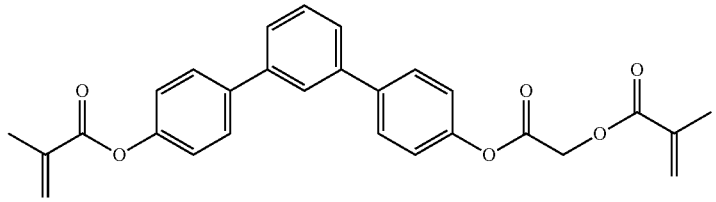 [SMILES: C=C(C)C(=O)OCC(=O)Oc1ccc(-c2cccc(-c3ccc(OC(=O)C(=C)C)cc3)c2)cc1]

RM-83

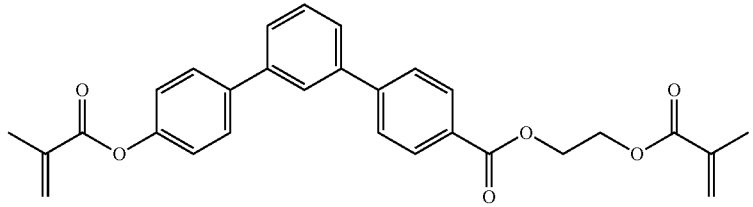 [SMILES: C=C(C)C(=O)OCCOC(=O)c1ccc(-c2cccc(-c3ccc(OC(=O)C(=C)C)cc3)c2)cc1]

RM-84

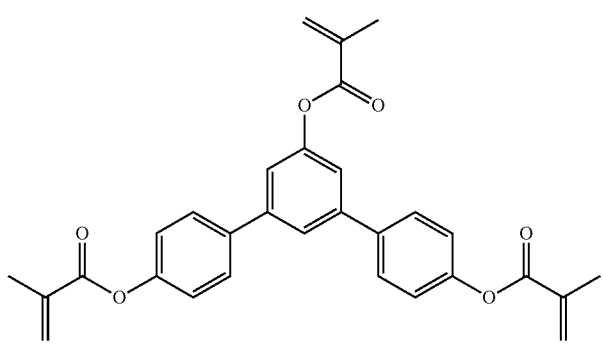 [SMILES: C=C(C)C(=O)Oc1ccc(-c2cc(OC(=O)C(=C)C)cc(-c3ccc(OC(=O)C(=C)C)cc3)c2)cc1]

RM-85

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

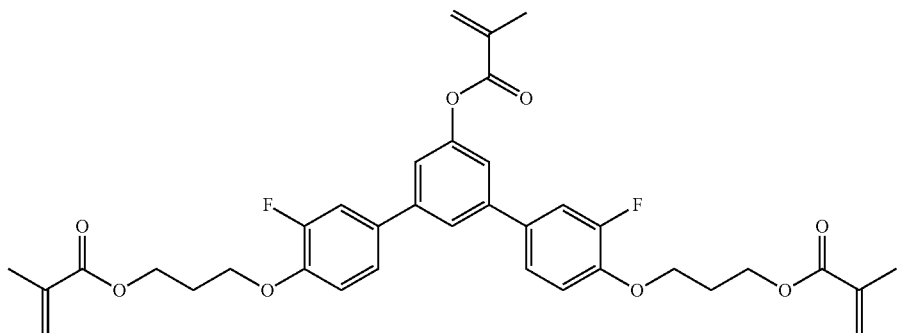 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-86

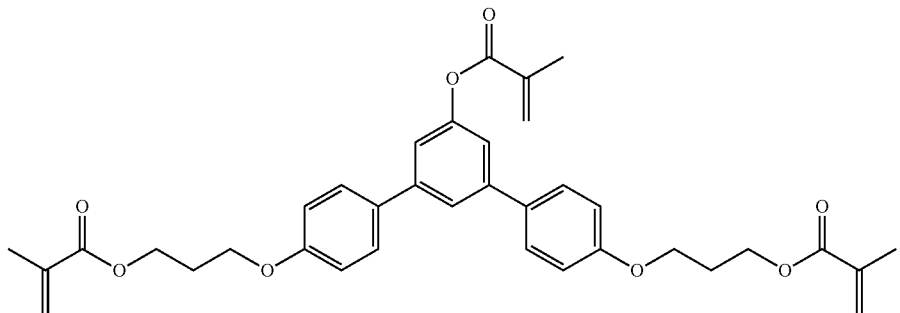 [SMILES: C=C(C)C(=O)OCCCOc1ccc(-c2cc(OC(=O)C(=C)C)cc(-c3ccc(OCCCOC(=O)C(=C)C)cc3)c2)cc1]
RM-87

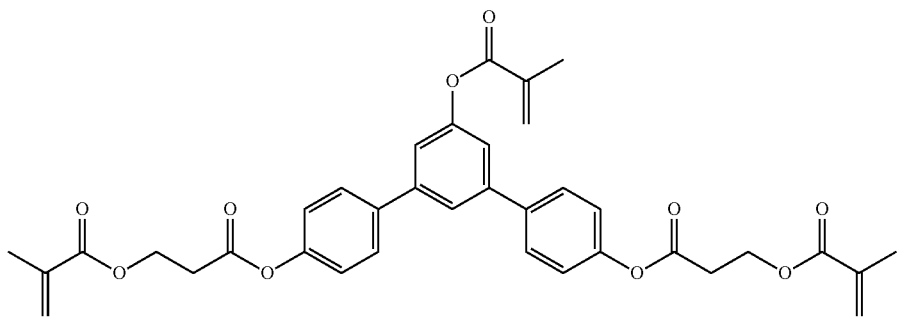 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-88

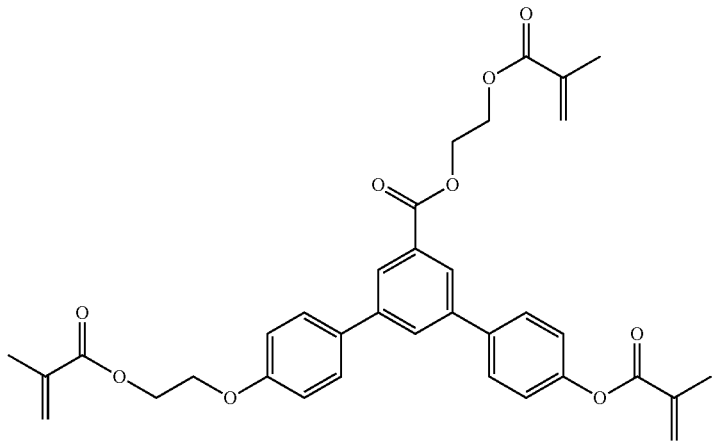 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-89

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

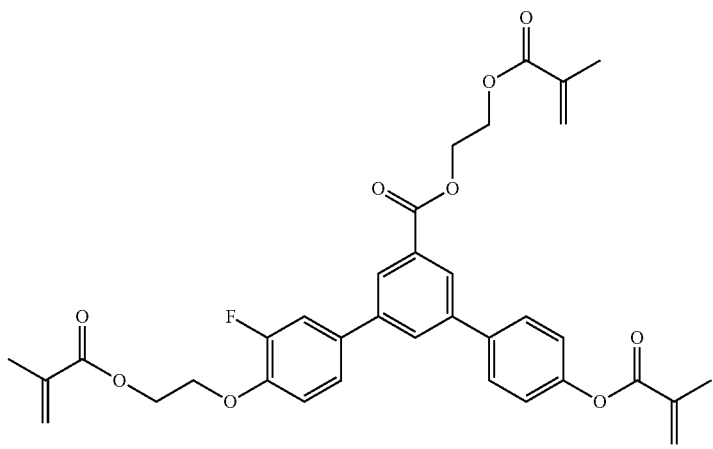 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]

RM-90

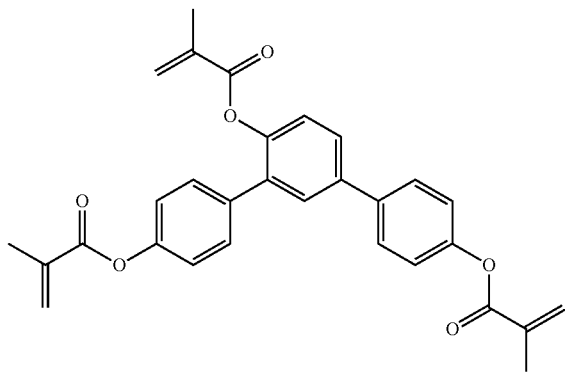 [SMILES: C=C(C)C(=O)Oc1ccc(-c2ccc(OC(=O)C(=C)C)c(-c3ccc(OC(=O)C(=C)C)cc3)c2)cc1]

RM-91

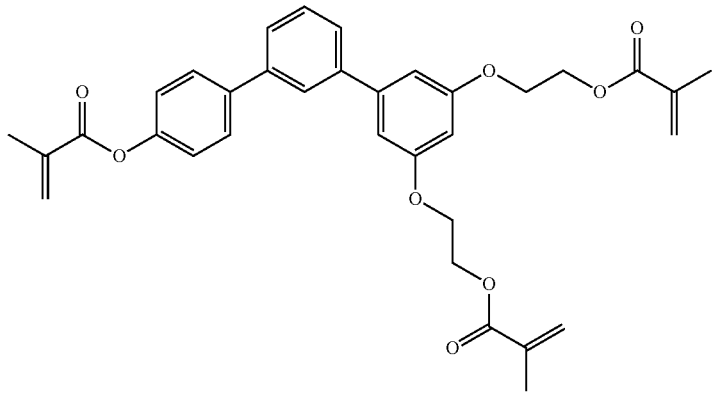 [SMILES: C=C(C)C(=O)OCCOc1cc(OCCOC(=O)C(=C)C)cc(-c2cccc(-c3ccc(OC(=O)C(=C)C)cc3)c2)c1]

RM-92

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

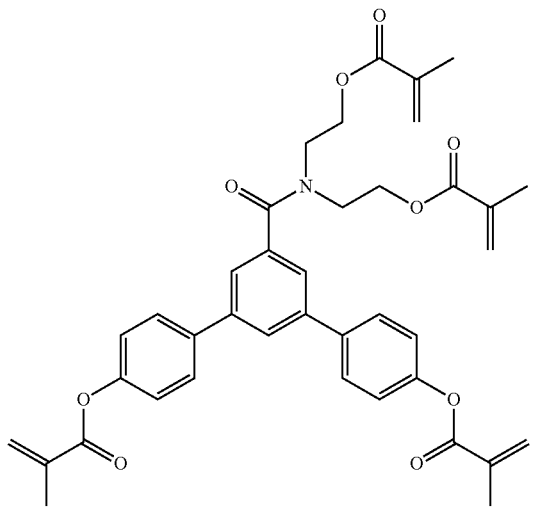 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]

RM-93

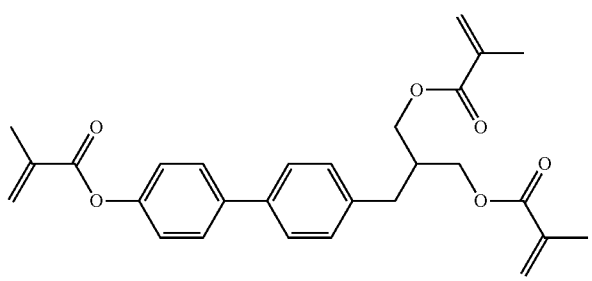 [SMILES: C=C(C)C(=O)OCC(COC(=O)C(=C)C)Cc1ccc(-c2ccc(OC(=O)C(=C)C)cc2)cc1]

RM-94

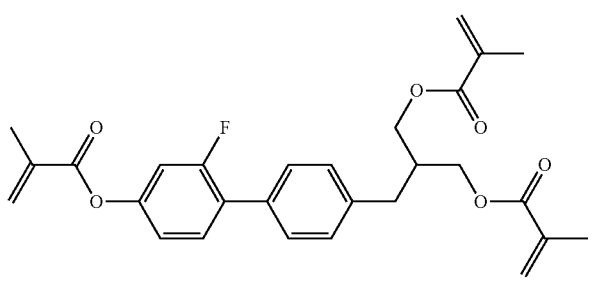 [SMILES: C=C(C)C(=O)OCC(COC(=O)C(=C)C)Cc1ccc(-c2ccc(OC(=O)C(=C)C)cc2F)cc1]

RM-95

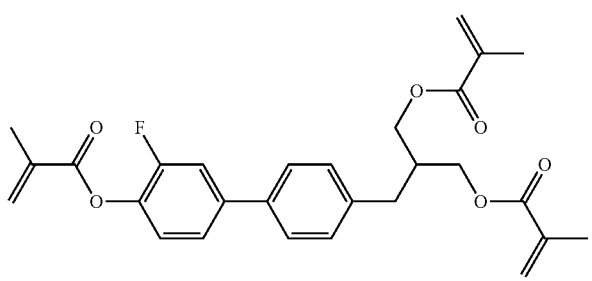 [SMILES: C=C(C)C(=O)OCC(COC(=O)C(=C)C)Cc1ccc(-c2ccc(OC(=O)C(=C)C)c(F)c2)cc1]

RM-96

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

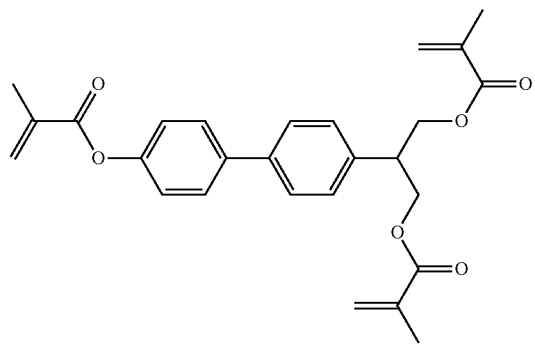 [SMILES: C=C(C)C(=O)OCC(COC(=O)C(=C)C)c1ccc(-c2ccc(OC(=O)C(=C)C)cc2)cc1]

RM-97

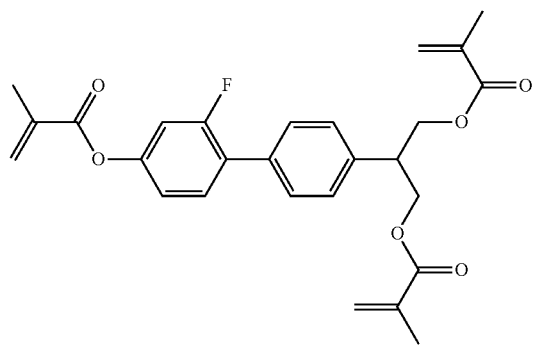 [SMILES: C=C(C)C(=O)OCC(COC(=O)C(=C)C)c1ccc(-c2ccc(OC(=O)C(=C)C)cc2F)cc1]

RM-98

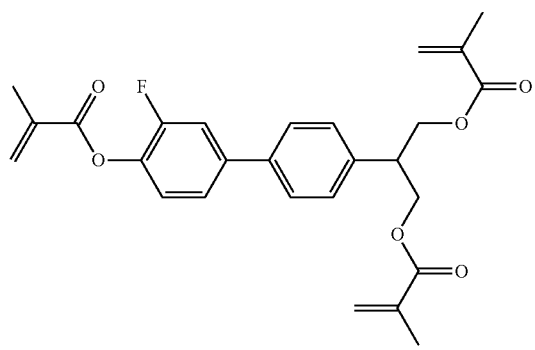 [SMILES: C=C(C)C(=O)OCC(COC(=O)C(=C)C)c1ccc(-c2ccc(OC(=O)C(=C)C)c(F)c2)cc1]

RM-99

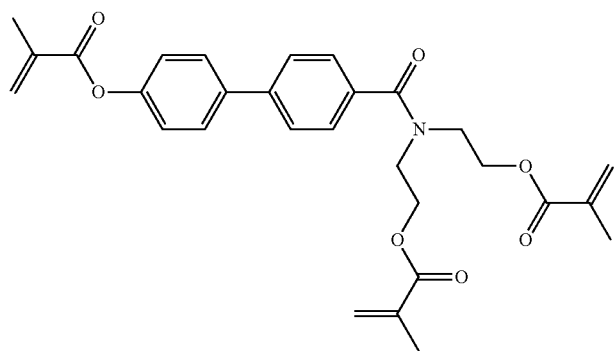 [SMILES: C=C(C)C(=O)OCCN(CCOC(=O)C(=C)C)C(=O)c1ccc(-c2ccc(OC(=O)C(=C)C)cc2)cc1]

RM-100

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

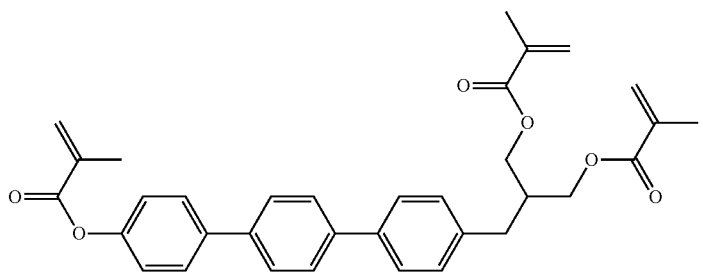 [SMILES: C=C(C)C(=O)OCC(COC(=O)C(=C)C)Cc1ccc(-c2ccc(-c3ccc(OC(=O)C(=C)C)cc3)cc2)cc1]

RM-101

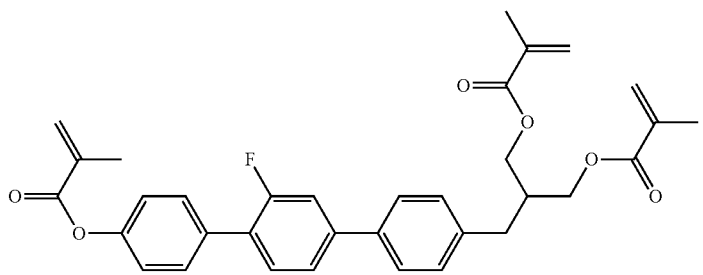 [SMILES: C=C(C)C(=O)OCC(COC(=O)C(=C)C)Cc1ccc(-c2ccc(-c3ccc(OC(=O)C(=C)C)cc3)c(F)c2)cc1]

RM-102

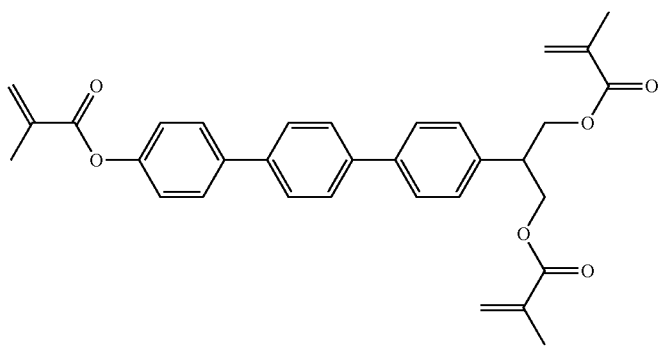 [SMILES: C=C(C)C(=O)OCC(COC(=O)C(=C)C)c1ccc(-c2ccc(-c3ccc(OC(=O)C(=C)C)cc3)cc2)cc1]

RM-103

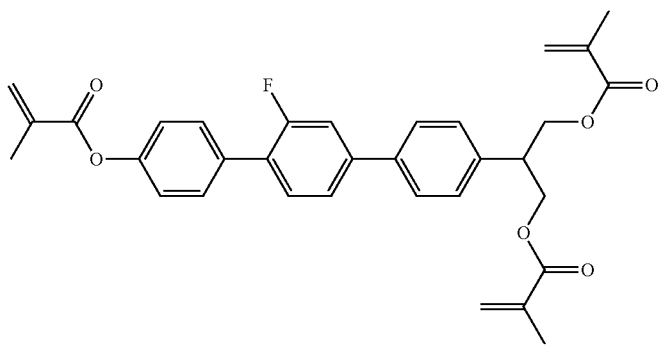 [SMILES: C=C(C)C(=O)OCC(COC(=O)C(=C)C)c1ccc(-c2ccc(-c3ccc(OC(=O)C(=C)C)cc3)c(F)c2)cc1]

RM-104

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

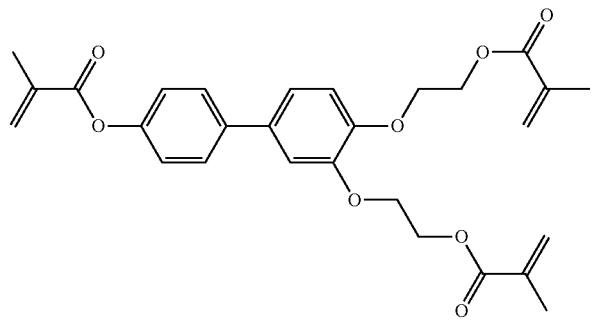 [SMILES: C=C(C)C(=O)OCCOc1ccc(-c2ccc(OC(=O)C(=C)C)cc2)cc1OCCOC(=O)C(=C)C]
RM-105

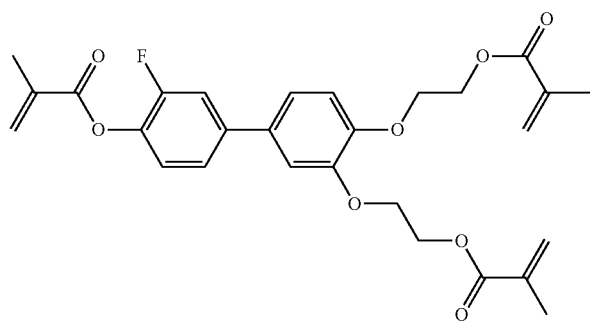 [SMILES: C=C(C)C(=O)OCCOc1ccc(-c2ccc(OC(=O)C(=C)C)c(F)c2)cc1OCCOC(=O)C(=C)C]
RM-106

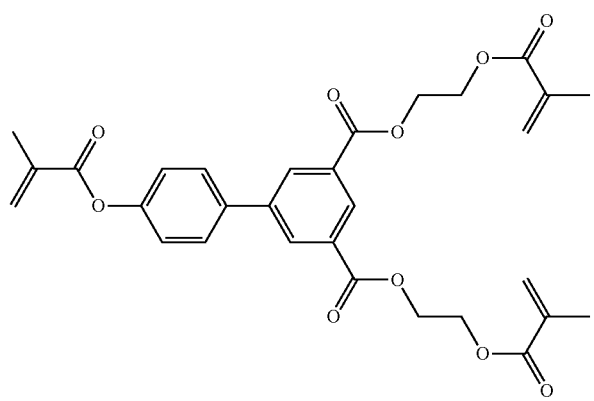 [SMILES: C=C(C)C(=O)OCCOC(=O)c1cc(C(=O)OCCOC(=O)C(=C)C)cc(-c2ccc(OC(=O)C(=C)C)cc2)c1]
RM-107

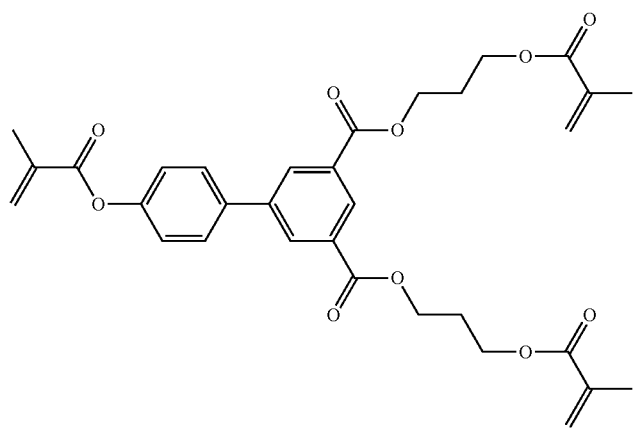 [SMILES: C=C(C)C(=O)OCCCOC(=O)c1cc(C(=O)OCCCOC(=O)C(=C)C)cc(-c2ccc(OC(=O)C(=C)C)cc2)c1]
RM-108

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

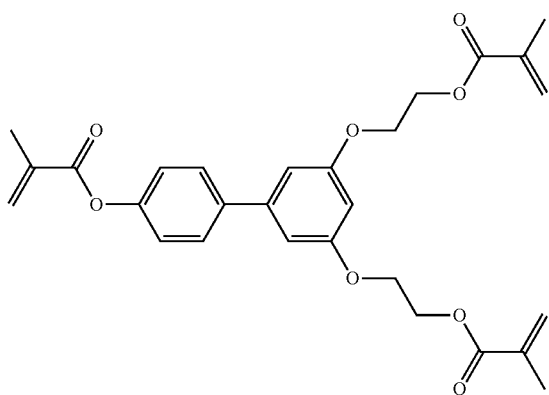 [SMILES: C=C(C)C(=O)OCCOc1cc(OCCOC(=O)C(=C)C)cc(-c2ccc(OC(=O)C(=C)C)cc2)c1]

RM-109

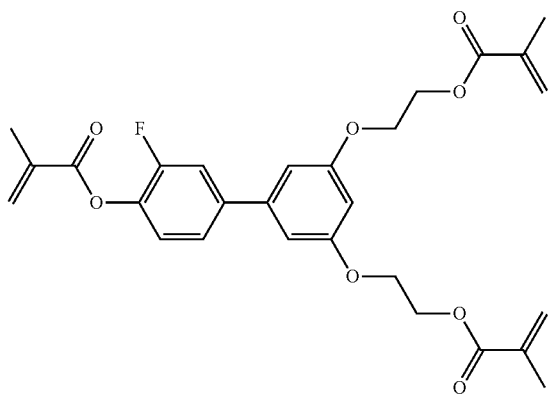 [SMILES: C=C(C)C(=O)OCCOc1cc(OCCOC(=O)C(=C)C)cc(-c2ccc(OC(=O)C(=C)C)c(F)c2)c1]

RM-110

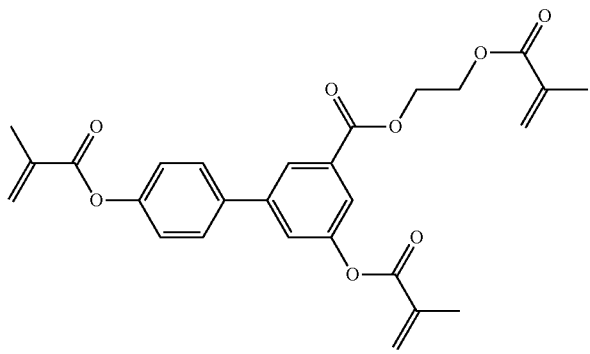 [SMILES: C=C(C)C(=O)OCCOC(=O)c1cc(OC(=O)C(=C)C)cc(-c2ccc(OC(=O)C(=C)C)cc2)c1]

RM-111

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

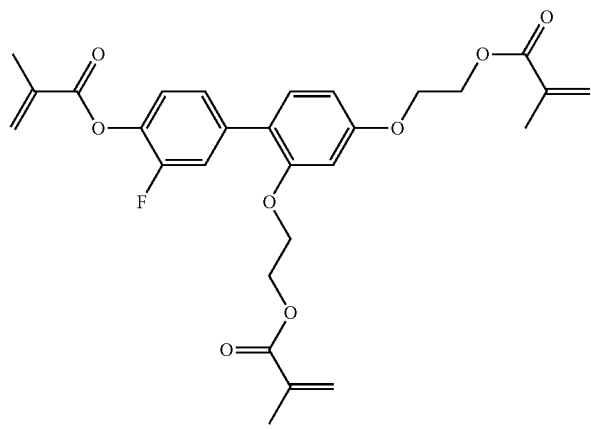 [SMILES: C=C(C)C(=O)OCCOc1ccc(-c2ccc(OC(=O)C(=C)C)c(F)c2)c(OCCOC(=O)C(=C)C)c1]

RM-112

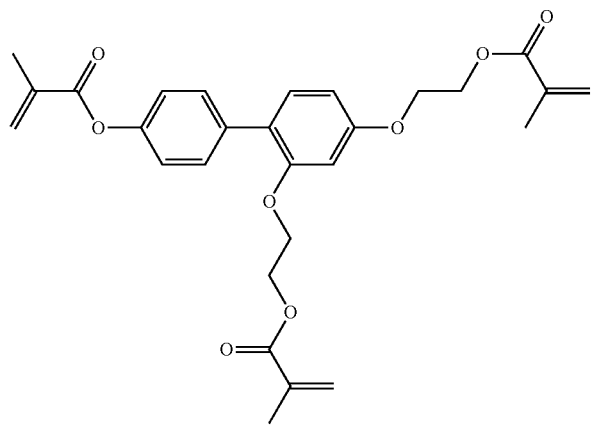 [SMILES: C=C(C)C(=O)OCCOc1ccc(-c2ccc(OC(=O)C(=C)C)cc2)c(OCCOC(=O)C(=C)C)c1]

RM-113

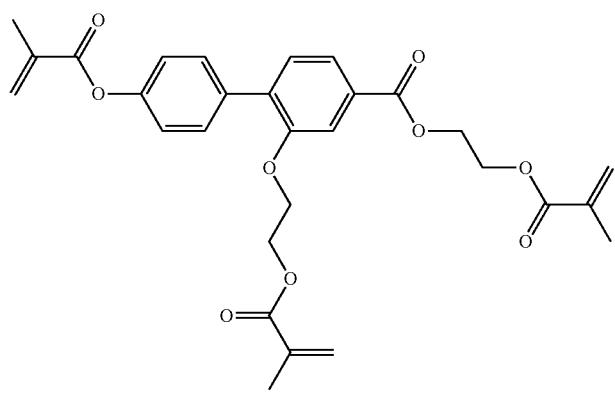 [SMILES: C=C(C)C(=O)OCCOC(=O)c1ccc(-c2ccc(OC(=O)C(=C)C)cc2)c(OCCOC(=O)C(=C)C)c1]

RM-114

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

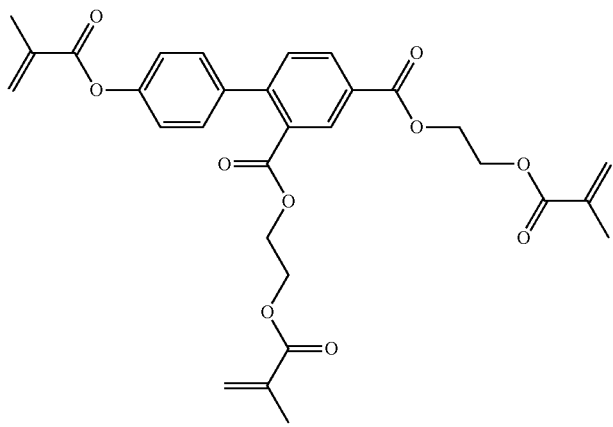 [SMILES: C=C(C)C(=O)OCCOC(=O)c1ccc(-c2ccc(OC(=O)C(=C)C)cc2)c(C(=O)OCCOC(=O)C(=C)C)c1]

RM-115

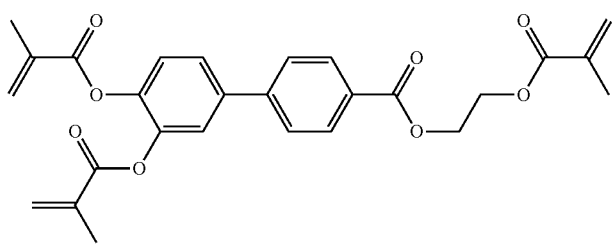 [SMILES: C=C(C)C(=O)OCCOC(=O)c1ccc(-c2ccc(OC(=O)C(=C)C)c(OC(=O)C(=C)C)c2)cc1]

RM-116

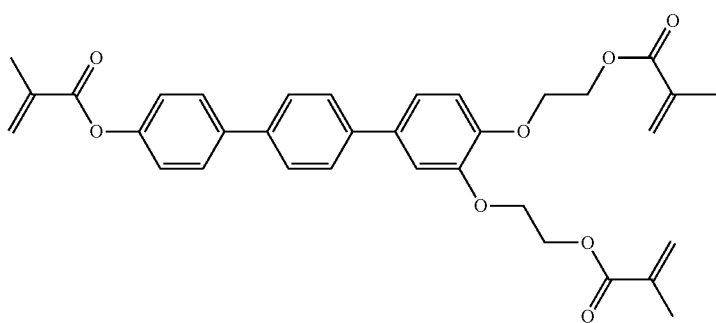 [SMILES: C=C(C)C(=O)OCCOc1ccc(-c2ccc(-c3ccc(OC(=O)C(=C)C)cc3)cc2)cc1OCCOC(=O)C(=C)C]

RM-117

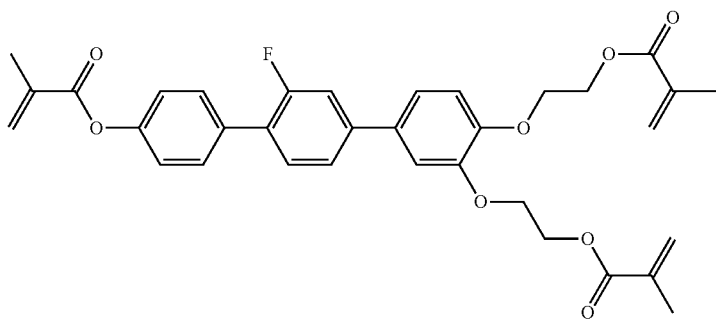 [SMILES: C=C(C)C(=O)OCCOc1ccc(-c2ccc(-c3ccc(OC(=O)C(=C)C)cc3)c(F)c2)cc1OCCOC(=O)C(=C)C]

RM-118

TABLE G-continued

Table G collates example compounds which can be used in the LC media according to the present invention, preferably as reactive mesogenic compounds. Preferably an initiator or a mixture of two or more initiators is added for the polymerisation. The initiator or initiator mixture is preferably added in amounts of 0.001% to 2% by weight, based on the mixture. A suitable initiator is, for example, Irgacure®651 (from BASF).

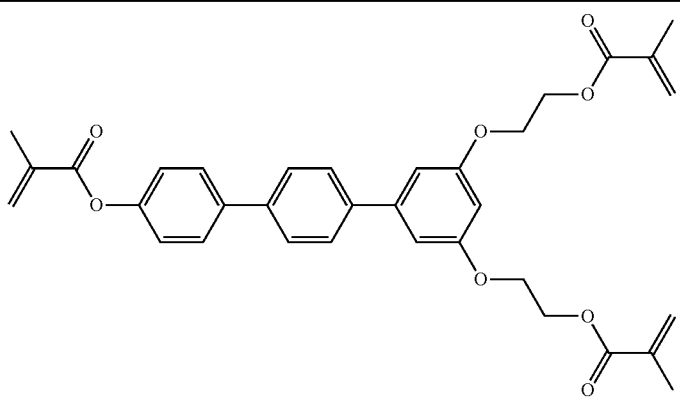

RM-119

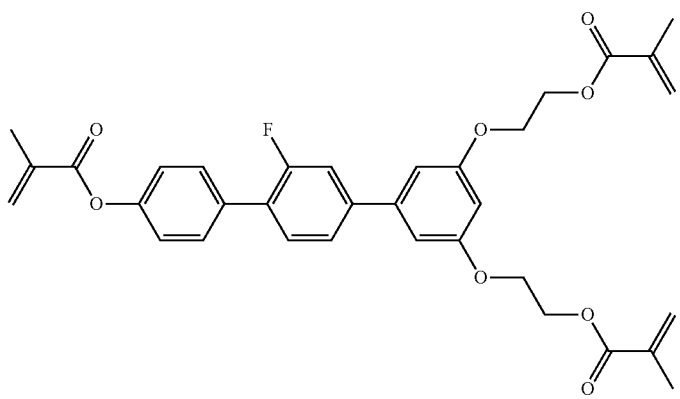 [SMILES: C=C(C)C(=O)OCCOc1cc(OCCOC(=O)C(=C)C)cc(-c2ccc(-c3ccc(OC(=O)C(=C)C)cc3)c(F)c2)c1]

RM-120

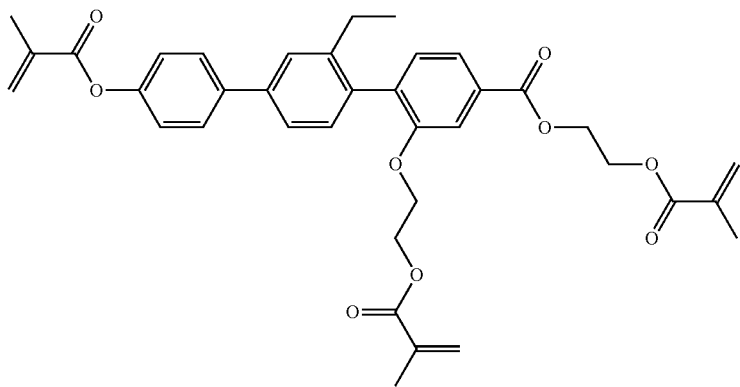 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]

RM-121

In a preferred embodiment of the present invention, the mesogenic media comprise one or more compounds selected from the group of the compounds from Table G.

The liquid crystalline media according to the present invention comprise preferably four or more, more preferably six or more, even more preferably seven or more, and particularly preferably eight or more compounds selected from the group of compounds of table D, preferably compounds of three or more different formulae selected from the group of formulae of table D. It is particularly preferred that the medium additionally contains one, two or more compounds selected from the group of formulae of table E. Even more preferably the medium further contains one, two or more compounds selected from the group of formulae of table G.

The following examples are merely illustrative of the present invention and they should not be considered as limiting the scope of the invention in any way. The examples and modifications or other equivalents thereof will become apparent to those skilled in the art in the light of the present disclosure.

However, the physical properties and compositions shown in the following illustrate which properties can be achieved and in which ranges they can be modified. Especially the combination of the various properties, which can be preferably achieved, is thus well defined.

EXAMPLES

In the Examples,

| | |
|---|---|
| $V_o$ | denotes threshold voltage, capacitive [V] at 20° C., |
| $n_e$ | denotes extraordinary refractive index at 20° C. and 589 nm, |
| $n_o$ | denotes ordinary refractive index at 20° C. and 589 nm, |
| $\Delta n$ | denotes optical anisotropy at 20° C. and 589 nm, |
| $\epsilon\|$ | denotes dielectric permittivity parallel to the director at 20° C. and 1 kHz, |
| $\epsilon\perp$ | denotes dielectric permittivity perpendicular to the director at 20° C. and 1 kHz, |
| $\Delta\epsilon$ | denotes dielectric anisotropy at 20° C. and 1 kHz, |
| cl.p., T(N, I) | denotes clearing point [° C.], |
| $\gamma_1$ | denotes rotational viscosity measured at 20° C. [mPa · s], determined by the rotation method in a magnetic field, |
| $K_1$ | denotes elastic constant, "splay" deformation at 20° C. [pN], |
| $K_2$ | denotes elastic constant, "twist" deformation at 20° C. [pN], |
| $K_3$ | denotes elastic constant, "bend" deformation at 20° C. [pN]. |

The term "threshold voltage" for the present invention relates to the capacitive threshold ($V_0$), unless explicitly indicated otherwise. In the Examples, as is generally usual, the optical threshold can also be indicated for 10% relative contrast ($V_{10}$).

Reference Example 1

A liquid crystal host mixture H-1 is prepared and characterized with respect to its general physical properties, having the composition and properties as indicated in the following table.

| | | | |
|---|---|---|---|
| CY-3-O2 | 9.00% | clearing point [° C.]: | 110.5 |
| CY-3-O4 | 9.00% | $\Delta n$ [589 nm, 20° C.]: | 0.132 |
| CY-5-O2 | 12.00% | $n_e$ [589 nm, 20° C.]: | 1.62 |
| CY-5-O4 | 8.00% | $\Delta\epsilon$ [1 kHz, 20° C.]: | -4.9 |
| CCY-3-O2 | 5.00% | $\epsilon\perp$ [1 kHz, 20° C.]: | 8.8 |
| CCY-3-O3 | 5.00% | $K_1$ [pN, 20° C.]: | 16.8 |
| CCY-4-O2 | 5.00% | $K_3$ [pN, 20° C.]: | 20.4 |
| CPY-2-O2 | 7.00% | $V_0$ [V, 20° C.]: | 2.14 |
| CPY-3-O2 | 6.00% | | |
| PYP-2-3 | 12.00% | | |
| CCP—V-1 | 6.00% | | |
| CCZPC-3-3 | 3.00% | | |
| CCZPC-3-4 | 3.00% | | |
| CGPC-3-3 | 5.00% | | |
| CGPC-5-3 | 5.00% | | |
| Σ 100.00% | | | |

A mixture M-1 is prepared by mixing 99.01% of mixture H-1, 0.05% of compound

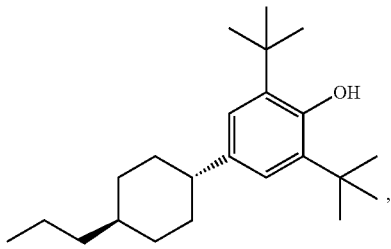

0.16% of compound

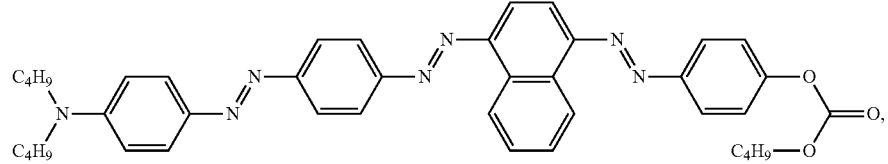

0.35% of compound

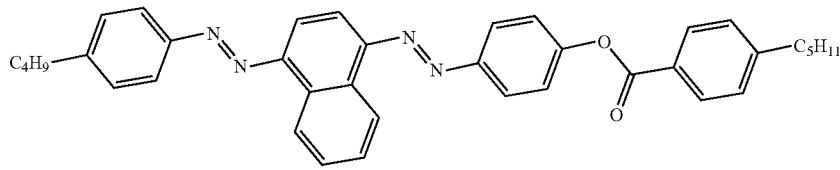

and 0.43% of compound

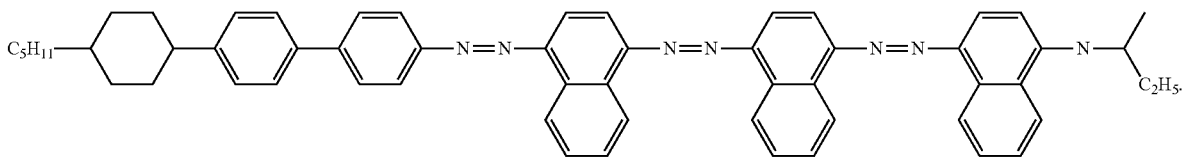

Reference Example 2

A liquid crystal base mixture B-2 is prepared and characterized with respect to its general physical properties, having the composition and properties as indicated in the following table.

| | | | |
|---|---|---|---|
| CC(CN)-4-7 | 14.00% | clearing point [° C.]: | 114.6 |
| CC(CN)-5-5 | 14.00% | Δn [589 nm, 20° C.]: | 0.045 |
| CC(CN)-3-3 | 6.00% | $n_e$ [589 nm, 20° C.]: | 1.52 |
| CCZC-3-3 | 3.00% | Δε [1 kHz, 20° C.]: | −5.2 |
| CCZC-3-5 | 3.00% | $ε_⊥$ [1 kHz, 20° C.]: | 8.5 |
| CCZC-4-3 | 3.00% | | |
| CCZC-4-5 | 3.00% | | |
| CC-3-O1 | 11.00% | | |
| CC-5-O1 | 4.00% | | |
| CC-5-O2 | 4.00% | | |
| CC(CN)C-3-5 | 10.00% | | |
| CC(CN)C-5-5 | 12.00% | | |
| CC(CN)C-5-3 | 10.00% | | |
| CCZPC-3-3 | 3.00% | | |
| Σ 100.00% | | | |

A mixture M-2 is prepared analogous to mixture M-1 described in Reference Example 1 above, wherein instead of mixture H-1 the mixture B-2 is used.

Reference Example 3

A liquid crystal base mixture B-3 is prepared and characterized with respect to its general physical properties, having the composition and properties as indicated in the following table.

| | | | |
|---|---|---|---|
| CCZPC-3-3 | 4.00% | clearing point [° C.]: | 77.1 |
| CCOC-3-3 | 4.00% | Δn [589 nm, 20° C.]: | 0.064 |
| CCOC-4-3 | 4.00% | $n_e$ [589 nm, 20° C.]: | 1.54 |
| CCY-3-O1 | 5.50% | Δε [1 kHz, 20° C.]: | −2.7 |
| CCY-3-O2 | 5.00% | $ε_⊥$ [1 kHz, 20° C.]: | 6.3 |
| CCY-3-O3 | 7.50% | | |
| CCY-4-O2 | 8.00% | | |
| CCY-5-O2 | 7.50% | | |
| CC-2-3 | 18.00% | | |
| CC-3-O1 | 14.50% | | |
| CC-3-O3 | 10.00% | | |
| CC-5-O1 | 2.00% | | |
| Y—4O—O4 | 10.00% | | |
| Σ 100.00% | | | |

A mixture M-3 is prepared by mixing 99.638% of mixture B-3, 0.332% of the compound of formula S-811 as described in Table F above and 0.030% of the compound of formula

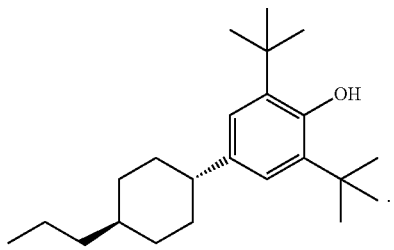 [SMILES: CCC[C@H]1CC[C@H](c2cc(C(C)(C)C)c(O)c(C(C)(C)C)c2)CC1]

Reference Example 4

A liquid crystal base mixture B-4 is prepared and characterized with respect to its general physical properties, having the composition and properties as indicated in the following table.

| | | | |
|---|---|---|---|
| CY-3-O2 | 24.50% | clearing point [° C.]: | 80.5 |
| CCY-3-O2 | 12.00% | Δn [589 nm, 20° C.]: | 0.092 |
| CCY-4-O2 | 10.00% | $n_e$ [589 nm, 20° C.]: | 1.57 |
| CPY-3-O2 | 6.50% | Δε [1 kHz, 20° C.]: | −3.3 |
| CC-2-5 | 11.00% | $ε_⊥$ [1 kHz, 20° C.]: | 6.8 |
| CC-3-4 | 7.00% | | |
| CC-3-O1 | 8.00% | | |
| CC-3-O3 | 5.50% | | |
| CCP-3-1 | 9.00% | | |
| PGP-2-4 | 6.50% | | |
| Σ 100.00% | | | |

A mixture M-4 is prepared by mixing 99.51% of mixture B-4 and 0.49% of the compound of formula S-811 as described in Table F above.

Reference Example 5

A liquid crystal mixture B-5 is prepared and characterized with respect to its general physical properties, having the composition and properties as indicated in the following table.

| | | | |
|---|---|---|---|
| CC(CN)-4-7 | 20.00% | clearing point [° C.]: | 101 |
| CC(CN)-5-5 | 21.00% | Δn [589 nm, 20° C.]: | 0.044 |
| CCZC-3-3 | 4.00% | $n_e$ [589 nm, 20° C.]: | 1.52 |
| CCZC-3-5 | 4.00% | Δε [1 kHz, 20° C.]: | −4.8 |
| CCZC-4-3 | 4.00% | $ε_⊥$ [1 kHz, 20° C.]: | 8.1 |
| CCZC-4-5 | 4.00% | | |
| CC-3-O1 | 11.00% | | |
| CC-5-O1 | 5.00% | | |
| CC-5-O2 | 5.00% | | |
| CC(CN)C-5-5 | 22.00% | | |
| Σ 100.00% | | | |

Reference Example 6

A liquid crystal mixture M-6 is prepared and characterized with respect to its general physical properties, wherein the compound CY-a-1 is defined as specified in the description above.

| | |
|---|---|
| compound CY-a-1 | 24.50% |
| CCY-3-O2 | 12.00% |
| CCY-4-O2 | 10.00% |
| CPY-3-O2 | 6.50% |
| CC-2-5 | 11.00% |
| CC-3-4 | 7.00% |
| CC-3-O1 | 8.00% |
| CC-3-O3 | 5.50% |
| CCP-3-1 | 9.00% |
| PGP-2-4 | 6.50% |
| Σ 100.00% | |

Comparative Example 1

Two optical cells are assembled each using 2 glass plates (20 mm×26 mm, thickness of 1.1 mm), where each glass plate is coated with an indium tin oxide (ITO) layer (thickness of 50 nm, resistance is 100Ω/□).

For each glass plate, on top of the ITO layer a layer of polyimide (50 nm, JSR, JALS-2096-R1) is applied by spincoating. The polyimide layers are rubbed antiparallel with a velvet cloth (Yoshikawa YA-20R) on a metal roller.

The rubbing induces a pretilt angle of 88.5°, where the pretilt angle is determined using the Mueller Matrix Polarimeter "AxoScan" from Axometrics.

Including plastic spacers having a diameter of 25 μm, two glass plates each with the polyimide layers facing inwards and each other are assembled to form a cell, where a 3 mm offset on the short edge is used to provide cabling access. Apart from filling ports, the cell edges are sealed.

The dye-doped liquid crystalline mixture M-1 as described in Reference Example 1 above is filled in the cells by capillary forces, and the filling ports are sealed. Electric cables are soldered to the offset contact areas of the cells.

The two cells are stacked using double-sided adhesive tape near the edges to form a double cell, where one cell is turned by 90° with respect to the other.

Using a square wave voltage of 30 Vrms the double cell is switched into a dark state having a grainy and irregular appearance, where small bright spots and irregular narrow bright lines are visible. These defects disappear gradually over time. Only after 120 seconds following the switching a dark state is obtained having a uniformly dark appearance.

Comparative Example 2

A switchable cell is assembled analogous to Comparative Example 1 above, wherein however instead a cell thickness of 15 μm and a pretilt angle of 89° are set.

Using a square wave voltage of 20 Vrms for switching, the grainy defects in the initial dark state disappear after 60 seconds to obtain a uniformly dark appearance.

Example 1

Two optical cells are assembled each using 2 glass plates (20 mm×26 mm, thickness of 1.1 mm), where each glass plate is coated with an indium tin oxide (ITO) layer (thickness of 50 nm, resistance is 100 Ω/□).

For each glass plate, on top of the ITO layer a layer of polyimide (50 nm) is applied by spincoating. The polyimide layers are rubbed with a velvet cloth (Yoshikawa YA-20R) on a metal roller using a rotation speed 200 rpm, a moving speed of 25 mm/s and a rubbing depth of 0.3 mm.

The rubbing induces a pretilt angle of 86°, where the pretilt angle is determined using the Mueller Matrix Polarimeter "AxoScan" from Axometrics.

Including plastic spacers having a diameter of 25 μm, two glass plates each with the polyimide layers facing inwards and each other are assembled to form a cell, where a 3 mm offset on the short edge is used to provide cabling access. Apart from filling ports, the cell edges are sealed.

The dye-doped liquid crystalline mixture M-1 as described in Reference Example 1 above is filled in the cells by capillary forces, and the filling ports are sealed. Electric cables are soldered to the offset contact areas of the cells.

The two cells are stacked using double-sided adhesive tape near the edges to form a double cell, where one cell is turned by 90° with respect to the other.

Using a square wave voltage of 30 Vrms the double cell is switched into a dark state having a grainy and irregular appearance, where small bright spots and irregular narrow bright lines are visible. These defects disappear quickly and after 10 seconds after the switching a dark state having a uniformly dark appearance is obtained.

Example 2

A switchable cell is assembled analogous to Example 1 above, wherein however instead a cell thickness of 15 μm and a pretilt angle of 85° are set.

Using a square wave voltage of 20 Vrms for switching, the grainy defects in the initial dark state disappear after 10 seconds to obtain a uniformly dark appearance.

Example 3

A switchable double cell is assembled analogous to Example 1 above, wherein however in each of the cells having a thickness of 25 μm at one polyimide layer a pretilt angle of 86° is set and at the other polyimide layer a pretilt angle of 89° is set.

Using a square wave voltage of 20 Vrms for switching, the grainy defects in the initial dark state disappear after 15 seconds to obtain a uniformly dark appearance.

Example 4

A switchable cell is assembled analogous to Example 1 above using a cell thickness of 25 μm and setting a pretilt angle of 85°, wherein at an applied voltage of 20 V a twisted TN configuration with a twist angle of 90° is provided.

Using a square wave voltage of 20 Vrms for switching, the grainy defects in the initial dark state disappear after less than 10 seconds to obtain a uniformly dark appearance.

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. From the description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding EP Patent Application No. 19216581.9, filed Dec. 16, 2019, are incorporated by reference herein.

The invention claimed is:

1. A window element comprising a switchable optical cell having a layer structure comprising in this order
 a first substrate,
 a first electrode layer,
 a first alignment layer,
 a switchable layer,
 a second alignment layer,
 a second electrode layer, and
 a second substrate,
wherein the switchable layer is a homeotropically aligned liquid crystal layer comprising a liquid crystalline medium comprising one or more dichroic dyes,
wherein, in the optical cell, the first and second alignment layers are in direct contact with the liquid crystalline medium, wherein the switchable optical cell is operable in and electrically switchable between a bright state and a dark state,
wherein the window element has a degree of visible light transmission, determined in accordance with DIN EN410, of more than 45% in the bright state and of less than 30% in the dark state,
wherein the one or more dichroic dyes preferentially absorb light in one orientation so that light transmission may be modulated by changing the orientation of the one or more dichroic dyes, and
wherein a pretilt angle in the range of 84° to 86° is set by at least one of the first alignment layer and the second alignment layer.

2. The window element according to claim 1, wherein the switchable layer has a thickness of at least 5 μm.

3. The window element according to claim 1, wherein, in the absence of an electric field, the switchable layer is homeotropically aligned.

4. The window element according to claim 1, wherein the liquid crystalline medium has a negative dielectric anisotropy Δε, an optical anisotropy Δn in the range of 0.03 to 0.30, and a clearing point of at least 70° C.

5. The window element according to claim 1, wherein a pretilt angle of 84° is set.

6. The window element according to claim 1, wherein the switchable optical cell further comprises one or more polarizer layers and optionally one or more optical retarder layers.

7. The window element according to claim 1, wherein the switchable layer is polymer stabilized.

8. The window element according to claim 1, wherein a pretilt angle of 85° is set by the first alignment layer and the second alignment layer.

9. The window element according to claim 1, wherein the first alignment layer and the second alignment layer comprise a rubbed or phototreated organic material.

10. The window element according to claim 1, wherein the first alignment layer and the second alignment layer are polyimide-based layers.

11. The window element according to claim 1, wherein a pretilt angle of 86° is set.

12. The window element according to claim 1, wherein, in addition to the switchable optical cell, the window element comprises a further switchable optical cell.

13. The window element according to claim 1, wherein the window element has an area of at least 100 cm², and wherein the switchable layer is unsegmented or is segmented into compartments each having an area of at least 1 cm².

14. The window element according to claim 1, wherein, in the presence of an electric field, the switchable layer has a twisted or supertwisted configuration.

15. The window element according to claim 1, wherein the liquid crystalline medium comprises one or more compounds of formulae CY, PY and/or AC

CY

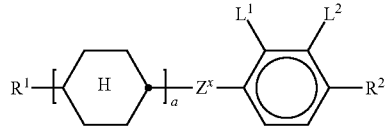

PY

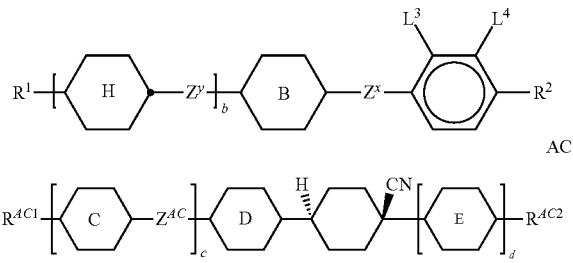

AC

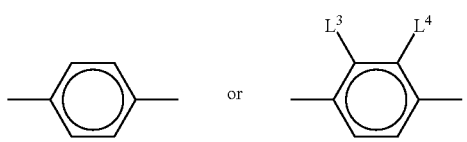

wherein
a denotes 1 or 2,
b denotes 0 or 1,
c denotes 0, 1 or 2,
d denotes 0 or 1,

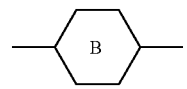

denotes

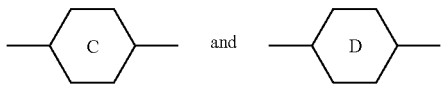

or

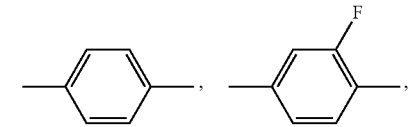

denote

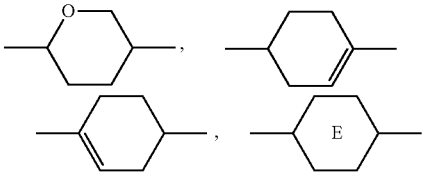

denotes

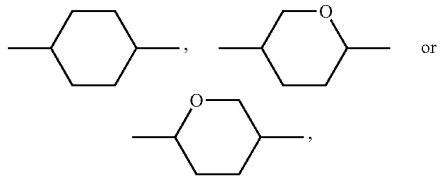 or $R^1$, $R^2$, $R^{AC1}$ and $R^{AC2}$ each, independently of one another, denote alkyl having 1 to 12 C atoms, in which one or two non-adjacent $CH_2$ groups are optionally replaced by

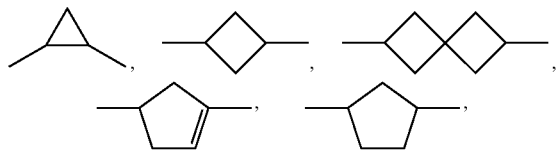

—O—, —CH=CH—, —CO—, —COO— or —COO— in such a way that O atoms are not linked directly to one another, $Z^x$, $Z^y$ and $Z^{AC}$ each, independently of one another, denote —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, and $L^{1-4}$ each, independently of one another, denote F, Cl, CN, $OCF_3$, $CF_3$, $CH_3$, $CH_2F$ or $CHF_2$.

16. The window element according to claim 15, wherein $R^1$, $R^2$, $R^{AC1}$ and $R^{AC2}$ each, independently of one another, denote alkyl or alkoxy having 1 to 6 C atoms, $Z^x$, $Z^y$ and $Z^{AC}$ each denote a single bond, and/or $L^{1-4}$ each denote F.

17. The window element according to claim 15, wherein $L^1$ and $L^2$ denote F or one of $L^1$ and $L^2$ denotes F and the other denotes Cl, and both $L^3$ and $L^4$ denote F or one of $L^3$ and $L^4$ denotes F and the other denotes Cl.

18. A window of a building or a vehicle comprising the window element according to claim 1.

19. The window element according to claim 1, which comprises two switchable optical cells, each comprising in this order
a first substrate,
a first electrode layer,
a first alignment layer,
a switchable layer,
a second alignment layer,
a second electrode layer, and
a second substrate,
wherein the switchable layer in each optical switchable cell is a homeotropically aligned liquid crystal layer comprising a liquid crystalline medium, and
wherein a pretilt angle of 84° to 86° is set by at least one of the first alignment layer and the second alignment layer in each optical switchable cell.

20. The window element according to claim 1, wherein the switchable layer has a thickness of at least 10 μm.

21. The window element according to claim 1, wherein the liquid crystalline medium contains polymerizabe compounds, and wherein all polymerizabe compounds in the liquid crystalline medium are reactive mesogens.

22. The window element according to claim 1, wherein the liquid crystalline medium does not contain a polymerizabe compound.

* * * * *